United States Patent
Uchiki et al.

[11] Patent Number: 5,995,520
[45] Date of Patent: Nov. 30, 1999

[54] CARRIER SLIP COMPENSATION METHOD FOR COHERENT DETECTION

[75] Inventors: Tatsuya Uchiki; Toshiharu Kojima, both of Tokyo, Japan

[73] Assignee: Mitsubishi Denki Kabushiki Kaisha, Tokyo, Japan

[21] Appl. No.: 08/775,457

[22] Filed: Dec. 30, 1996

[30] Foreign Application Priority Data

Mar. 1, 1996 [JP] Japan ................................. 8-044860

[51] Int. Cl.⁶ ........................................... H04J 3/06
[52] U.S. Cl. ...................... 370/516; 370/517; 370/518; 370/204; 370/206
[58] Field of Search .................... 370/516, 517, 370/518, 204, 206, 366, 536, 542, 108, 102, 94

[56] References Cited

U.S. PATENT DOCUMENTS

| | | | |
|---|---|---|---|
| 4,100,499 | 7/1978 | Monrolin | 370/516 |
| 4,472,711 | 9/1984 | Stollberger et al. | 370/516 |
| 5,570,372 | 10/1996 | Shaffer | 370/517 |
| 5,844,907 | 7/1996 | Uchiki et al. | 370/517 |

OTHER PUBLICATIONS

Excerpts from Digital Communications by Satellite (Bhargave, Jateck Publishing Co., Ltd), in 1981 by John Wiley & Sons Inc.

Excerpts from TDMA Communication (Yamamoto, Kato, Electric Information Communication Academy).

*Primary Examiner*—Michael Horabik
*Assistant Examiner*—Man Phan

[57] ABSTRACT

In the communication system using the binary phase shift keying (BPSK) modulation method, an erroneous data that might be caused by a carrier slip of carrier wave generated during coherent detection can be compensated. The modulation unit of the transmitter transmits identical data at differentiated timing through BPSK modulation, and the coherent detector circuit of the demodulation unit of the receiver detects waves upon receiving signals. The compensating circuit makes time differences in transmitted data equal and compares them to detect mismatch in order to compensate carrier slip found in the received signal and then the combination circuit realizes the combination.

24 Claims, 51 Drawing Sheets

Fig.2

| {A_i} | $A_{-1}$ | $A_0$ | $A_1$ | $A_2$ | ... | $A_{N-1}$ | $A_N$ |
|---|---|---|---|---|---|---|---|
| {B_i} | $B_{-1} = A_{-1-N}$ | $B_0 = A_{0-N}$ | $B_1 = A_{1-N}$ | $B_2 = A_{2-N}$ | ... | $B_{N-1} = A_{-1}$ | $B_N = A_0$ |
| {C_i} | $C_{-1}$: $C_{-1,1}=A_{-1}$, $C_{-1,2}=B_{-1}$ | $C_0$: $C_{0,1}=A_0$, $C_{0,2}=B_0$ | $C_1$: $C_{1,1}=A_1$, $C_{1,2}=B_1$ | $C_2$: $C_{2,1}=A_2$, $C_{2,2}=B_2$ | ... | $C_{N-1}$: $C_{N-1,1}=A_{N-1}$, $C_{N-1,2}=B_{N-1}$ | $C_N$: $C_{N,1}=A_N$, $C_{N,2}=B_N$ |

| {$c_i$} | | {$a_i$} | {$b_i$} |
|---|---|---|---|
| ⋮ | ⋮ | ⋮ | ⋮ |
| $c_{N,1} = a_N$ / $c_{N,2} = b_N$ | $c_N$ | $a_N$ | $b_N = a_0$ |
| $c_{N-1,1} = a_{N-1}$ / $c_{N-1,2} = b_{N-1}$ | $c_{N-1}$ | $a_{N-1}$ | $b_{N-1} = a_{-1}$ |
| ⋮ | ⋮ | ⋮ | ⋮ |
| $c_{1,1} = a_2$ / $c_{1,2} = b_2$ | $c_2$ | $a_2$ | $b_2 = a_{2-N}$ |
| $c_{1,1} = a_1$ / $c_{1,2} = b_1$ | $c_1$ | $a_1$ | $b_1 = a_{1-N}$ |
| $c_{0,1} = a_0$ / $c_{0,2} = b_0$ | $c_0$ | $a_0$ | $b_0 = a_{0-N}$ |
| $c_{-1,1} = a_{-1}$ / $c_{-1,2} = b_{-1}$ | $c_{-1}$ | $a_{-1}$ | $b_{-1} = a_{-1-N}$ |
| ⋮ | ⋮ | ⋮ | ⋮ |

Fig.6

EXCLUSIVE-OR INPUT $\{a_{i-N}\}$  | ... | $a_{-N}$ | $a_{1-N}$ | $a_{2-N}$ | $a_{3-N}$ | ---- | $a_1$ | $\overline{a_2}$ | $\overline{a_3}$ | $\overline{a_4}$ | ... |

$\{b_i\}$ | ... | $b_0 = \overline{a_{-N}}$ | $b_1 = \overline{a_{1-N}}$ | $\overline{b_2} = a_{2-N}$ | $\overline{b_3} = a_{3-N}$ | ---- | $\overline{b_{N+1}} = a_1$ | $b_{N+2} = \overline{a_2}$ | $b_{N+3} = \overline{a_3}$ | $b_{N+4} = \overline{a_4}$ | ... |

EXCLUSIVE-OR OUTPUT $\{E_i\}$

ADDER OUTPUT $\{S_i\}$

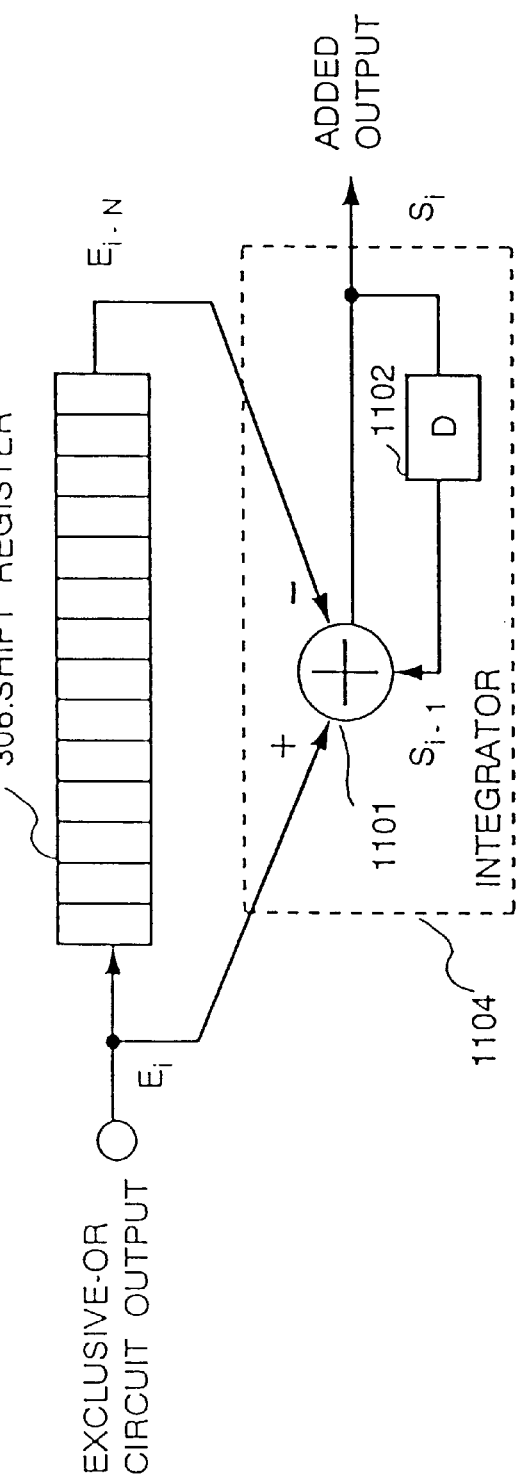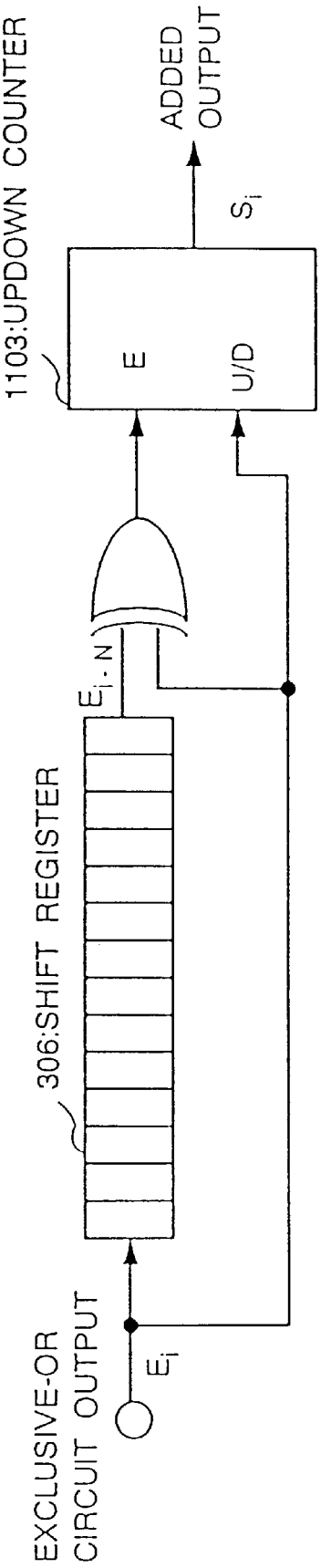

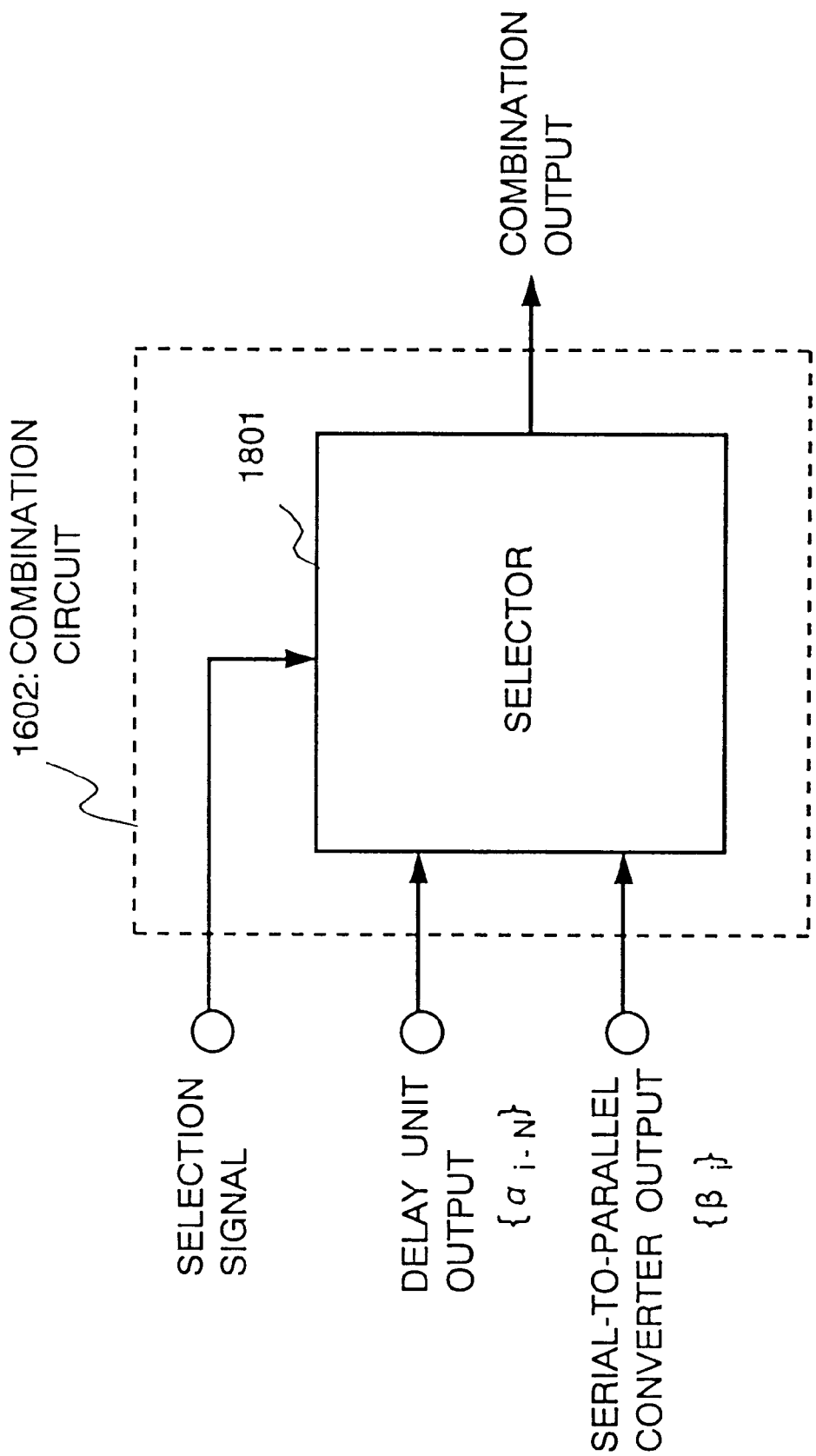

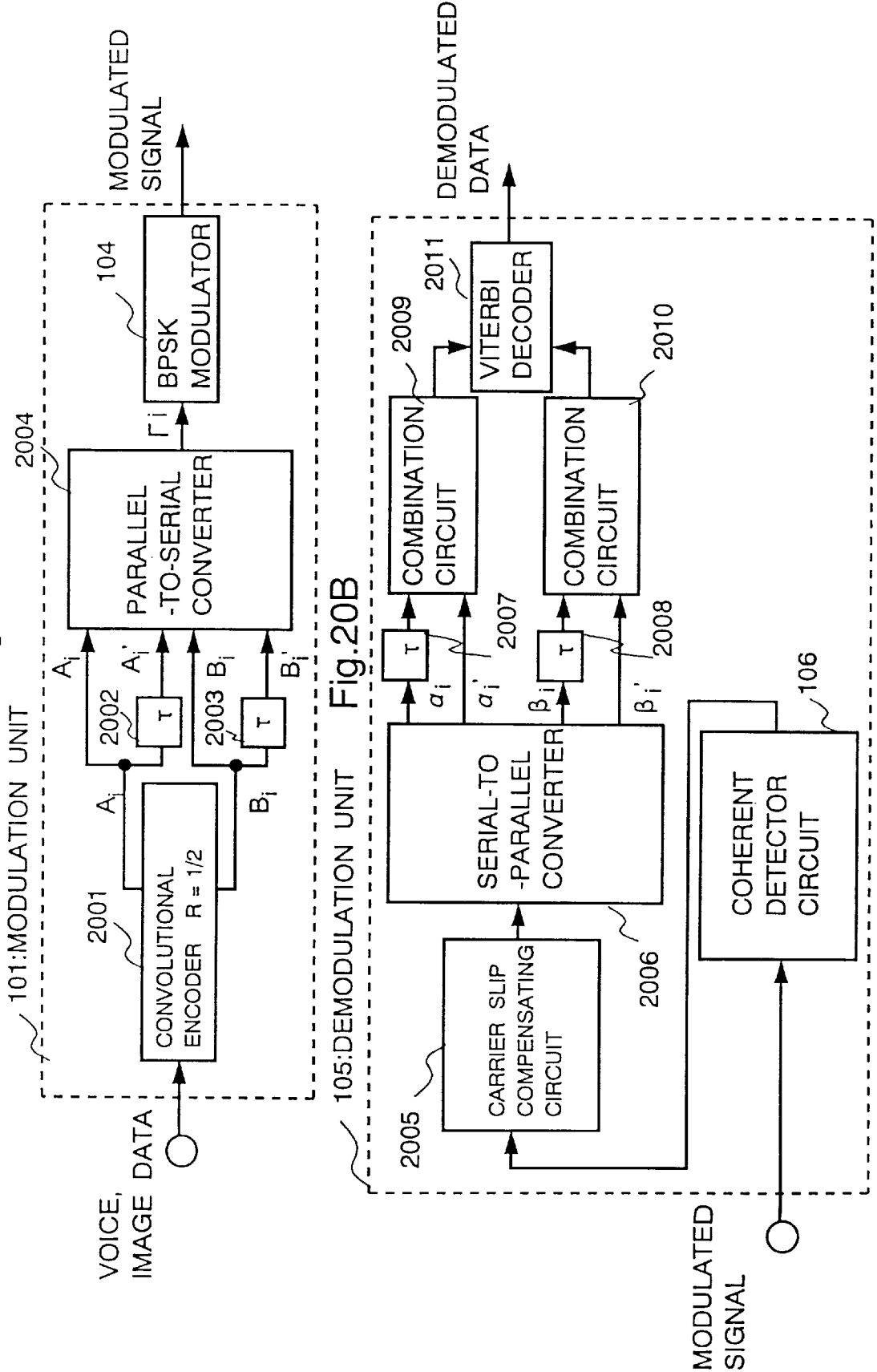

Fig.21

$\Gamma_i = (\Gamma_{i,1}, \Gamma_{i,2}, \Gamma_{i,3}, \Gamma_{i,4},)$
$\Gamma_{i,1} = A_i \quad \Gamma_{i,3} = B_i$
$\Gamma_{i,2} = A_i' \quad \Gamma_{i,4} = B_i'$

Fig.24

$y_i = (y_{i,1}, y_{i,2}, y_{i,3}, y_{i,4,})$
$y_{i,1} = A_i \quad y_{i,3} = B_i$
$y_{i,2} = A_i' \quad y_{i,4} = B_i'$

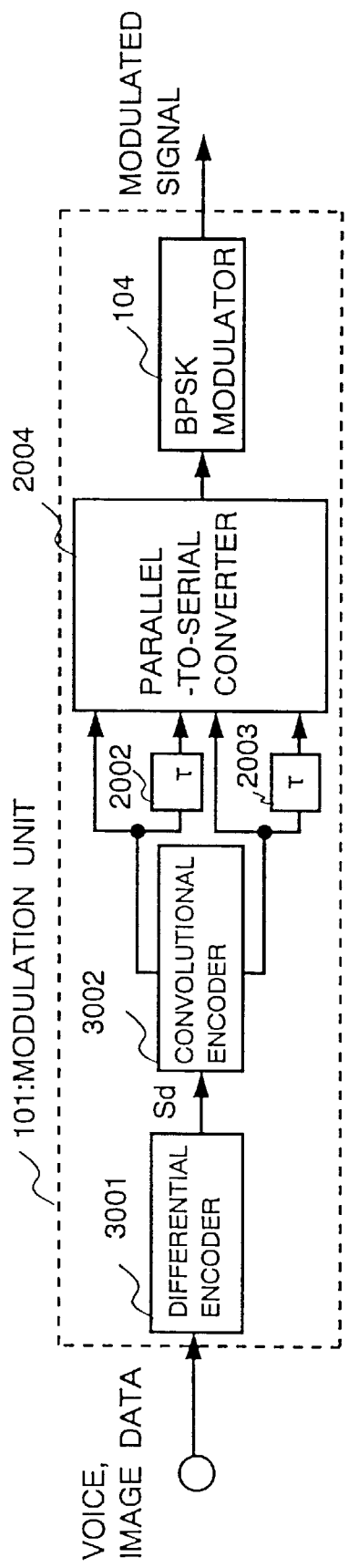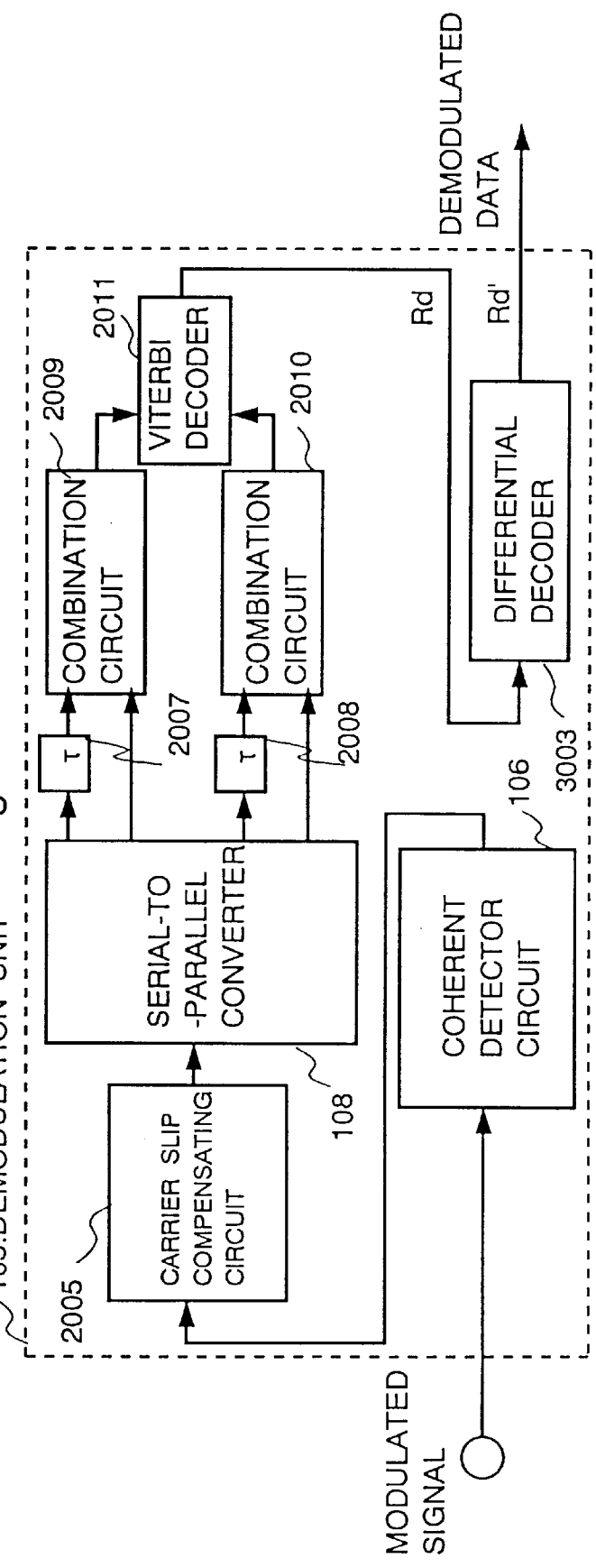

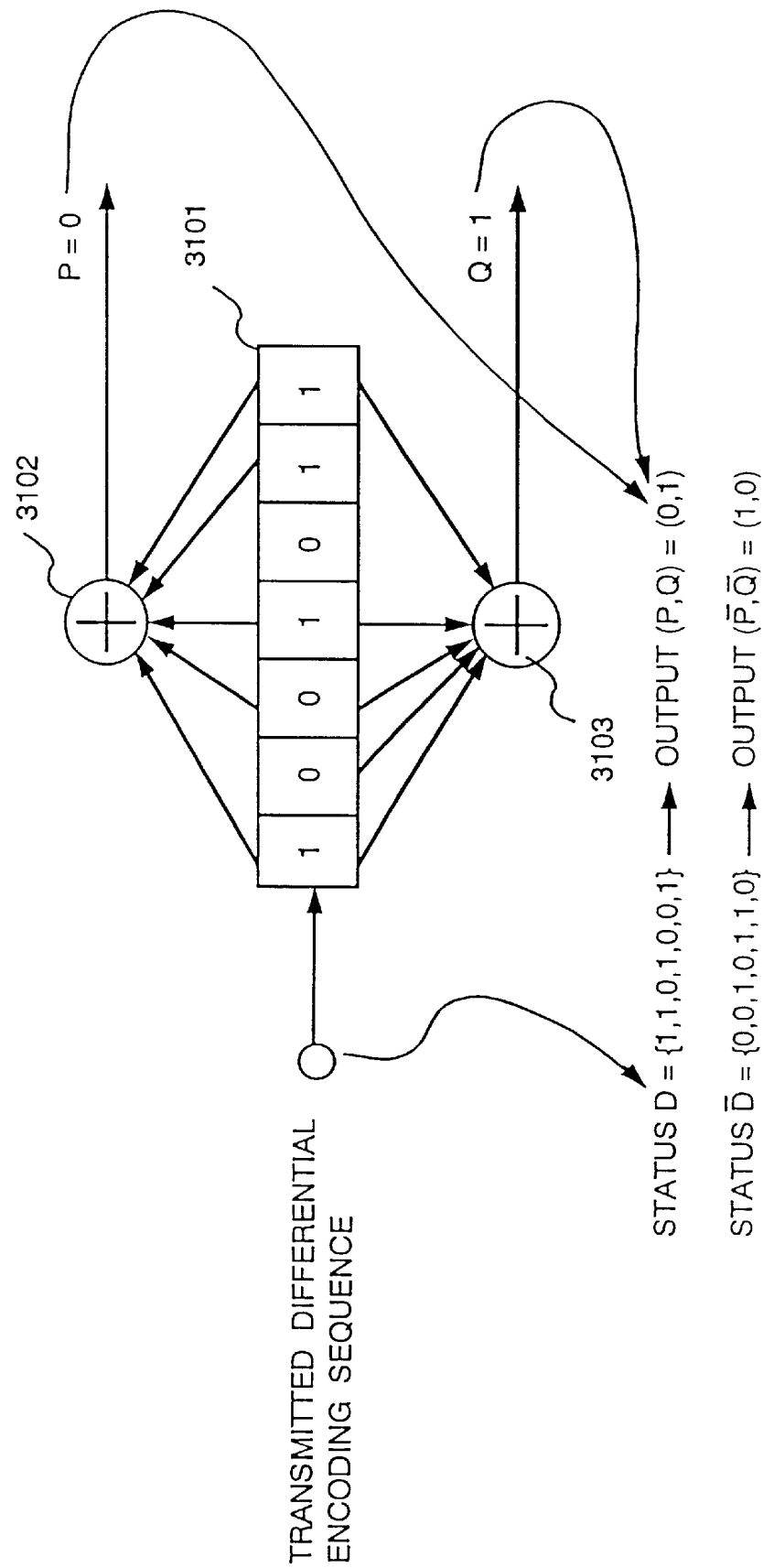

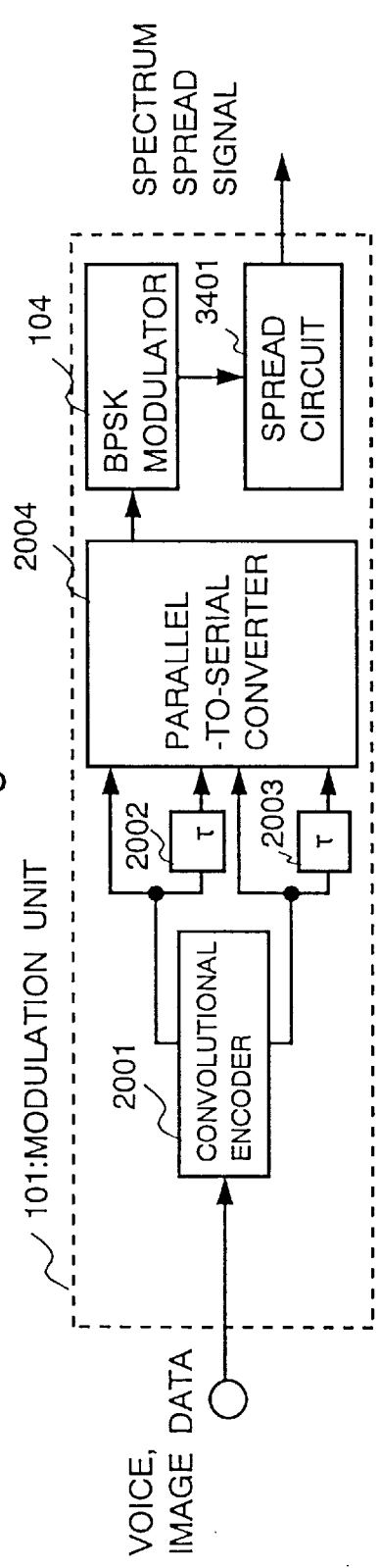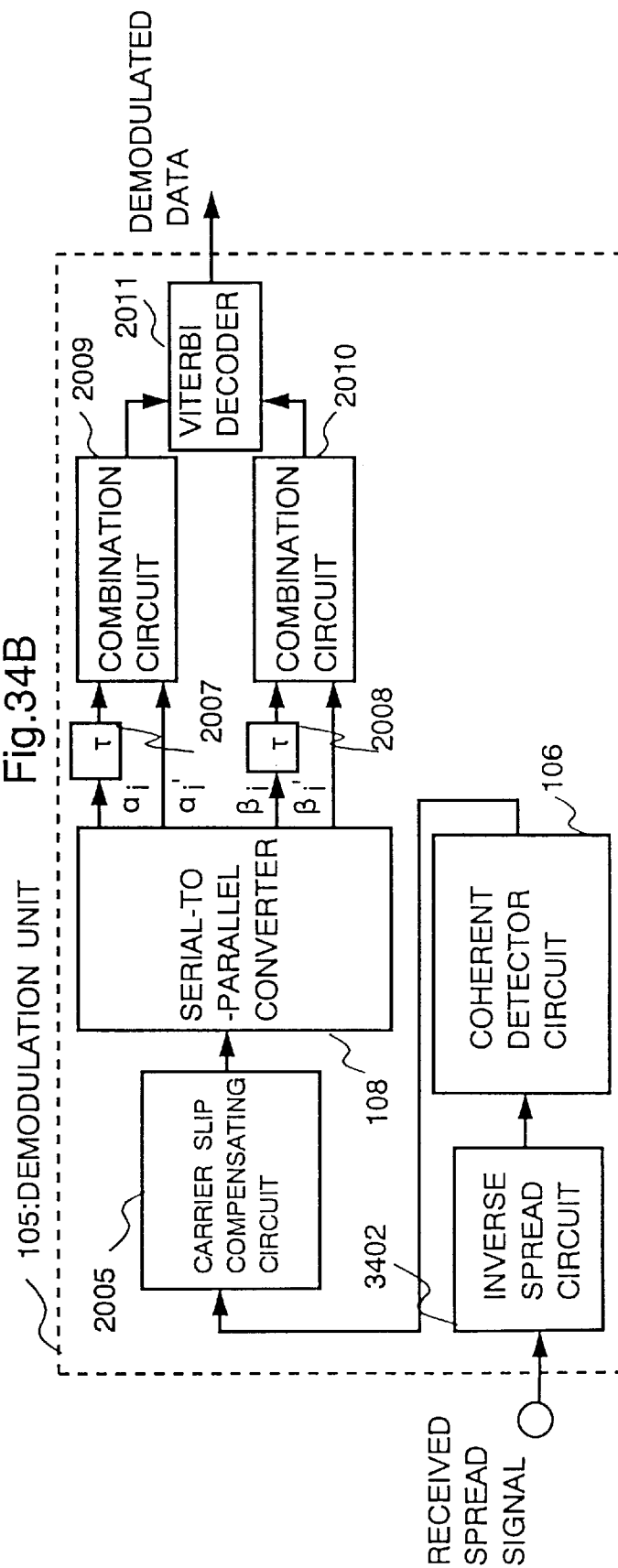

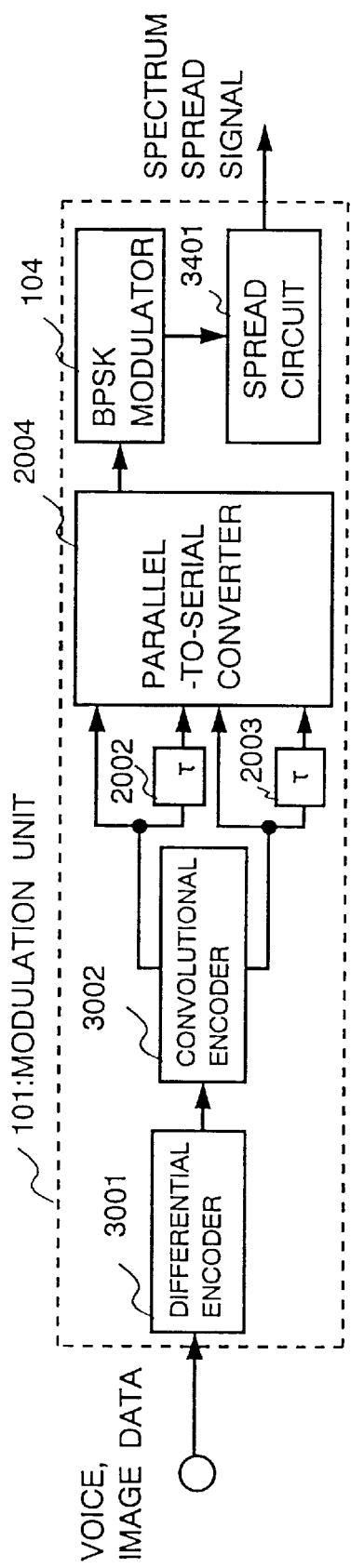
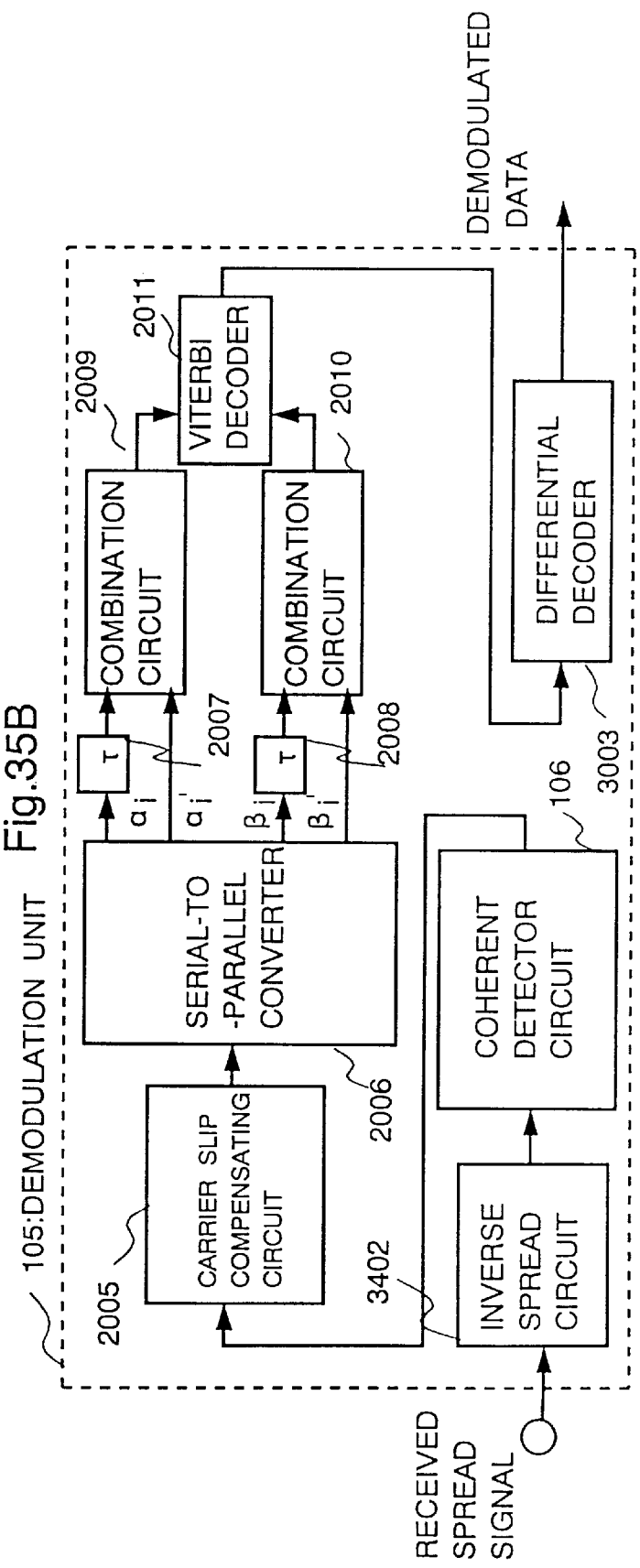
Fig.35A
Fig.35B

CARRIER SLIP COMPENSATION METHOD FOR COHERENT DETECTION

BACKGROUND OF THE INVENTION

This invention relates to the improvement of the receiver in the field of radio communications.

DESCRIPTION OF THE RELATED ART

Conventional Example 1

As a method of carrier slip compensation for the conventional coherent detection, the differential encoding and differential decoding methods are described in Digital Communications by Satellite (Bhargava, Jateck Publishing Co. Ltd., May 21, 1986, First Translated Edition by Tsukamoto). The conventional art is explained below with reference to figures.

FIGS. 42A and 42B show the configuration of a modulation unit of a transmitter and a demodulation unit of a receiver of the communication system using the differential encoding and differential decoding of the conventional carrier slip compensation method. In FIGS. 42A and 42B, a differential encoder 3901, a binary phase shift keying (BPSK) modulator 3902, a coherent detector circuit 3903, and a differential decoder 3904 are shown.

The operation is explained. In the general digital radio communication system, data such as voice, image, and so on is converted into a digital signal by a voice coder, etc. The digital signal is input into differential encoder 3901 and encoded by the differential encoding.

An example of the differential encoder configuration is shown in FIG. 43. In FIG. 43, a delay unit 4001 having a delay time equivalent to 1 data time period D, and an exclusive-OR circuit 4002 are illustrated. The digital signal input into differential encoder 3901 is input into exclusive-OR circuit 4002. There, it is exclusive-ORed with the output from exclusive-OR circuit 4002 which is one previous symbol delayed by delay unit 4001. Namely, if the i-th data to be input into differential encoder 3901 is assumed to be $I_i$, the output from exclusive-OR circuit 4002, e.g., output $O_i$ from differential encoder 3901 will be given by the equation as follows:

$$O_i = O_{i-1} \oplus I_i \qquad \text{[Equation 1]}$$

The output from differential encoder 3901 is input into BPSK modulator 3902 to be BPSK modulated. The BPSK modulated wave is transmitted (not shown) after it is electrically amplified by a radio-frequency amplifier, etc. The transmitted radio wave is received by the receiver, and after it is electrically amplified (not shown) by a radio-frequency amplifier, etc., it is input into coherent detector circuit 3903 for coherent detection.

The configuration and operation of coherent detector circuit 3903 are explained with reference to FIG. 44. In FIG. 44, a multiplier 4101, and a carrier recovery circuit 4102 are shown. The received signal input into coherent detector circuit 3903 is input into carrier recovery circuit 4102 so as to generate recovered carrier wave. At the same time, the received signal is input into multiplier 4101 to be coherently detected with the recovered carrier wave output from carrier recovery circuit 4102.

The configuration and operation of carrier recovery circuit 4102 are explained with reference to FIG. 45. In FIG. 45, a double-frequency multiplier 4201, multiplier 4202, a loop filter 4203, a voltage-controlled oscillator 4204, a phase lock loop (PLL) circuit 4205, and a half-frequency divider 4206 are shown. The received signal input into carrier recovery circuit 4102 is frequency doubled by double-frequency multiplier 4201, and then input into PLL circuit 4205 composed of a multiplier 4202, loop filter 4203, and voltage-controlled oscillator 4204. Because the output from PLL circuit 4205 becomes an improved SN (signal vs. noise) ratio signal which is phase synchronized with the transmission carrier wave, recovered carrier wave can be obtained by dividing its frequency by half with half-frequency divider 4206. At this time, 180-degree phase ambiguity exists in the phase of recovered carrier waves.

The phase ambiguity of recovered carrier wave is explained using figures. FIGS. 46A, 46B, 46C, and 46D show signal spaces, and 46A shows a receiving signal. In FIG. 46A, due to the presence of noise, the receiving signal is supposed to be in range A of oblique line if the value of transmission signal is 0, and in range B of oblique line if the value of transmission signal is 1. When the frequency of this receiving signal is multiplied by 2, the output from double-frequency multiplier 4201 becomes like range C of the oblique line of FIG. 46B. When this is input into PLL circuit 4205 to improve the SN ratio, the output from PLL circuit 4205 becomes like range C' of the oblique line of FIG. 46C. When the frequency of the output from this PLL circuit 4205 is divided by half by half-frequency divider 4206, the recovered carrier wave could be either A' or B' in FIG. 46D. Namely, recovered carrier wave has two stable points, and it can be seen there is a presence of 180-degree phase ambiguity.

Signal which is coherently detected by coherent detector circuit 3903 in FIG. 42B is input into differential decoder 3904. The configuration example of differential decoder 3904 is shown in FIG. 47. In FIG. 47, a delay unit 4401 which has delay time equivalent to 1 data time period D and an exclusive-OR circuit 4402 are shown. The coherently detected output input into differential decoder 3904 is input into exclusive-OR circuit 4402 and exclusive-ORed with the coherently detected output which is one previous symbol delayed by delay unit 4401. Namely, if the i-th data to be input into differential decoder 3904 is assumed to be $C_i$, the output from exclusive-OR circuit 4402, e.g., the output $P_i$ from differential decoder 3904 can be expressed by the equation below.

$$P_i = C_i \oplus C_{i-1} \qquad \text{[Equation 2]}$$

The output from differential decoder 3904 is decoded as decoding data by a voice decoder, etc., and then output as the data such as voice, image, and so on.

In the communication system like above, when the SN ratio of a circuit is small, there are cases when recovered carrier wave moves to a certain stable point to another stable point due to noise or other effects. This is called a cycle slip or carrier slip of recovered carrier wave (hereinafter called the carrier slip). When a carrier slip occurs, an error occurs only at the carrier slip occurrence for a system equipped with the differential encoding and differential decoding methods. When a carrier slip occurs, the code of demodulated data is inverted after the carrier slip occurrence for the system without the differential encoding and differential decoding methods, thus deteriorating the bit error rate remarkably.

Deterioration of the bit error rate caused by the carrier slip is explained using figures. FIG. 48A is a figure showing an error condition caused by the carrier slip when the differential encoding and differential decoding methods are not used, and FIG. 48B is a figure showing an error condition caused by the carrier slip when the differential encoding and differential decoding methods are applied. In FIG. 48A, a transmission data sequence for which the differential encoding is not performed at the transmitter is assumed to be {Sa}. Here, because only the effects by the carrier slip is taken into account, error by noise is assumed to be none. If the carrier slip is not occurred, therefore, the receiving data sequence {Ra} becomes {Ra}={Sa}. Suppose a carrier slip has occurred at point P of FIGS. 48A and 48B, and the receiving data sequence at that time is assumed to be {Ra'}. For {Ra'}, the data code after point P is inverted, and the receiving signal that should be determined to be 0 is determined to be 1, and the receiving signal that should be determined to be 1 is determined to be 0, conversely. The error caused by the carrier slip is shown as the comparison result {Ca} between {Sa} and {Ra'}. For {Ca}, O indicates that {Sa} and {Ra'} are matched, while X indicates that {Sa} does not match {Ra'}. As can be seen from {Ca}, all data become errors once a carrier slip occurs.

On the other hand, the case using the differential encoding and differential decoding methods becomes like FIG. 48(B). First of all, it is assumed that the differential encoding of the transmission data sequence {Sa} results in sequence {Sd}. As is the same as the above, taking only the effects of the carrier slip into consideration, error by noise is assumed to be nonexistent. Therefore, {Rd}={Sd}.

The first bit in the differential encoding is assumed to be 0.

As above, assuming that a carrier slip has occurred at point P of FIG. 48B, the receiving data sequence at this time is presumed to be {Rd'}. For {Rd'}, all data codes get inverted after point P.

When the differential decoding is performed for {Rd'}, demodulated data sequence {Rd"} is obtained. The carrier slip error is shown as the comparison result {Cd} between {Sa} and {Rd"}. For {Cd}, O indicates that {Sa} matches {Rd"} while X indicates that {Sa} does not match {Rd"}. As can be seen from {Cd}, an error occurs only at the carrier slip occurrence if the differential encoding and differential decoding methods are used, and no other errors occur after that. Therefore, the differential encoding and differential decoding methods are useful compensation measures against the carrier slip.

Next, let's consider a case in which there is no carrier slip but errors occur by ordinary noise. The error occurrence in this situation is shown in FIGS. 49A and 49B. Like FIGS. 48A and 48B, FIG. 49A shows an error condition when the differential encoding and differential decoding methods are not used while FIG. 49B shows when they are used. In FIG. 49A, an error is assumed to have occurred at point P by noise. In this case, unlike the carrier slip occurrence explained previously, the data codes are not inverted after that. Therefore, receiving sequence {Ra'} and {Rd'} differ only by 1 bit at point P compared with {Sa} and {Sd}. As can be seen from FIG. 49A, one bit at point P becomes erroneous just like {Ca} when the differential encoding and differential decoding methods are not used. However, consecutive 1 bit after point P also becomes erroneous just like {Cd} when the differential encoding and differential decoding methods are used in FIG. 49(B). Namely, when a carrier slip does not occur, the differential encoding and differential decoding methods deteriorate the error rate. Furthermore, for a communication system that performs error correction coding before the differential encoding and error correction processing after differential decoding, deterioration of the error rate for the differential encoding and differential decoding methods are not desirable as the deterioration of the error rate causes the lowering of correction capability of the error correction code.

Conventional Example 2

As another conventional carrier slip compensation method, a method of using unique words is written in TDMA Communication (Yamamoto, Kato, Electric Information Communication Academy, Apr. 5, 1989, First Edition). Conventional art is explained using figures below.

FIGS. 50A and 50B show the configuration of the modulation unit of the transmitter and the demodulation unit of the receiver of the communication system using the unique word which is the conventional carrier slip compensation method. FIG. 50A shows a unique word insertion unit 4701 and a BPSK modulator 4702. A coherent detector circuit 4703 is shown in FIG. 50B.

The operation is explained. In the digital radio communication system, data such as voice, image, etc., is converted into digital signal by a voice decoder, and so on. The digital signal is input into a unique word insertion unit 4701, and the unique word which is the known signal is inserted into the signal so as to enable various types of synchronization in the receiver. An example of output from unique word insertion unit 4701 is shown in FIG. 51. The unique word in FIG. 51 is inserted into the signal at a certain interval. The output from unique word insertion unit 4701 is input into BPSK modulator 4702 to be BPSK modulated. The BPSK modulated signal is electrically amplified by the radio-frequency amplifier and then transmitted (not shown). The transmitted radio wave is received by the receiver, and electrically amplified by a radio-frequency amplifier, and so on, (not shown) and then input into coherent detector circuit 4703 to be coherently detected.

The configuration and operation of coherent detector circuit 4703 is explained with FIG. 52. In the figure, a multiplier 4101, a carrier wave recovery circuit 4102, and a unique word detector 4901 are shown. The received signal input into coherent detector circuit 4703 is input into carrier wave recovery circuit 4102 to generate recovered carrier wave. The received signal is also input into multiplier 4101 so as to be coherently detected by the recovered carrier wave output from carrier wave recovered circuit 4102. Coherently detected signal is output from coherent detector circuit 4703 and input into unique word detector 4901 to perform unique word detection. The unique word detector 4901 controls carrier wave recovery circuit 4102 performing unique word detection.

The operation of unique word detector 4901 is explained with a figure. FIG. 53 shows a configuration example of unique word detector 4901. In FIG. 53, two correlation units 5001 and 5002 are shown. The coherently detected output input into unique word detector 4901 is branched to two and input into correlation units 5001 and 5002. At correlation unit 5001, correlation value between the unique word UW and the coherently detected output is calculated, when the correlation value is larger than the correlation threshold value, the correlation pulse is output. At correlation unit 5002, the correlation between the NEGATE of the unique word UW and the coherently detected output is calculated, and when the correlation value is larger than the correlation threshold value, the correlation pulse is output.

If the carrier wave phase is correct, the correlation pulse is output from correlation unit 5001, and the carrier wave continues to be detected in the same phase. If the phase of the carrier wave differs in 180°, correlation pulse is output from correlation unit 5002, and carrier wave recovery circuit 4102 of FIG. 52 compensates phase ambiguity of recovered carrier wave by performing control of differentiating the carrier wave phase to be output by 180°.

The output from coherent detector circuit 4703 is decoded as demodulation data by the voice decoder, etc., and then output as data such as voice, image, and so on.

Let's assume that a carrier slip has occurred to a receiver similar to the above due to the effects of noise, and so on. Code inversion by the carrier slip is detected by the unique word detection just as the phase ambiguity of the recovered carrier wave, and compensated. In this method, however, whole data between the carrier slip occurrence and unique word receiving becomes erroneous. To suppress the error, the number of unique words to be inserted at the transmitting side can be increased. However, inserting a unique word frequently is not desirable for it may increase redundancy in the transmission data.

Problems to be Solved by the Invention

Conventionally, as has explained above, when the differential encoding method is used as a carrier slip compensation method, an error caused by the occurrence of a carrier slip is 1 bit per carrier slip. However, when $E_b/N_0$ is large and the frequency of carrier slip generation is quite low, or when $E_b/N_0$ is small and error-correction code is used for the case in which the differential encoding method is used as a carrier slip compensation method, error caused by noise increases compared to the case in which the differential encoding is not performed, thereby causing the deterioration in the bit error rate characteristics.

Because the conventional carrier slip compensation method used the unique word, it has such a problem that data was not correctly demodulated until the unique word is received once a carrier slip has occurred. Moreover, the insertion of the unique word into the transmission data results in the increase in redundancy of the transmission data.

This invention aims at solving above-mentioned problems.

The primary object of the system using the carrier slip compensation method is to detect carrier slip occurrence in the carrier wave recovery circuit of the receiver using the coherent detection, to reduce the effects of carrier slip by correcting data, so as to realize better bit error rate.

It is another object of this invention to simplify the circuit by configuring the adder of the carrier slip compensating circuit with a shift register, an adder, and a delay unit.

It is yet another object of this invention to simplify the circuit by configuring the adder of the carrier slip compensating circuit with a shift register, an exclusive-OR circuit, and an up-down counter.

It is yet another object of this invention to realize accurate peak search by a peak search circuit of the carrier slip compensating circuit based on the timing that the adder output crosses the predetermined threshold value even though there is a difficulty in identifying the peak position due to a number of errors caused by noise.

It is yet another object of this invention to obtain a large diversity effect by performing maximum ratio combination in a combination circuit.

It is yet another object of this invention to simplify the circuit by performing selecting combination in a combination circuit.

It is yet another object of this invention to simplify the circuit by eliminating a discriminator in a carrier slip compensating circuit by making the position of the discriminator right after the coherent detector circuit in performing a selecting combination in the combination circuit.

It is yet another object to achieve better bit error rate by detecting a carrier slip occurrence in the carrier wave recovery circuit of the receiver using coherent detector in the system using the carrier slip compensation method, and by reducing the effects of the carrier slip through data correction. Furthermore, in realizing the configuration of the convolutional encoding for the transmitter and the Viterbi decoding for the receiver, this invention aims at the lowering error rate for the identical $E_b/N_0$.

It is yet another object to improve the coding rate by using the punctured code for the convolutional encoding. Conversely, by lowering the coding rate, it aims at strengthening the error correction capability.

It is yet another object to achieve a large diversity effect when the variation of the receiving signal level is slow due to fading, etc., by differentiating between the delay amount given before the parallel-to-serial converter of the transmitter and the delay amount given to each data sequence after the serial-to-parallel converter of the receiver.

It is yet another object of this invention to achieve a correct demodulator output without deteriorating the bit error rate of the circuit even when the frequency of carrier slip generation is high or the interval of carrier slip generation is short, by using the convolutional encode which is transparent against the code inversion.

It is yet another object to obtain a communication system with excellent preventive measures against interference or interruption and with secrecy by performing spectrum spreading by the transmitter and inverse spreading by the receiver.

It is yet another object to simplify the circuit by omitting the delay circuit which is necessary for the feed forward configuration by feeding the carrier slip compensation signal back to the coherent detector circuit and by making compensation for the carrier slip by rotating the wave detection axis of the coherent detector circuit.

SUMMARY OF THE INVENTION

A communication system of this invention comprises
a transmitter which inputs transmission data, generates delayed data giving a determined time delay to the transmission data, multiplexes the delayed data to no delayed data of the transmission data for generating multiplexed data, modulates the multiplexed data using Binary Phase Shift Keying (BPSK) modulation for generating a transmission signal, and transmits the transmission signal, and
a receiver which receives the transmission signal transmitted by the transmitter as a receiving signal, detects a carrier slip based on the delayed data and the no delayed data included in the receiving signal, compensates the carrier slip, and outputs a demodulated data of the receiving signal.

A communication system of this invention having a transmitter which inputs transmission data, and a receiver which receives the transmission signal transmitted by the transmitter as a receiving signal may comprise the transmitter that may include a transmission delay unit for inputting the transmission data, giving the determined time delay to the input transmission data, and outputting the delayed data, a multiplexer for inputting and multiplexing the transmission data and the delayed data, and outputting the multiplexed data, a BPSK modulator for BPSK modulating the multiplexed data, and the receiver may include a coherent detector circuit for inputting the received signal, generating a carrier wave from the input receiving signal, coherently detecting the received signal based on the carrier wave and outputting a coherent detector signal, a carrier slip compensating circuit for detecting a carrier slip using the coherent detector signal and outputting a compensated receiving signal, a compensated signal separator for separating the compensated receiving signal to a first and a second compensated signals, wherein the first compensated signal corresponds to the transmission data input from the transmitter and the second compensated signal corresponds to the delayed data delayed by the transmission delay unit, a compensated signal delay unit for giving the determined time delay to the first compensated signal and outputting a delay signal, a combination circuit for composing the second compensated signal and the delay signal output from the compensated signal delay unit and outputting a combination signal, and a discriminator for discriminating a phase of the combination signal output from the combination circuit and outputting the demodulated data.

The communication system of this invention may include the transmitter having a transmission delay unit for inputting the transmission data, giving the determined time delay to the input transmission data and outputting the delayed data, a multiplexer for inputting and multiplexing the transmission data and the delayed data, and outputting the multiplexed data, a BPSK modulator for BPSK modulating the multiplexed data; and the receiver which may include a coherent detector circuit for inputting the received signal, generating a carrier wave from the input receiving signal, and coherently detecting the received signal based on the carrier wave, and outputting a coherent detector signal, a discriminator for discriminating the phase of the coherent detector signal and outputting a discriminated data, a carrier slip compensating circuit for detecting a carrier slip in the discriminated data and outputting a compensated receiving data, a compensated data separator for separating the compensated receiving data to a first and a second compensated data, wherein the first compensated data corresponds to the transmission data input at the transmitter and the second compensated data corresponds to the delayed data delayed by the transmission delay unit, a compensated data delay unit for giving the determined time delay to the first compensated data and outputting a delayed data and a combination circuit for combining the second compensated data and the delayed data output from the compensated data delay unit and outputting the demodulated data.

The communication system of this invention may include the transmitter having a convolutional encoder for inputting the transmission data, convolutionally encoding the transmission data, and outputting a first transmission data made up of a plurality of data sequences, a plurality of transmission delay units for giving the determined time delays to the data sequences of the first transmission data corresponding to each of data sequences, and outputting a second transmission data made up of a plurality of delayed data sequences, a multiplexer for multiplexing the first and the second transmission data, and outputting the multiplexed data, a BPSK modulator for modulating the multiplexed data using the BPSK modulation, and the receiver may include a coherent detector circuit for inputting the received signal, generating a carrier wave based on the received signal, coherently detecting the received signal based on the carrier wave, and outputting a coherent detector signal, a carrier slip compensating circuit for detecting the carrier slip in the coherent detector signal, and outputting a compensated receiving signal, a compensated signal separator for separating the compensated receiving signal to a first and a second compensated signals, wherein the first compensated signal includes the plurality of the data sequences corresponding to the first transmission data and the second compensated signal includes the plurality of the data sequences corresponding to the second transmission data, a plurality of compensated signal delay units for giving the determined time delays to the data sequences of the first compensated signal, and outputting a plurality of delay signals, a plurality of combination circuits for combining the data sequences of the second compensated signal and the delay signals output from the compensated signal delay units and outputting combination signals, and a maximum likelihood decoder for maximum likelihood decoding the combination signals output from the combination circuits, and for outputting the demodulated data.

The communication system of this invention may include the transmitter having a convolutional encoder for inputting the transmission data, convolutionally encoding the transmission data and outputting the convolutional encoding data made up of a plurality of data sequences, a first transmission delay unit for giving a first transmission time delay to one of the data sequences of the convolutional encoding data corresponding to the one of the data sequences, and outputting a first transmission data made up of a plurality of delayed data sequences, a second transmission delay unit for giving a second transmission time delay to one of the data sequences of the convolutional encoding data corresponding to the one of the data sequences, and outputting a second transmission data, the multiplexer for multiplexing the first and second transmission data and for outputting the multiplexed data, the BPSK modulator which modulates the multiplexed data using the BPSK modulation, and the receiver may include a coherent detector circuit for inputting the received signal, generating a carrier wave from the input received signal, coherently detecting the received signal based on the carrier wave, and outputting a coherent detector signal, a carrier slip compensating circuit for detecting the carrier slip in the coherent detector signal, and outputting a compensated receiving signal, the compensated signal separator for separating the compensated receiving signal to a first and a second compensated signals, wherein the first signal corresponds to the first transmission data and the second compensated signal corresponds to the second transmission data, a first compensated signal delay unit for giving a first receiving time delay to the first compensated signal corresponding to the one the data sequences, and outputting a first compensated delay signal, a second compensated signal delay unit for giving a second receiving time delay to the second compensated signal corresponding to the one of the data sequences, and outputting a second compensated delay signal, a plurality of combination circuits for combining the delay signals output from the first and the second compensated signal delay units and outputting combination signals, the maximum likelihood decoder for maximum likelihood decoding the combination signals output from the combination circuits, and outputting the modulated data, wherein the sum of the first transmission delay time and the first receiving time delay equals for each of the data sequences and equals the sum of the second transmission delay time and the second receiving delay time for each of the data sequences.

The communication system of this invention may include the transmitter having a differential encoder for inputting the transmission data, differentially encoding the transmission data and outputting differentially encoded transmission data, a convolutional encoder for convolutionally encoding the differentially encoded transmission data, which is transparent encoding to a code inversion, and outputting a first transmission data made up of a plurality of data sequences, a plurality of transmission delay units for giving the determined time delays to the data sequences of the first transmission data corresponding to each of the data sequences, and outputting a second transmission data made up of a plurality of delayed data sequences, a multiplexer for multiplexing the first and the second transmission data, and outputting the multiplexed data, a BPSK modulator for modulating the multiplexed data using the BPSK modulation, and the receiver may include a coherent detector circuit for inputting the received signal, generating a carrier wave from the received signal, coherently detecting the received signal based on the carrier wave, and outputting the coherent detector signal, a carrier slip compensating circuit for detecting a carrier slip in the coherent detector signal, and outputting a compensated received signal, a compensated signal separator for separating the compensated receiving signal to a first and a second compensated signals, wherein the first compensated signal includes the plurality of data sequences corresponding to the first transmission data and the second compensated signal includes a plurality of the data sequences corresponding to the second transmission data, a plurality of compensated signal delay units for giving the determined time delays to the data sequences of the first compensated signal and outputting a plurality of delay signals, a plurality of combination circuits for combining the data sequences of the second compensated signal and the delay signals output from the compensated signal delay units and outputting combination signals, a maximum likelihood decoder for maximum likelihood decoding the combination signals output from the combination circuits, and a differential decoder for differentially decoding an output from the maximum likelihood decoder and outputting the demodulated data.

The communication system of this invention may include the transmitter having a convolutional encoder for inputting the transmission data, convolutionally encoding the transmission data, and outputting a first transmission data made up of a plurality of data sequences, a plurality of transmission delay units for giving determined time delays to the data sequences of the first transmission data and outputting a second transmission data made up of a plurality of delayed data sequences, a multiplexer for multiplexing the first and the second transmission data corresponding to data sequences and outputting the multiplexed data, a BPSK modulator for modulating the multiplexed data using the BPSK modulation, a spreading circuit for spreading spectrum of the BPSK modulated signal, and the receiver may include an inverse spreading circuit for inputting the receiving signal, inverse spreading spectrum of receiving signal, and outputting the inverse spreading signal, a coherent detector circuit for generating a carrier wave from the inverse spreading signal, coherently detecting the inverse spreading signal based on the carrier wave, and outputting the coherent detector signal, a carrier slip compensating circuit for detecting a carrier slip in the coherent detector signal and outputting a compensated receiving signal, a compensated signal separator for separating the compensated receiving signal to a first and a second compensated signals, wherein the first compensated signal includes a plurality of sequences corresponding to the first transmission data and the second compensated signal includes a plurality of data sequences corresponding to the second transmission data, a plurality of compensated signal delay units for giving the determined time delays to the data sequences of the first compensated signal and outputting a plurality of delay signals, a plurality of combination circuits for combining the data sequences of the second compensated signal and the delay signals output from the compensated signal delay units and outputting combination signals, and a maximum likelihood decoder for maximum likelihood decoding the combination signals output from the combination circuits and outputting the demodulated data.

The communication system of this invention may include the transmitter having a convolutional encoder for inputting the transmission data, convolutionally encoding the transmission data, and outputting the first transmission data made up of a plurality of data sequences, a plurality of transmission data delay units for giving the determined time delays to the data sequences of the first transmission data and outputting the second transmission data made up of a plurality of delayed data sequences, a multiplexer for multiplexing the first transmission data and the second transmission data corresponding to the data sequence and outputting the multiplexed data, a spreading circuit for spread modulating the multiplexed data, a BPSK modulator for BPSK modulating the spread modulated signal, and the receiver may include a coherent detector circuit for inputting the receiving signal, generating a carrier wave based on the received signal, coherently detecting the received data, and outputting the coherent detector signal, an inverse spread circuit for spreading the coherent detector signal and outputting the inverse spreading signal, a carrier slip compensating circuit for detecting a carrier slip in the inverse spreading signal and outputting the compensated receiving signal, a receiving signal separator for separating the compensated receiving signal to a first compensated signal and the second compensated signal, wherein the first compensated signal includes a plurality of data sequences corresponding to the first transmission data and the second compensated signal includes a plurality of data sequences corresponding to the second transmission data, a plurality of compensated signal delay units for giving the determined time delays to the data sequences of the first compensated signal and outputting the delay signal, a plurality of combination circuits for combining the data sequences of the second compensated signal and the delay signals output from the compensated signal delay units and outputting a plurality of combination signals, and a maximum likelihood decoder for maximum likelihood decoding the combination signals output from the combination circuits and outputting the demodulated data.

The communication system of this invention may include the transmitter having a differential encoder for inputting the transmission data and differentially encoding the transmission data, a convolutional encoder for convolutionally encoding the differentially encoded transmission data which is transparent encoding to a code inversion, and outputting a first transmission data made up of a plurality of data sequences, a plurality of transmission delay units for giving the determined time delays to the data sequences of the first transmission data and outputting the second transmission data made up of a plurality of data sequences, a multiplexer for multiplexing the first and the second transmission data and outputting the multiplexed data, a BPSK modulator for modulating the multiplexed data using the BPSK modulation, a spread circuit for spreading spectrum of the BPSK modulated signal, and the receiver may include an inverse spread circuit for inputting the received signal, and spreading the received signal, and outputting the inverse spreading signal, a coherent detector circuit for generating a carrier wave from the inverse spreading signal, coherently detecting the inverse spreading signal based on the carrier wave, and outputting the coherent detector signal, a carrier slip compensating circuit for detecting a carrier slip in the coherent detector signal and outputting the compensated receiving signal, a compensated signal separator for separating the compensated receiving signal to a first and a second compensated signals, wherein the first compensated signal includes a plurality of data sequences corresponding to the first transmission data and the second compensated signal includes a plurality of data sequences corresponding to the second transmission data, a plurality of compensated signal delay units for giving the determined time delays to the data sequences of the first compensated signal and outputting a plurality of delay signals, a plurality of combination circuits for combining the data sequences of the second compensated signal and the delay signals output from the compensated signal delay unit and outputting a plurality of combination signals, a maximum likelihood decoder for maximum likelihood decoding the combination signals output from the combination circuits and outputting the modulated data, and a differential decoder for differentially decoding an output from the maximum likelihood decoder and outputting the modulated data.

The communication system of this invention may include the transmitter having a differential encoder for inputting the transmission data and differentially encoding the transmission data, a convolutional encoder for convolutionally encoding the differentially encoded transmission data, which is transparent encoding to a code inversion, and outputting a first transmission data made up of a plurality of data sequences, a plurality of transmission delay units for giving the determined time delays to the data sequences of the first transmission data corresponding to each of the data sequences, and outputting a second transmission data made up of a plurality of delayed data sequences, a multiplexer for multiplexing the first and the second transmission data and outputting the multiplexed data, a spread circuit for spreading spectrum of the multiplexed data, a BPSK modulator for modulating the spreading spectrum of the transmission data using the BPSK modulation, and the receiver may include a coherent detector circuit for inputting the received signal, generating a carrier wave from the received signal, and coherently detecting the received signal based on the carrier wave, and outputting the coherent detector signal, an inverse spread circuit for inversely spreading the coherent detector signal and outputting the inverse spreading signal, a carrier slip compensating circuit for detecting a carrier slip in the inverse spreading signal and outputting the compensated receiving signal, a compensated signal separator for separating the compensated receiving signal to a first and a second compensated signals, wherein the first compensated signal includes the plurality of data sequences corresponding to the first transmission data and the second compensated signal includes a plurality of the data sequences corresponding to the second transmission data, a plurality of compensated signal delay units for giving the determined time delays to the data sequences of the first compensated signal and outputting a plurality of delay signals, a plurality of combination circuits for combining the data sequences of the second compensated signal and the delay signals output from the compensated signal delay units and outputting combination signals, a maximum likelihood decoder for maximum likelihood decoding the combination signals output from the combination circuit, and a differential decoder for differentially decoding the output from the maximum likelihood decoder and outputting the demodulated data.

The communication system of this invention may include the carrier slip compensating circuit having a discriminator for discriminating a phase of the coherent detector signal and outputting discriminated data, a receiving data separator for separating the discriminated data to a first receiving data corresponds to the transmission data and a second receiving data corresponds to the delayed data, a receiving data delay unit for giving the determined time delay to the first receiving data, and a carrier slip detector circuit for sequentially comparing the first receiving data delayed by the receiving data delay unit with the second receiving data, detecting a peak position where the sum of the number of mismatched bits becomes the largest exceeding the determined value, and outputting a detected result, and a phase rotation circuit for rotating the phase of the coherent detector signal of the coherent detector circuit based on the detected result of the carrier slip compensating circuit to generate a compensated receiving signal, and outputting the compensated receiving signal.

The communication system of this invention may include the carrier slip compensating circuit having a receiving data separator for separating the discriminated data to a first receiving data corresponding to the transmission data and a second receiving data corresponding to the delayed transmission data, a receiving data delay unit for giving the determined time delay to the first receiving data, and a carrier slip detector circuit for sequentially comparing the first receiving data delayed by the receiving data delay unit with the second receiving data, detecting a peak position where the number of mismatched bits becomes the largest exceeding the determined value, and outputting a detected result, and a phase rotation circuit for rotating the phase of the discriminated data of the discriminator based on the detected result of the carrier slip detector circuit to generate a compensated receiving data and outputting the compensated receiving data.

The communication system of this invention may include the carrier slip compensating circuit having a discriminator for discriminating a phase of the coherent detector signal and outputting the discriminated data, a receiving data separator for separating the discriminated data to a first receiving data and a second receiving data, wherein the first receiving data includes a plurality of data sequences corresponding to the first transmission data and the second receiving data includes a plurality of data sequences corresponding to the second transmission data, a plurality of receiving data delay units for giving the determined time delays to the data sequences of the first receiving data and outputting the first delayed receiving data, and a carrier slip detector circuit for sequentially comparing the first delayed receiving data corresponding to the data sequence with the second receiving data corresponding to the data sequence, detecting a peak position where the number of mismatched bits becomes the largest exceeding the determined value, and outputting a detected result, and a phase rotation circuit for rotating the phase of the coherent detector signal of the coherent detector circuit based on the detected result of the carrier slip detector circuit to generate a compensated receiving signal and outputting the compensated receiving signal.

The communication system of this invention may include the carrier slip compensating circuit having a discriminator for discriminating a phase of the coherent detector signal and outputting the discriminated data, a receiving data separator for separating the discriminated data to a first receiving data and a second receiving data, wherein the first receiving data includes a plurality of data sequences corresponding to the first transmission data and the second receiving data includes a plurality of data sequences corresponding to the second transmission data, a first receiving data delay unit for giving a first receiving time delay to one of the data sequences of the first receiving data corresponding to the one of the data sequences and outputting the first delayed receiving data, a second receiving data delay unit for giving a second receiving time delay to one of the data sequences to the second receiving data corresponding to the one of the data sequences and outputting the second delayed receiving data, and a carrier slip detector circuit for sequentially comparing the first delayed receiving data with the second delayed receiving data, detecting a peak position where the number of mismatched bits becomes the largest exceeding the determined value, and outputting a detected result, a phase rotation circuit for rotating the phase of the coherent detector signal of the coherent detector circuit based on the detected result of the carrier slip detector circuit to generate a compensated receiving signal and outputting the compensated receiving signal.

The communication system of this invention may include the carrier slip detector circuit having a comparator for sequentially comparing the first delayed receiving data with the second receiving data and outputting a comparison result of matched and mismatched in a bit sequence, a shifting adder including a shift register for sequentially memorizing the bit sequence output from the comparator, and an adder for obtaining a summing value of a bit value of the bit sequence output from the comparator and a bit value of the bit sequence stored in the shift register, and a peak detector for detecting the peak position where the summing value output from the adder becomes the largest exceeding the determined value and outputting the detected result.

The communication system of this invention may include the carrier slip detector circuit having a comparator for sequentially comparing the first delayed receiving data with the second receiving data and outputting a comparison result of matched and mismatched in a bit sequence, a shift register for sequentially memorizing the bits sequences output from the comparator, an updown counter for comparing the bit sequence output from the comparator with a bit value of the bit sequence output from the shift register, and uncounting if the values are the same, and counting if the values are different, a peak detector for detecting the peak position where a counting value from the updown counter becomes the largest exceeding the determined value and outputting the detected result.

The communication system of this invention may include the carrier slip detector circuit having a comparator for sequentially comparing the first delayed receiving data with the second receiving data and outputting a compared result of matched and mismatched in a bit sequence, a shifting adder including a shift register for sequentially storing and outputting the bit sequence output from the comparator and an adder for obtaining a difference value between the summing value of a bit value of the bit sequence output from the comparator and a bit value to which a predetermined time delay has been given to a bit sequence output from the adder and a bit value of the bit sequence output from the shift register, and a peak detector for detecting a peak position where the difference value from the adder becomes the largest exceeding the determined value and outputting the detected result.

The communication system of this invention may include the peak detector which detects the peak position according to the time period during which the value once exceeds and then falls below the determined value and outputs the detected result.

The communication system of this invention may include the combination circuit which combines the second compensated signal and the delayed signal output from the compensated signal delay unit with the same weight.

The communication system of this invention may include the combination circuit which compares a receiving level of the second compensated signal with a receiving level of the delayed signal output from the compensated signal delay unit and weighs the second compensated signal and the delayed signal proportionally based on the receiving levels and composes the signals.

The communication system of this invention may include the combination circuit which selects and outputs one of the first and the second compensated signals based on receiving levels of the first compensated signal and of the second compensated signal at the time of the first compensated signal reception and the second compensated signal reception.

The communication system of this invention may include the combination circuit which selects and outputs one of the first and the second compensated data based on signal levels of the first compensated data and of the second compensated data at the time of the first compensated data reception and the second compensated data reception.

The communication system of this invention may include the carrier slip compensating circuit which rotates the phase of the carrier wave generated by the coherent detector circuit based on the carrier slip detection result, and wherein the compensated signal separator separates the coherent detector signal output from the coherent detector circuit to the first and second compensated signals.

The communication system of this invention may include the carrier slip compensating circuit which rotates the phase of the carrier wave generated by the coherent detector circuit based on the carrier slip detection result, and wherein the compensated data separator separates the coherent detector signal output from the coherent detector circuit to the first and the second compensated data.

BRIEF DESCRIPTION OF THE DRAWINGS

Other objects features, and advantages of the invention will be apparent from the following description when taken in conjunction with the accompanying drawings.

In the drawings,

FIG. 2 illustrates the input/output data of parallel-to-serial conversion circuit of Embodiment 1;

FIG. 4 illustrates the input/output data of the serial-to-parallel converter within the carrier slip compensating circuit of Embodiment 1;

FIG. 6 shows the input/output data of the exclusive-OR circuit and adder output within the carrier slip compensating circuit of Embodiment 1;

FIGS. 11A and 11B show the configuration of the shift register and the adder within the carrier slip compensating circuit according to Embodiments 2 and 3;

FIG. 18 shows the configuration of the combination circuit according to Embodiment 6;

FIGS. 20A and 20B show the configuration of the communications system according to Embodiment 8;

FIG. 21 illustrates the input/output data of the parallel-to-serial conversion circuit according to Embodiment 8;

FIG. 24 illustrates the input/output data of the serial-to-parallel conversion circuit within the carrier slip compensating circuit at the carrier slip occurrence according to Embodiment 8;

FIGS. 30A and 30B show the communication system configurations according to Embodiment 11;

FIG. 31 shows the combination of the convolutional encoder according to Embodiment 11;

FIGS. 32A and 32B illustrate the occurrence of errors caused by a carrier slip according to Embodiment 11;

FIGS. 34A and 34B show the communication system configurations according to Embodiment 12;

FIGS. 35A and 35B show the communication system configurations of Embodiment 12;

Figures 48A, 48B:
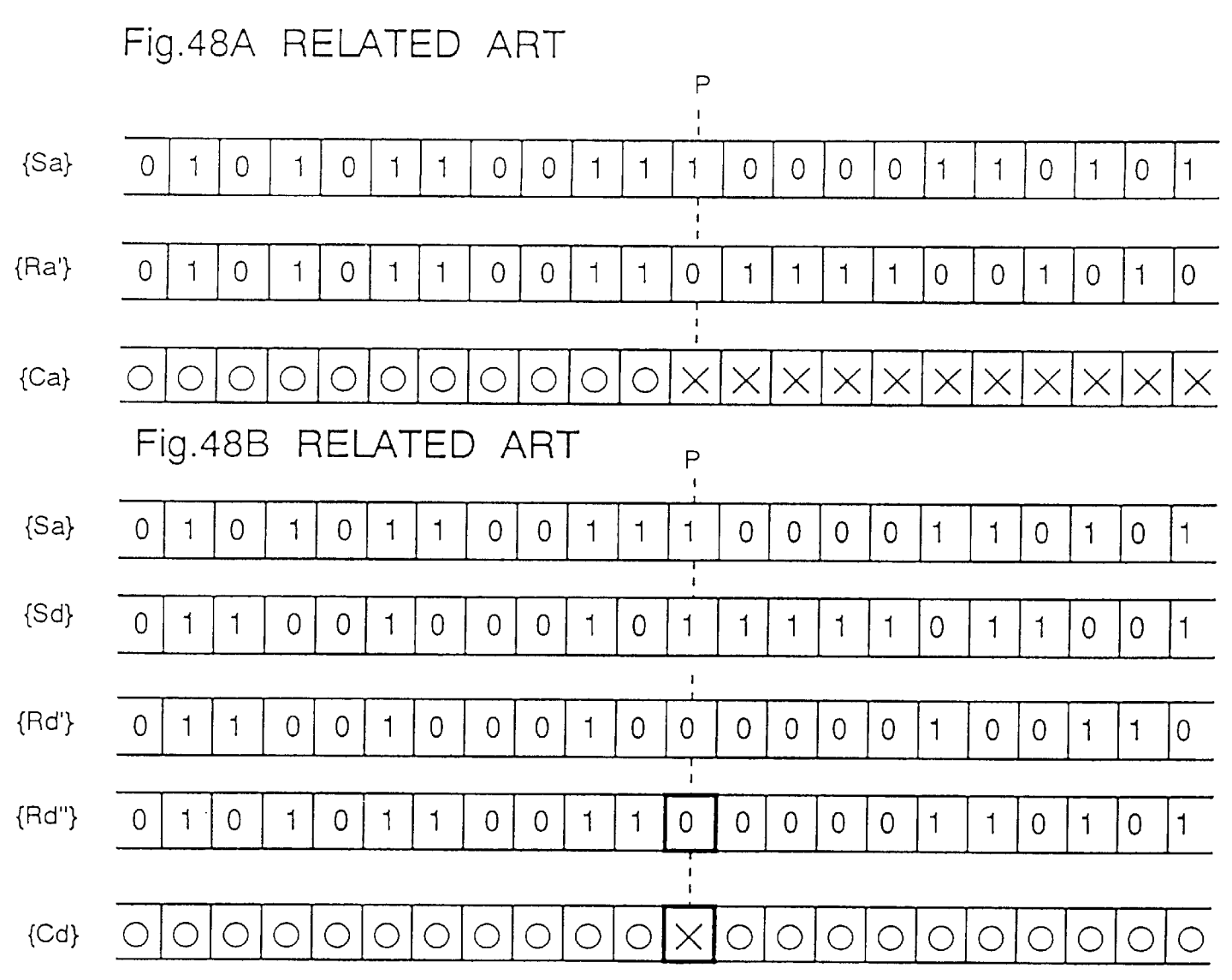

FIGS. 48A and 48B illustrate the error occurrence due to a carrier slip in the conventional communications system;

Figures 49A, 49B:
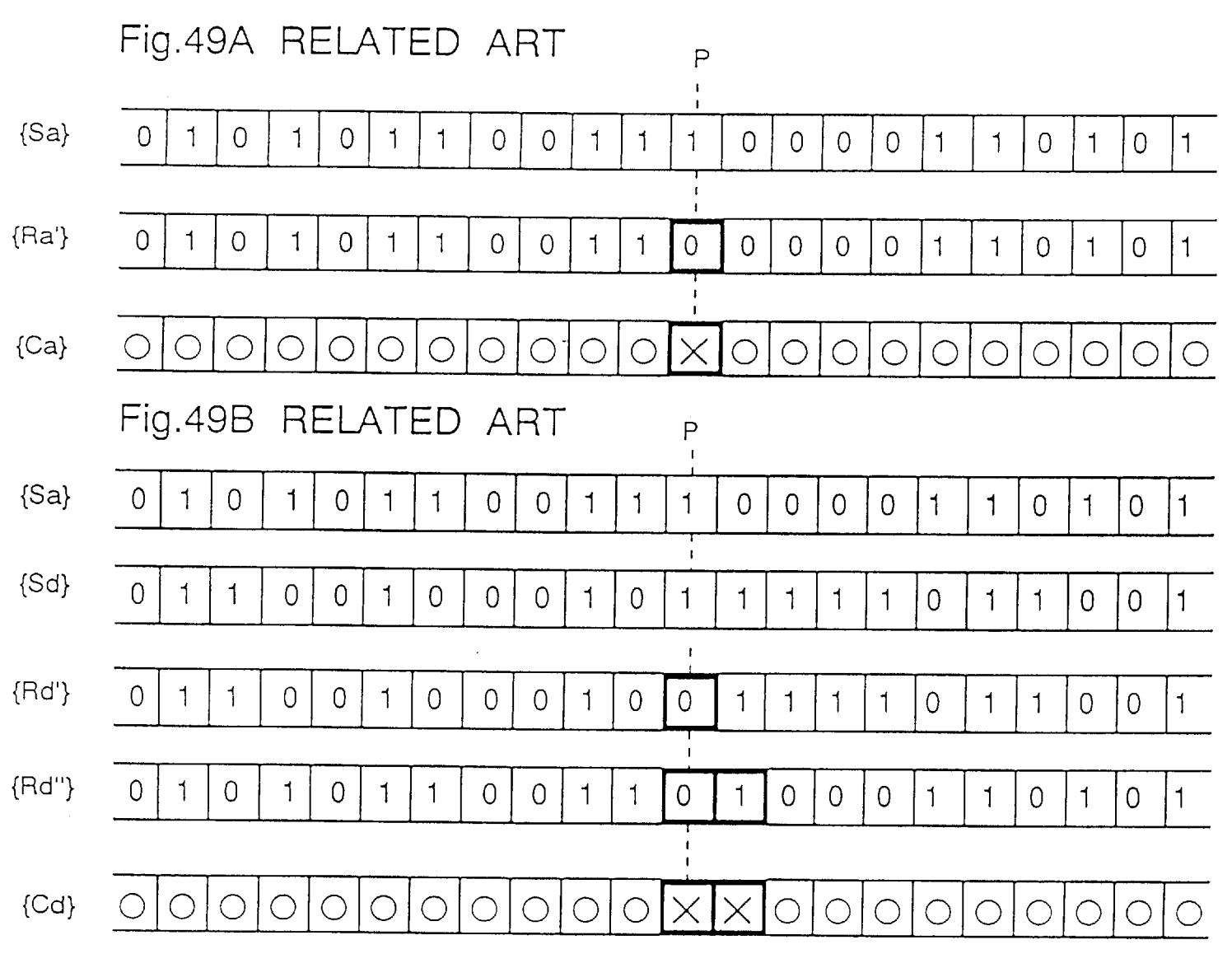

FIGS. 49A and 49B illustrate the error occurrence due to noise in the conventional communication system;

DESCRIPTION OF THE PREFERRED EMBODIMENTS

Embodiment 1

This embodiment describes that a receiver detects a carrier slip through coherent detection and compensates it by transmitting identical data at differentiated timing and performing BPSK modulation.

Figure 1A:
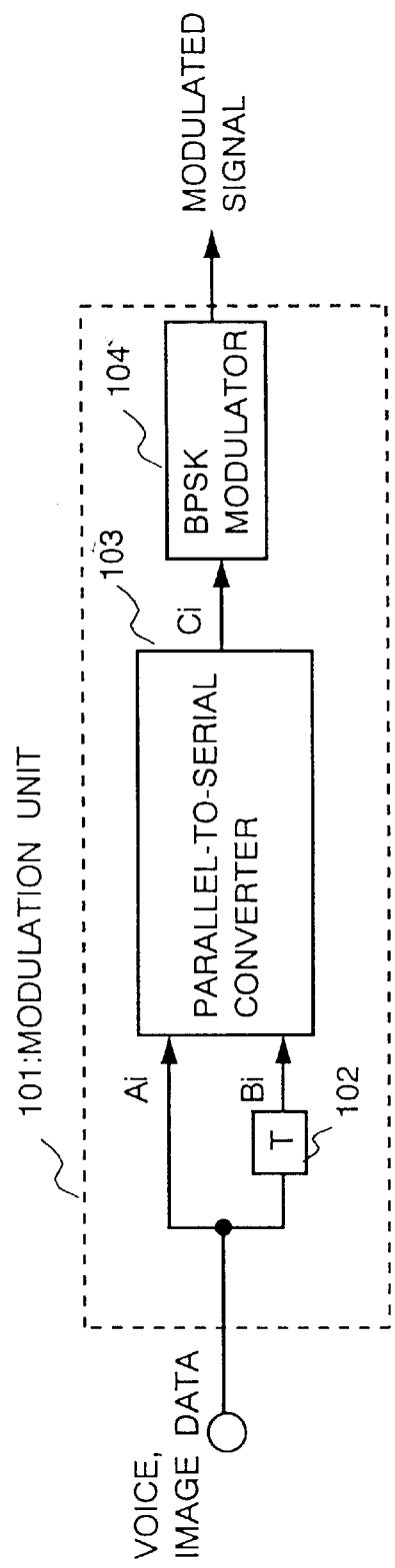
FIGS. 1A and 1B show the communication system configuration of Embodiment 1.
Figure 1B:
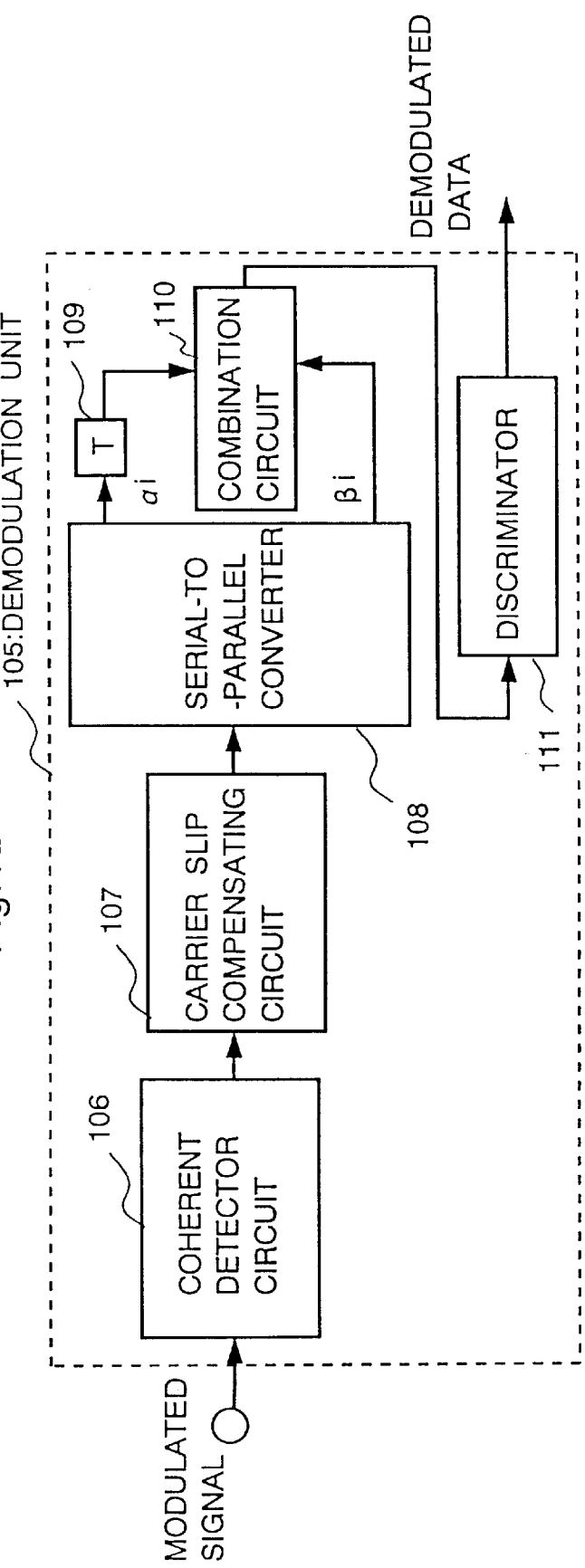

FIGS. 1A and 1B show the communication system configuration of this embodiment. In FIG. 1A, a modulation unit 101 of a transmitter is shown. Delay units 102 and 109 have the delay time equivalent to the N-bit data time period T, and a parallel-to-serial converter (one example of a multiplexer) 103 converts parallel data into serial data to multiplex the identical data at differentiated timing. A BPSK modulator 104 is also shown. In FIG. 1B, a demodulation unit 105 of the receiver is shown. A coherent detector circuit 106 is the same as the one illustrated in conventional example 1.

A carrier slip compensating circuit 107 is provided. A serial-to-parallel converter (one example of a compensated signal separator) 108 converts serial data into parallel data to separate multiplied data. A combination circuit 110, and a discriminator 111 are shown.

Next, the operation is explained. In FIGS. 1A and 1B, data such as voice, image, etc., is converted into digital signal by a voice encoder, and so on, to make data sequence to be transmitted. Data sequence to be transmitted is input into modulation unit 101 and branched to two units, one of which is input directly to parallel-to-serial converter 103. The other unit is given delay time T at delay unit 102, which is equivalent to N-bit data time period T. Parallel-to-serial converter 103 converts (multiplexes) two parallel input data sequences into the serial data sequence having the double data rate of the input data sequence.

Data conversion at parallel-to-serial converter 103 is explained using a figure. FIG. 2 illustrates time chart of the data sequence $\{A_i\}$ (where i being an integer) to be transmitted, the data sequence $\{B_i\}$ which is given N-bit delay corresponding to delay time T to $\{A_i\}$ by the delay unit 102, and $\{C_i\}$ which is the output of parallel-to-serial converter 103. From FIG. 2, the relationship between $\{A_i\}$ and $\{B_i\}$ can be expressed as:

$$B_i = A_{i-N}$$

The output $\{C_i\}$ from parallel-to-serial converter 103 can be expressed as below by $\{A_i\}$ and $\{B_i\}$:

$$C_i = \{C_{i,1}, C_{1,2}\} = \{A_i, B_i\} = \{A_i, A_{i-N}\}$$

Figure 44:
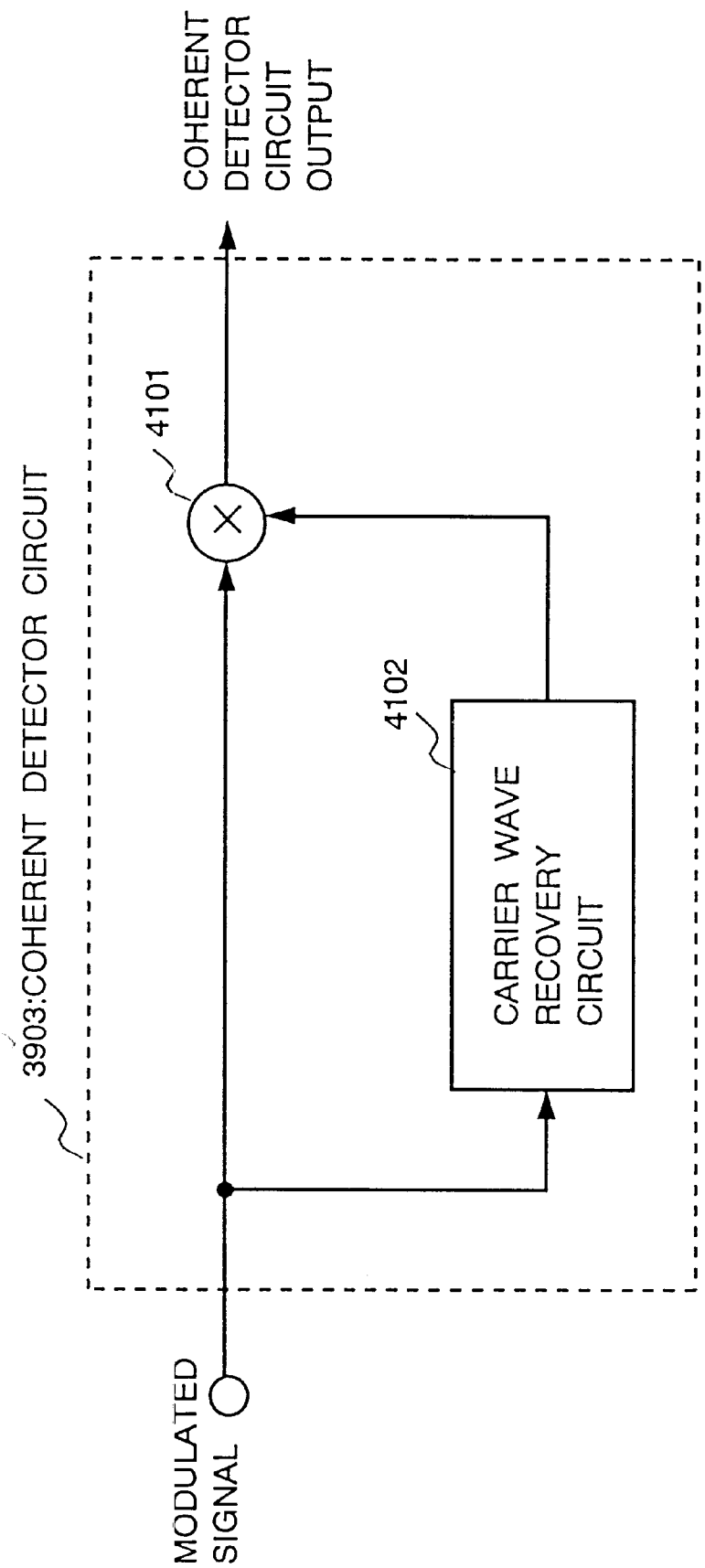
FIG. 44 shows the configuration of the conventional coherent detector circuit.
Figure 45:
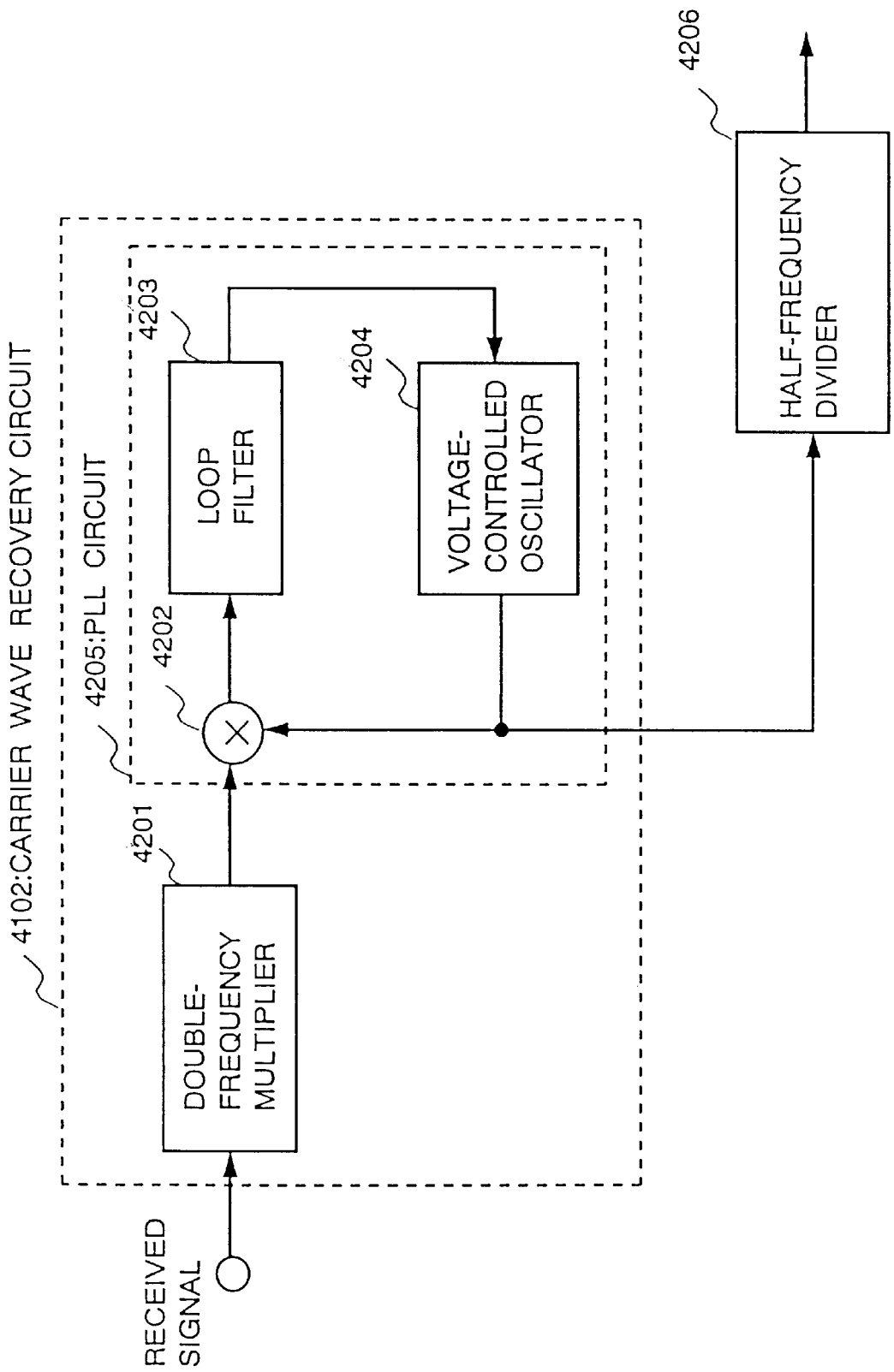
FIG. 45 shows the configuration of the conventional carrier wave recovery circuit.
Figure 46A:
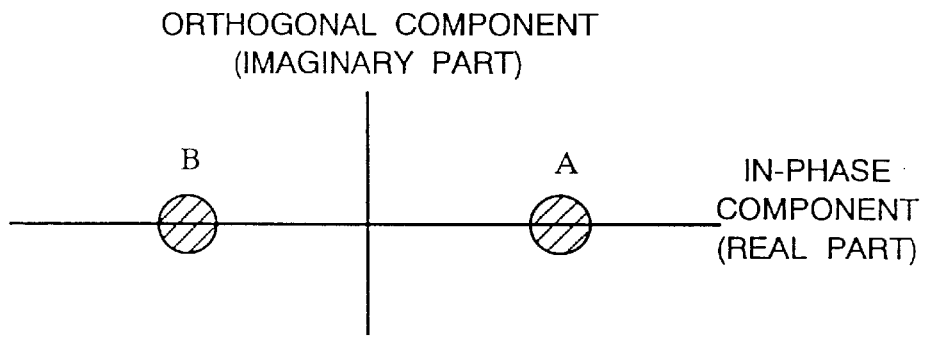
FIGS. 46A, 46B, 46C, and 46D explain the phase ambiguity of the conventional BPSK modulation system.
Figure 46B:
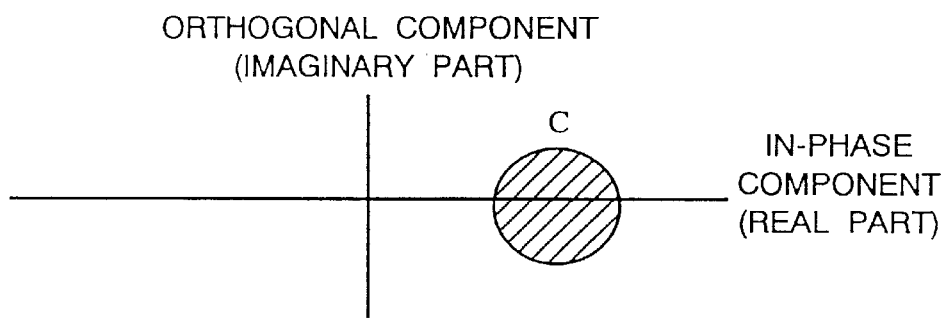
Figure 46C:
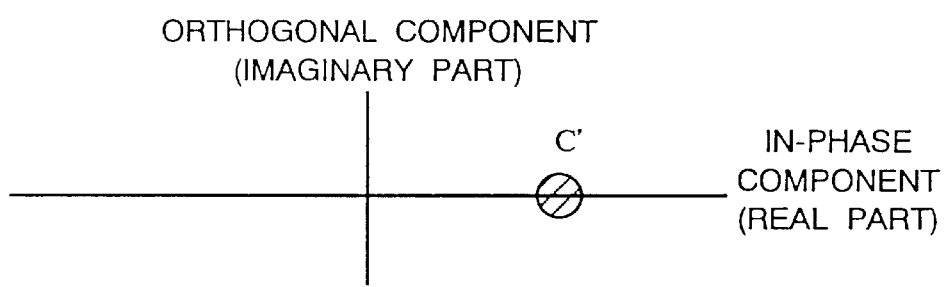
Figure 46D:
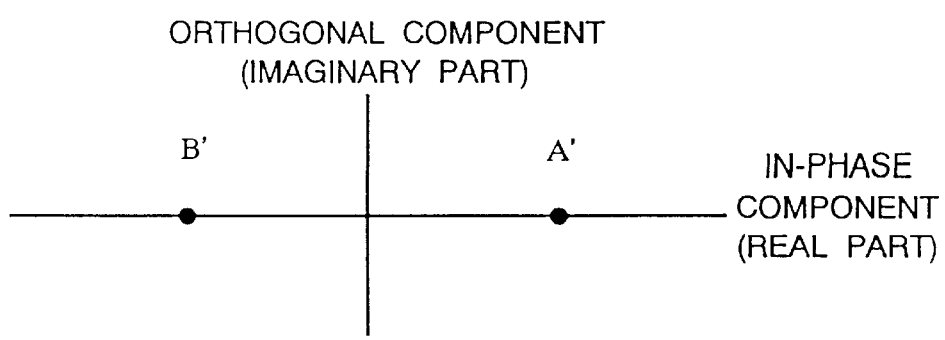
Figure 47:
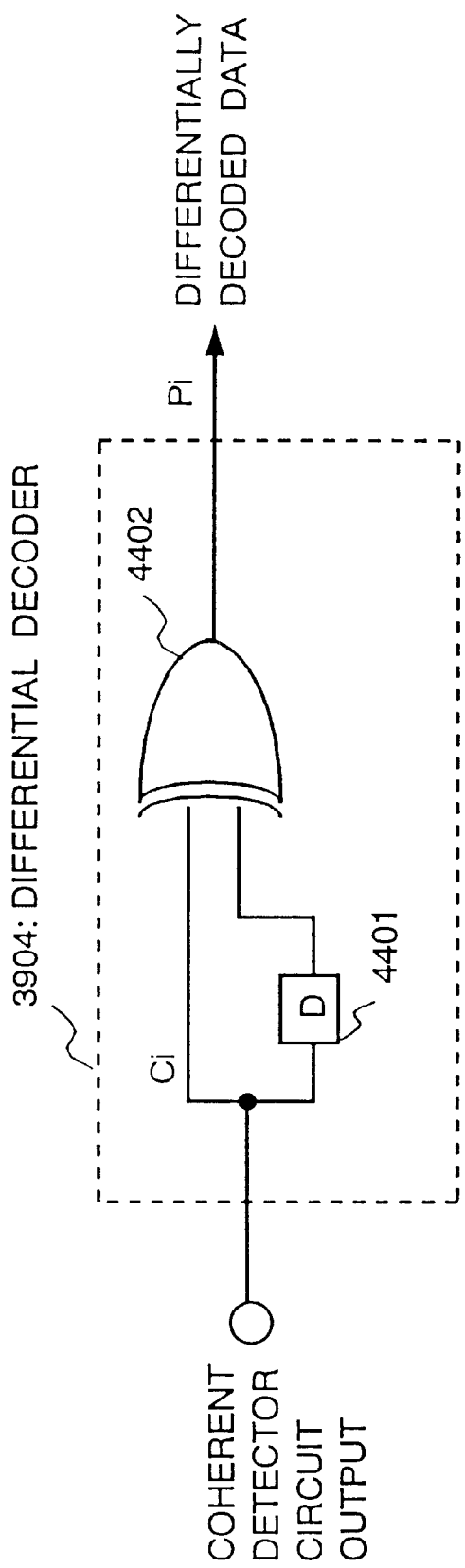
FIG. 47 shows the configuration of the conventional differential decoder.
Figure 50A:
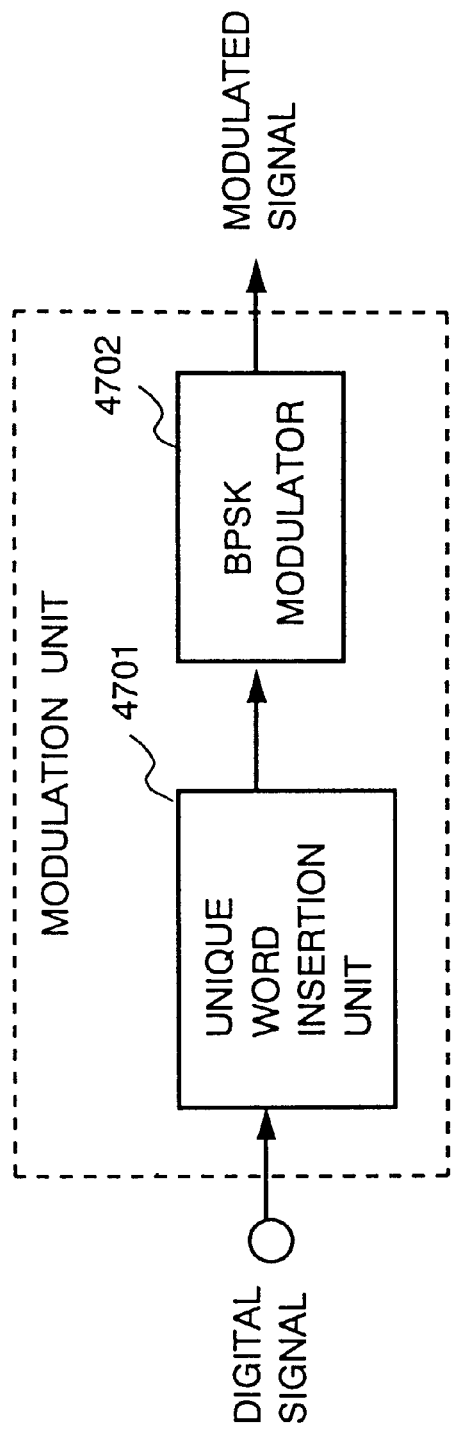
FIGS. 50A and 50B show the configuration of the conventional receiver.
Figure 50B:
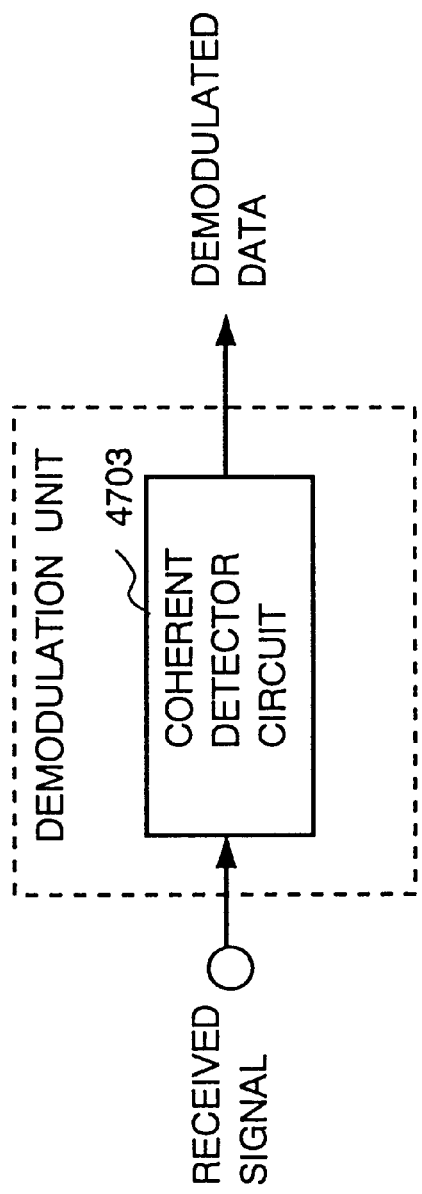
Figure 51:
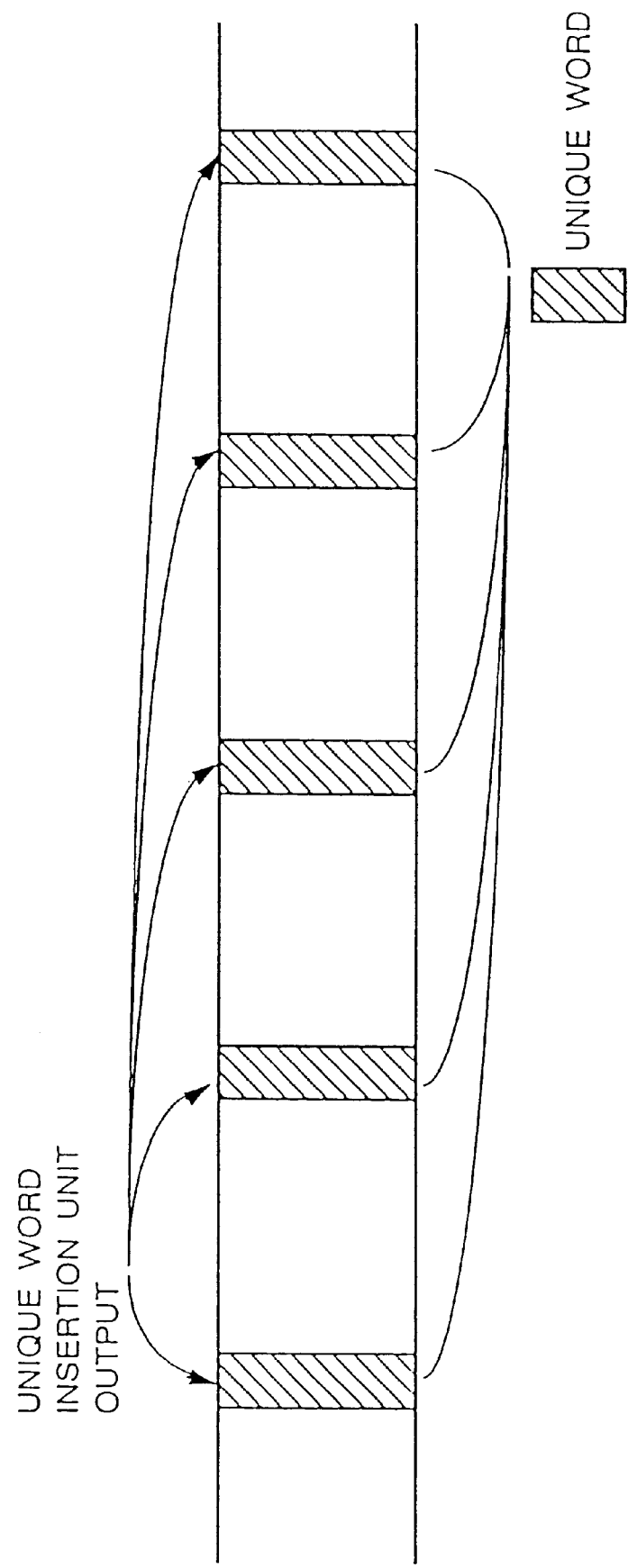
FIG. 51 shows the data transmission in the conventional communication system.
Figure 52:
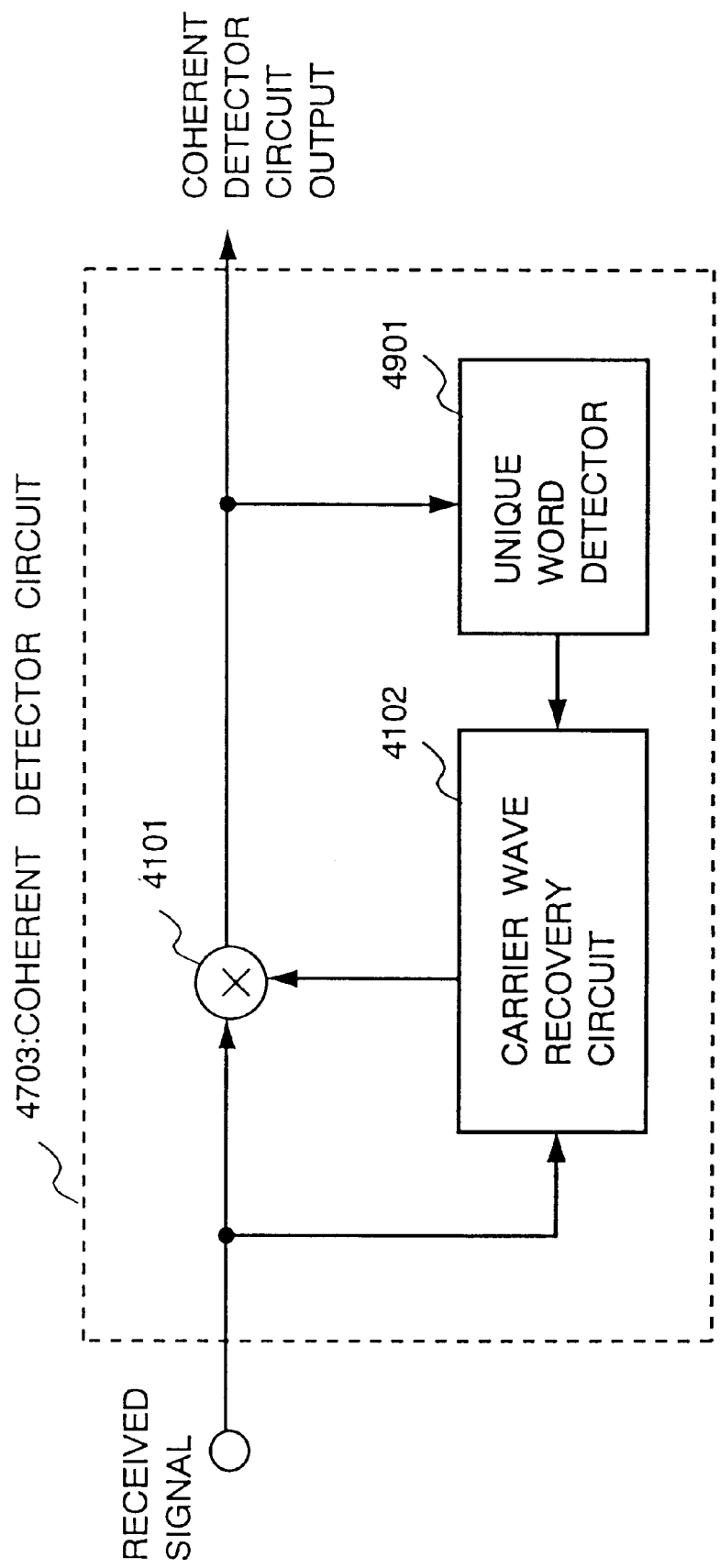
FIG. 52 shows the configuration of the conventional coherent detector circuit.
Figure 53:
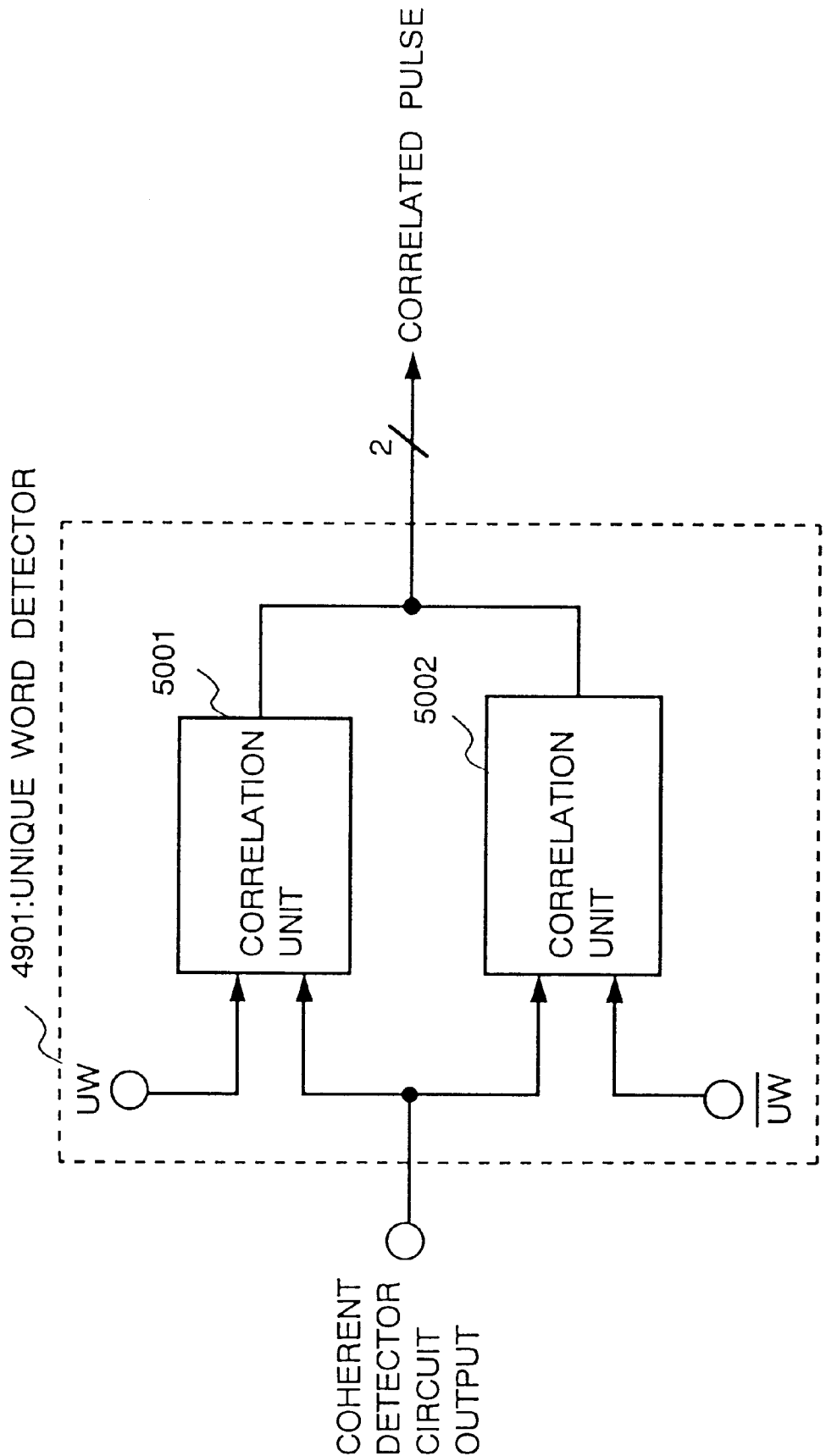
FIG. 53 shows the configuration of the conventional unique word detector.

The output $C_i$ from parallel-to-serial converter 103 of FIG. 1A is BPSK modulated by BPSK modulator 104. After the modulated signal is amplified by the radio-frequency amplifier, etc., it is transmitted (not shown). Transmitted radio wave is received by the receiver, and after it is amplified by a radio-frequency amplifier, etc. (not shown), it is input into demodulation unit 105 and coherently detected by coherent detector circuit 108. Coherent detector circuit 106 is the same as the one shown in FIG. 44 for the related art. The output from coherent detector circuit 106 is input into carrier slip compensating circuit 107 to compensate carrier slip.

Figure 3:
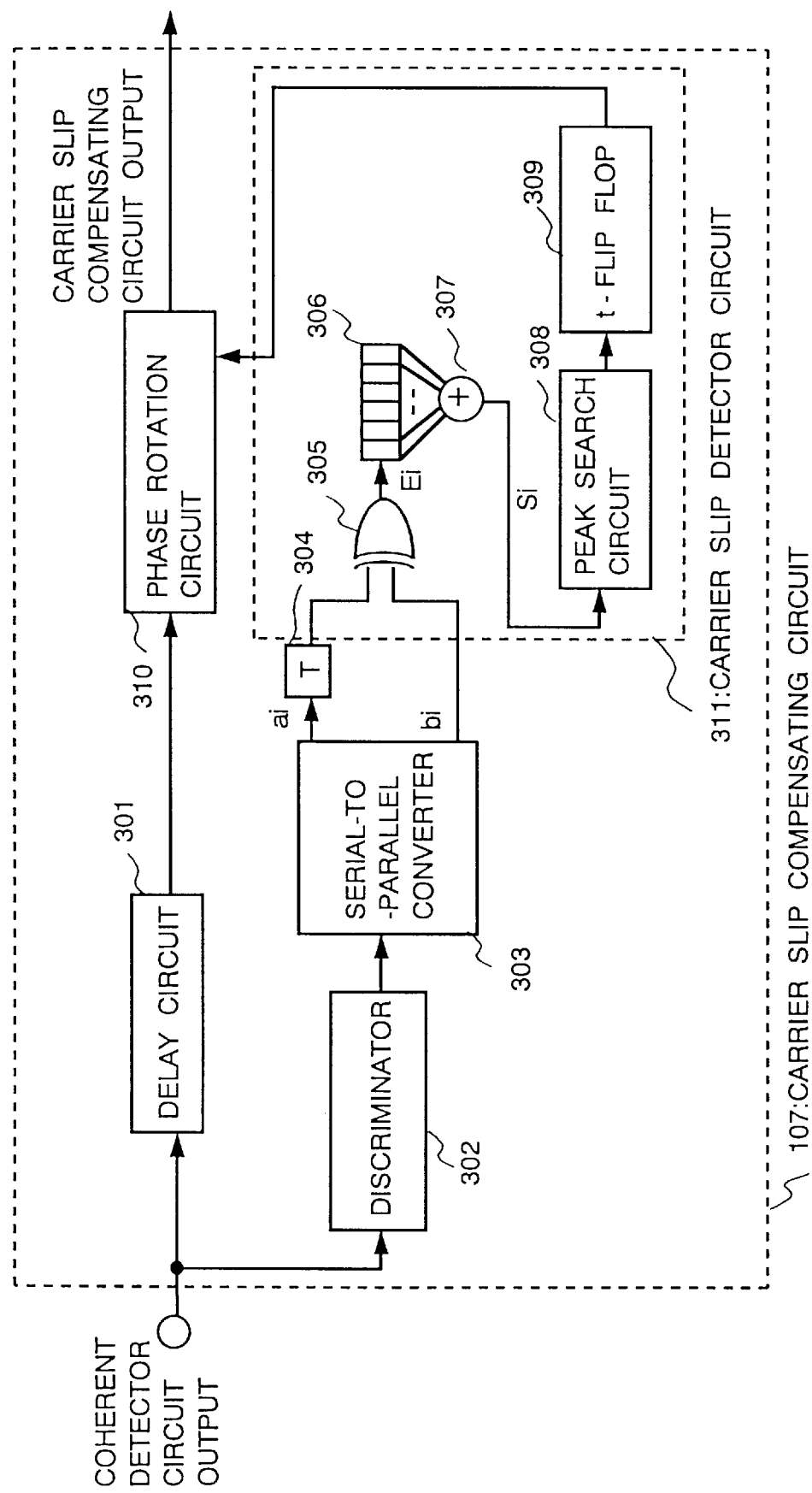
FIG. 3 shows the configuration of the carrier slip compensating circuit of Embodiment 1.

The operation of carrier slip compensation circuit 107 is explained using a figure. FIG. 3 shows a configuration example of carrier slip compensating circuit 107. In FIG. 3, a delay circuit 301, a discriminator 302, and a serial-to-parallel converter 303 which separates multiplexed data are shown. A delay unit 304 has the delay time equivalent to N-bit data time period T. An exclusive-OR circuit 305, a shift register 306, an adder 307, a peak search circuit 308, a t-flip flop 309, a phase rotation circuit 310, and a carrier slip detector circuit 311 are illustrated. The shift register 306 and the adder 307 configure a shifting adder.

Next, the operation is explained.

Figure 9:
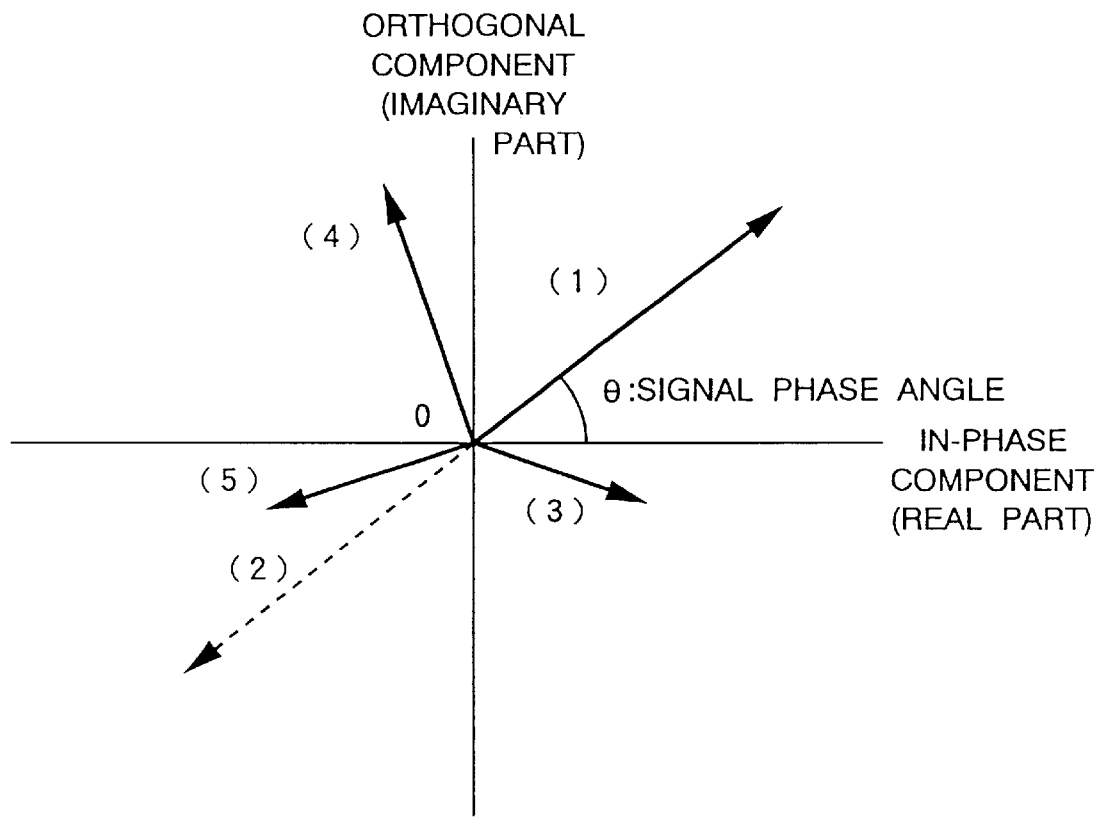
FIG. 9 illustrates the operation of the phase rotation circuit according to Embodiment 1.

The output from coherent detector circuit 106 is input into carrier slip compensating circuit 107. The input is branched to two units, one of which is given a predetermined delay by delay circuit 301 and then input into phase rotation circuit 310. The other is input into discriminator 302. Discriminator 302 checks and decides whether the code of coherent detector circuit output vector is 1 or 0. Namely, discriminator 302 outputs value 1 or value 0 according to the real part "re" of the coherent detector output vector. In case of BPSK modulation, a polarity of the receiving signal is decided by sign (+ or −) of in-phase component of coherent detector circuit output vector after coherent detection. The coherent detector circuit output vector is represented by complex number. In-phase component of the coherent detector circuit output vector is real part "re" of the complex number. Orthogonal component of the coherent detector circuit output vector is imaginary part of the complex number. For example, as shown in FIG. 9, in case of coherent detector circuit output vector (1) or (3), the polarity becomes value 1. In case of coherent detector circuit output vector (4) or (5), the polarity value becomes 0.

$$c_i = \begin{cases} 0 & (re \geq 0) \\ 1 & (re < 0) \end{cases} \qquad \text{[Equation 3]}$$

Data sequence $\{c_i\}$ output from discriminator 302 is input into serial-to-parallel converter 303, and converted (separated) into two data sequences having half data rate of the input data sequence. Of the outputs from serial-to-parallel converter 303, the data sequence given delay time T at the transmitting side is directly input into exclusive-OR circuit 305, and of the outputs from serial-to-parallel converter 303, the data sequence which is not given delay time T at the sending side is input into delay unit 304 having the delay time equivalent to N-bit data time period T, and then input into exclusive-OR circuit 305.

The data conversion at serial-to-parallel converter 303 is explained using FIG. 4. FIG. 4 illustrates time chart of the data sequence $\{c_i\}$ output from discriminator 302, data sequence $\{a_i\}$ which is not given delay at the transmitting side among the outputs from serial-to-parallel converter 303, and data sequence $\{b_i\}$ which is given delay time T equivalent to N-bit data period at the sending side by delay unit 102. As shown in FIG. 4, the relationship among $\{c_i\}$, $\{a_i\}$, and $\{b_i\}$ is expressed as below.

$$c_i = \{c_{i,1}, c_{i,2}\} = \{a_i, b_i\}$$

If errors caused by noise is ignored for taking only the effects of carrier slip into consideration, because $\{b_i\}$ is given delay time T to $\{a_i\}$ at transmission, the relationship between $\{a_i\}$ and $\{b_i\}$ can be expressed as below using the number of bits N per time period T.

$$b_i = a_{i-N}$$

Based on the above, $\{c_i\}$ can be expressed as below using $\{a_i\}$.

$$c_i = \{a_i, a_{i-N}\}$$

Output $C_i$ from parallel-to-serial converter 103 of FIG. 1A at transmission, e.g., $C_i = \{A_i, A_{i-N}\}$ of FIG. 2, is assumed to correspond to input $c_i = \{a_i, a_{i-N}\}$ of serial-to-parallel converter 303 of FIG. 3 at receiving time, but $C_i = \{A_i, A_{i-N}\}$ could correspond to $c_i = \{a_{i-N-1}, a_i\}$ at receiving time due to shifting of transmission timing and receiving timing. A specific pattern such as a pseudo-random pattern is assumed to be transmitted prior to data transmission here for making synchronization in advance so that $C_i = \{A_i, A_{i-N}\}$ would correspond to $c_i = \{a_i, a_{i-N}\}$ at receiving time.

Assume that a carrier slip has just occurred. Because the stable point of the carrier is symmetrical to the origin in the signal space when the BPSK modulation is applied, the code of coherent detector output after the carrier slip occurrence would be thoroughly inverted.

Figure 5:
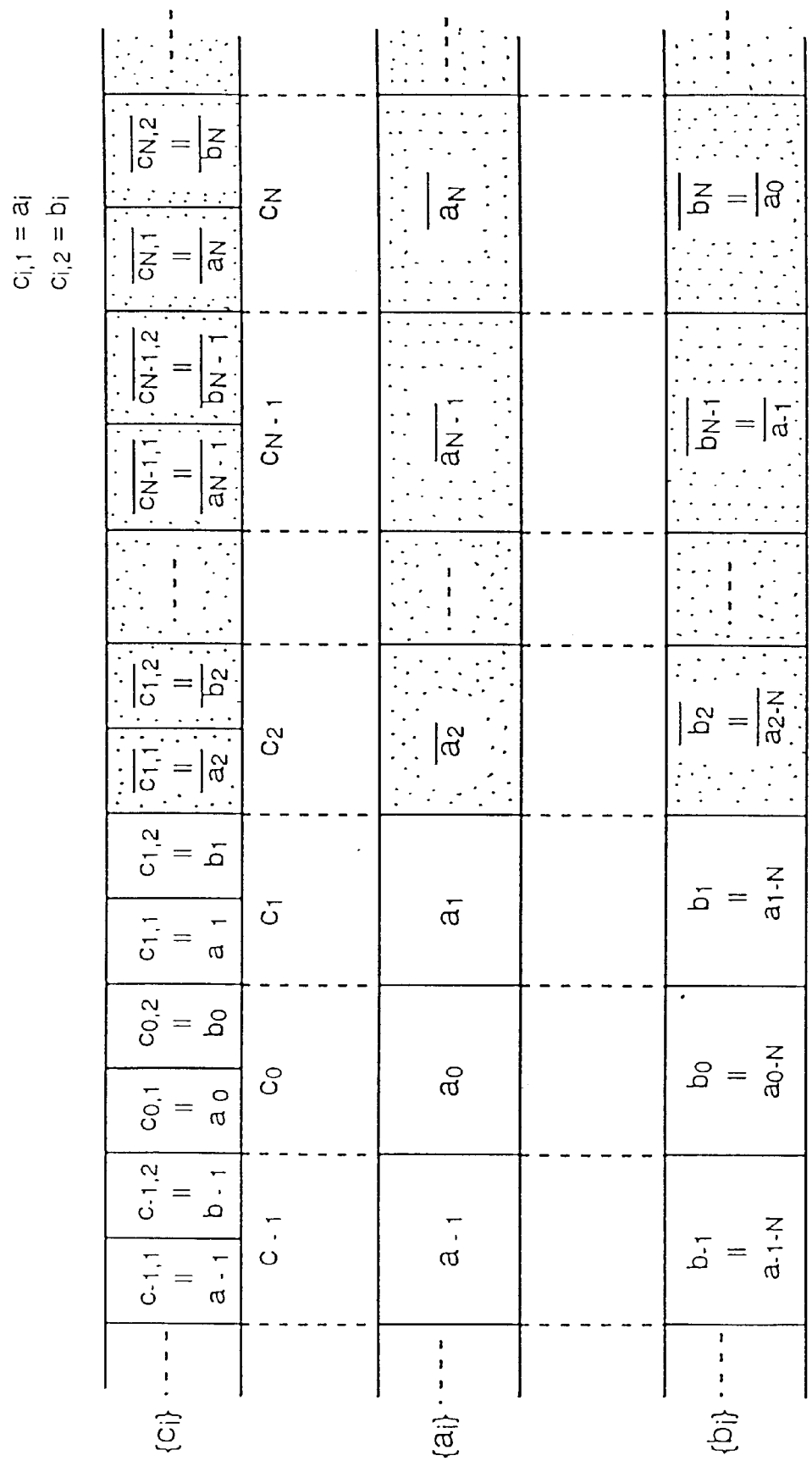
FIG. 5 illustrates the input/output data of the serial-to-parallel conversion circuit within the carrier slip compensating circuit at the carrier slip occurrence of Embodiment 1.

Code inversion caused by a carrier slip is explained using FIG. 5. FIG. 5 shows time chart of $\{c_i\}$, $\{a_i\}$, and $\{b_i\}$ when a carrier slip is assumed to have occurred at receiving time of data $a_2$, in data sequence $\{c_i\}$ output from discriminator 302. The dotted areas in the figure indicate the data with inverted codes, and the bar is placed over data code. That is, $\{c_i\}$ can be expressed as follows:

$$\{c_i\} = \{\ldots a_1, b_1, \bar{a}_2, \bar{b}_2, \bar{a}_3, \bar{b}_3, \ldots\} \qquad \text{[Equation 4]}$$

Output $\{a_i\}$, $\{b_i\}$ from the serial-to-parallel converter at this time can be expressed as below.

$$\{a_i\} = \{ \ldots a_1, \overline{a}_2, \overline{a}_3, \overline{a}_4, \overline{a}_5, \ldots \}$$ [Equation 5]

$$\{b_i\} = \{ \ldots b_1, \overline{b}_2, \overline{b}_3, \overline{b}_4, \overline{b}_5, \ldots \}$$

$$= \{ \ldots a_{1-N}, \overline{a}_{2-N}, \overline{a}_{3-N}, \overline{a}_{4-N}, \overline{a}_{5-N} \ldots \}$$

Data sequence $\{a_i\}$ is given a delay time T equivalent to the N-bit time period at delay unit 304. Therefore, delay time for both inputs to exclusive-OR circuit 305, e.g., $\{a_{i-N}\}$ and $\{b_i\}$ would become T, including the delay time given at the transmitting side, and $\{a_{i-N}\}$ and $\{b_i\}$ can be expressed as below.

$$\{a_{i-N}\} = \{ \ldots a_{1-N}, \overline{a}_{2-N}, \overline{a}_{3-N}, \overline{a}_{4-N}, \ldots a_1, \overline{a}_2, \overline{a}_3, \ldots \}$$ [Equation 6]

$$\{b_i\} = \{ \ldots b_1, \overline{b}_2, \overline{b}_3, \overline{b}_4, \ldots \overline{b}_{N+1}, \overline{b}_{N+2}, \overline{b}_{N+3}, \ldots \}$$

$$= \{ \ldots a_{1-N}, \overline{a}_{2-N}, \overline{a}_{3-N}, \overline{a}_{4-N}, \ldots \overline{a}_1, \overline{a}_2, \overline{a}_3, \ldots \}$$

By transmitting $\{a_i\}$ and $\{b_i\}$ at differentiated timing, the position of data inversion caused by a carrier slip is differentiated by N bits corresponding to delay time T. Exclusive-OR circuit 305 of FIG. 3 computes and outputs the exclusive-OR between $\{a_{i-N}\}$ and $\{b_i\}$. Namely, if the output from exclusive-OR circuit 305 is assumed to be $\{E_i\}$, then $\{E_i\}$ can be expressed as below.

$$E_i = a_{i-N} \oplus b_i$$ [Equation 7]

The operation of exclusive-OR circuit 305 and adder 307 is explained using FIG. 6. FIG. 6 shows $\{a_{i-N}\}$, $\{b_i\}$, and $\{E_i\}$ at the carrier slip occurrence, and output $\{S_i\}$ from adder 307. Ignoring all errors caused by noise, if the carrier slip has not occurred, $\{E_i\}=0$, because $\{a_{i-N}\}$ and $\{b_i\}$ are the same data sequence. However, once the carrier slip occurs, first $\{b_i\}$ would invert, and then $\{a_{i-N}\}$ would invert after N bits which correspond to delay time T. Therefore, as shown in FIG. 6, $\{E_i\}$ will output 1 for the time period of N bits. The output from exclusive-OR circuit 305 is input to N-bit shift register 306, and an added value for the N-bit time period is output from adder 307. Therefore, output $S_i$ from adder 307 when the i-th signal is input to shift register 306 can be expressed as below.

$$S_i = \sum_{j=i-N+1}^{i} E_j$$ [Equation 8]

$S_i$ therefore becomes the value to which N−1 symbol from the past to the present symbol of $\{E_i\}$ is added. If an outstanding peak has appeared to $S_i$, it is regarded as a carrier slip occurrence, and coherently detected output is compensated. Output $S_i$ from adder 307 is input to peak search circuit 308. Peak position of $S_i$ is searched by peak search circuit 308.

Figure 7:
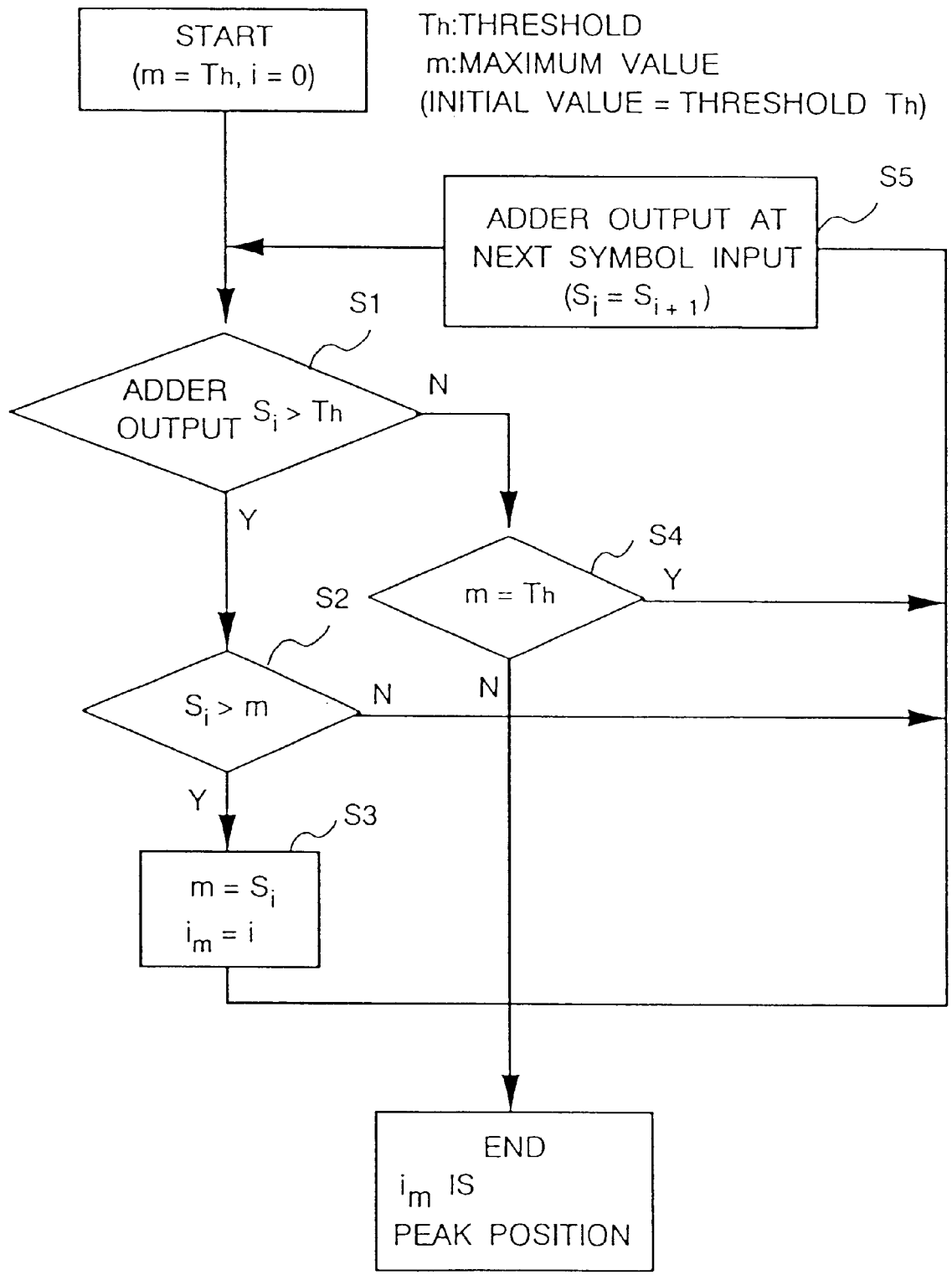
FIG. 7 is a flowchart showing the operation of the peak search circuit of Embodiment 1.

The operation of peak search circuit 308 is explained using FIG. 7. FIG. 7 is an example of a flowchart of peak search circuit 308. As shown in FIG. 7, peak search circuit 308 first sets threshold value Th within the range (0 to N) of output $S_i$ from adder 307. The peak search circuit 308 also sets the initial value of maximum m of $S_i$ as Th. Then, output $S_i$ from adder 307 is compared with the threshold value Th (step S1), and if $S_i$ is equal to or less than the threshold Th ($S_i$<=Th), it proceeds on to step S4. At step S4, if m still remains as the initial value Th, it proceeds on to step 5. At step S5, output $S_{i+1}$ from the adder at the time of next symbol input is replaced with $S_i$, and again returns to step S1. If $S_i$ is equal to or less than Th, a loop operation is performed from step S1, step S4, step S5, and to step S1.

Next, at step S1, if $S_i$ is greater than Th, e.g., if $S_i$ exceeds threshold value th, the procedure goes on to step S2. At step S2, $S_i$ is compared with the maximum value m, and if $S_i$ is greater than m, it proceeds onto step S3, and $S_i$ is placed for the maximum value m, and i is placed for $i_m$ which gives the maximum value, and then proceeds on to step S5. At step S2, if $S_i$ is equal to or less than the maximum m ($S_i$<=m), the procedure goes on to step S5. At step S5, output $S_{i+1}$ from adder at the time of the next symbol input is placed for $S_i$, and then returns to step S1 again.

That is, once output $S_i$ from adder 307 becomes larger than threshold value Th, a loop operation continues from step S1, step S2, step S5, and to step S1 (step S1, step S2, step S3, step S5, and to step S1 in case of $S_i$>m) until $S_i$ becomes equal to or less than Th again to perform maximum value detection. At step S1, when $S_i$ from adder 307 becomes equal to or less than threshold value Th, the procedure proceeds on to step S4, and if the maximum value m is not equal to threshold value Th, the peak position is determined to be at $i_m$ giving the maximum value at that time, and the operation ends.

Figure 8:
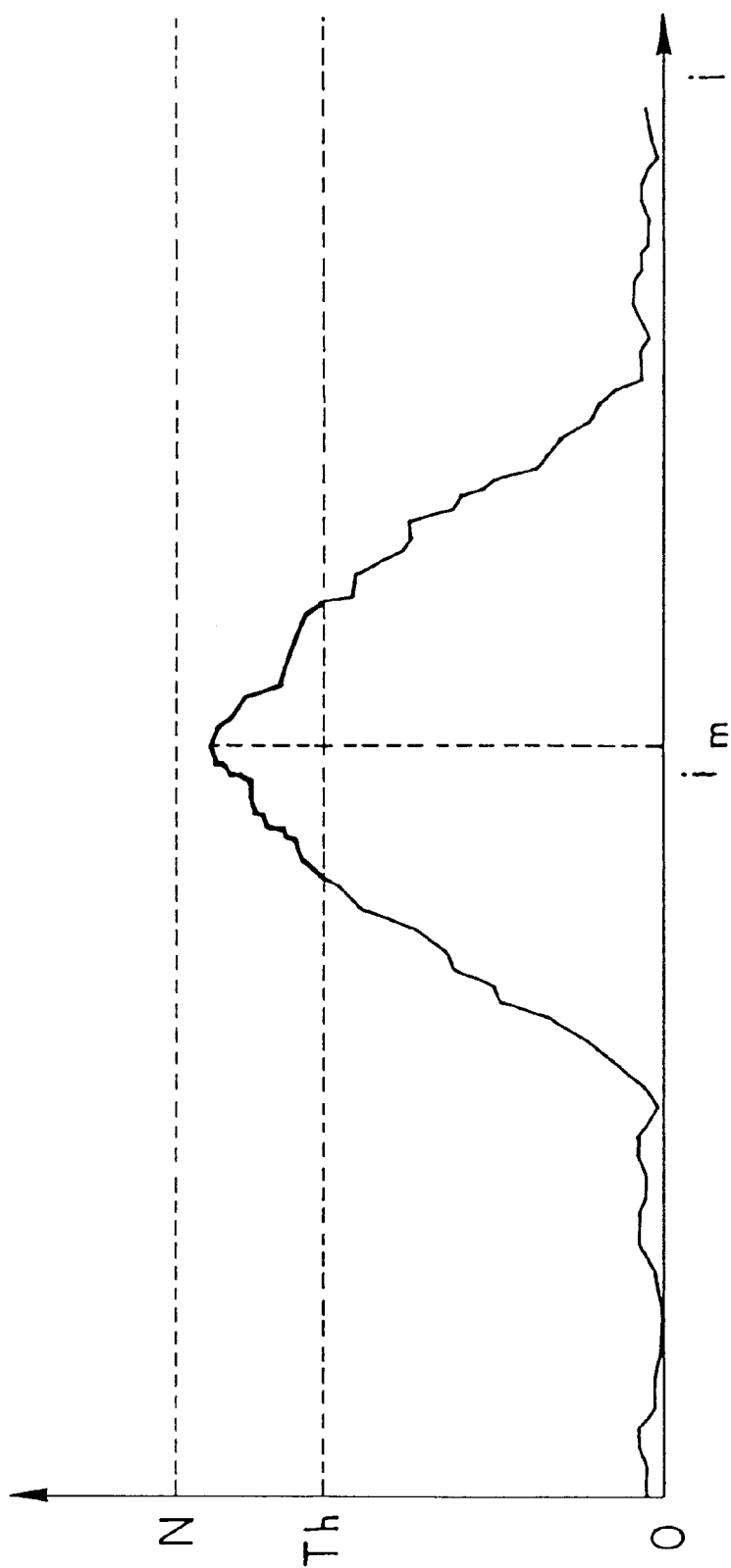
FIG. 8 shows an adder output and the peak search method within the carrier slip compensating circuit and of Embodiment 1.

Position $i_m$ where peak search results in $S_i$=m is assumed to be the position of carrier slip occurrence. FIG. 8 explains an example of time chart of output $S_i$ from adder 307 at the carrier slip occurrence and the method of presuming the peak position. In FIG. 8, threshold value Th is preset to the value of about 70% of N, the maximum value detection is performed at the thick line where output $S_i$ from adder 307 exceeds Th, and time $i_m$ is determined to be the peak position.

The carrier slip detection signal output from peak search circuit 308 of FIG. 3 is input into t-flip flop 309. The output from t-flip flop 309 performs switching operation outputting values 1 and 0 alternately every time when a carrier slip detection signal is input. From t-flip flop 309, a carrier slip compensation signal is output as the output of carrier slip detector 311. The carrier slip compensation signal is input into phase rotation circuit 310. The phase rotation circuit 310 rotates coherently detected output which is output from delay circuit 301.

The operation of phase rotation circuit 310 is explained using FIG. 9. FIG. 9 shows signal space indicating coherently detected output. Assuming that the coherently detected output to be input into phase rotation circuit 310 is vector (1) shown with solid line, when carrier slip compensation signal is 0, e.g., the data code is not inverted because carrier slip has occurred even times, vector (1) is output as the solid line. On the other hand, when carrier slip compensation signal is 1, e.g., when data code is inverted due to a carrier slip, phase rotation circuit 310 outputs vector (2) indicated with dotted line in the opposite direction from the coherently detected output shown with the solid line.

It can be observed that even when code of the coherently detected output is inverted because of a carrier slip, the phase of coherently detected output is again rotated by 180° by phase rotation circuit 310. That is, even when data code is inverted by a carrier slip, receiving data can be compensated by inverting the data code again.

The output after the carrier slip compensation from carrier slip compensating circuit 107 of FIG. 1B is input into serial-to-parallel converter 108, and converted (separated) into two data sequences of $\{\alpha_i\}$ and $\{\beta_i\}$.

Specific patterns are transmitted prior to data transmission to make synchronization so that output $C_i$ from parallel-to-serial converter 103 of FIG. 1A, e.g., $C_i=\{A_i, A_{i-N}\}$ of FIG.

2 will correspond to output $c_i=\{\alpha_i, \beta_i\}$ from serial-to-parallel converter 108 at receiving time.

Because $\{\beta_i\}$ is given delay time T equivalent to N-bit time period at transmission time, delay amount of both sequences can be made equal by giving delay time T equivalent to N-bit time period to $\{\alpha_i\}$ at delay unit 109. Combination circuit 110 composes $\{\alpha_{i-N}\}$ and $\{\beta_i\}$ having the same delay amount.

Figure 10:
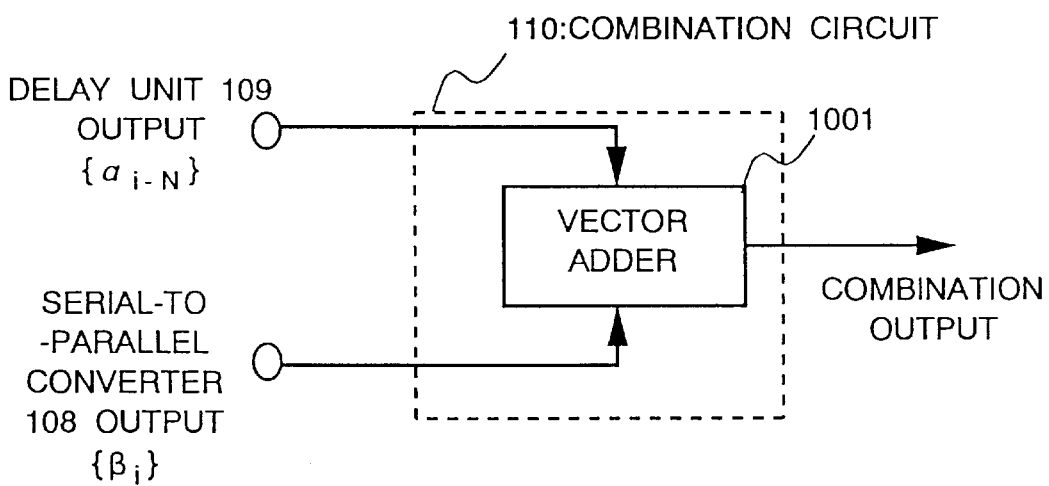
FIG. 10 shows the configuration of the combination circuit of Embodiment 1.

The operation of combination circuit 110 is explained using a figure. FIG. 10 is the configuration of combination circuit 110 for performing equal gain combination. In FIG. 10, a vector adder 1001 is shown. Namely, equal gain combination can be realized by vector adder 1001. $\{\alpha_{i-N}\}$ and $\{\beta_i\}$ input into combination circuit 110 are input to vector adder 1001 and added by equal gain and then output from combination circuit 110.

The output from combination circuit 110 of FIG. 1B is input into discriminator 111, and discriminator 111 outputs the value below depending on the real part re.

$$Da = \begin{cases} 0 & (re >= 0) \\ 1 & (re < 0) \end{cases} \quad \text{[Equation 9]}$$

The discriminating value Da is decoded as demodulator output by a voice decoder, etc., and output as data such as voice, image, and so on.

During above operation, the identical data is transmitted at differentiated timing, using the time diversity system which carries out combining by making delay amount equivalent at the receiving side, and performs data compensation by detecting carrier slips through coherent detection, thus the bit error rate can be lowered.

Embodiment 2

Although adder 307 in carrier slip compensating circuit 107 is configured to add all N bits of outputs from N-bit shift register 306 in FIG. 1, this is not always necessary. Same operation can be realized by other configurations. For example, as shown in FIG. 11A, an integrator 1104 made up of adder 1101 and delay unit 1102 having delay time equivalent to one data period D is provided at the latter stage of shift register 306. Input $E_i$ of shift register 306 is added to the integrator, and output $E_{i-N}$ of shift register 306 is reduced from the integrator at the last stage of shift register 306 conversely. Namely, assuming that the i-th output from adder 1101 be $S_i$, the following relationship can be obtained.

$$S_i = S_{i-1} + E_i - E_{i-N}$$

In such a case, the adder can be configured with simple circuit because the number of adding elements can be reduced.

Embodiment 3

As another example of configurating adder 307, the operation similar to Embodiment 1 can be achieved by using up-down counter 1103 shown in FIG. 11B, making the exclusive-ORed signal of $E_i$ and $E_{i-N}$ as enable signal E of up-down counter 1103, and $E_i$ as the up-down signal U/D.

The operation for this case is explained. Combination of $E_i$ and $E_{i-N}$ can be four as shown below because input to shift register 306 is either 0 or 1, and exclusive-ORed signal Ex of $E_i$ and $E_{i-N}$ can be expressed as follows.

$$(E_i, E_{i-N}) = \begin{cases} (0,0) \\ (0,1) \\ (1,0) \\ (1,1) \end{cases} \quad E_x = \begin{cases} 0 \\ 1 \\ 1 \\ 0 \end{cases} \quad \text{[Equation 10]}$$

In case of $E_i=E_{i-N}$, added output does not change because the added value does not change. In this case, because Ex=0, e.g., enable signal E becomes 0 of up-down counter 1103, output does not change. When $E_i$ becomes $E_i \neq E_{i-N}$, Ex=1, e.g., enable signal E of up-down counter 1103 becomes 1, and if $E_i$ is 1, the counter counts up as up-down signal U/D becomes 1, and if $E_i$ is 0, the counter counts down as up-down signal U/D becomes 0. Namely, assuming that the i-th output of up-down counter 1103 is $S_i$, the following relationship can be obtained.

$$S_i = \begin{cases} S_{i-1} + 1 & (E_i = 1) \\ S_{i-1} - 1 & (E_i = 0) \end{cases} \quad \text{[Equation 11]}$$

Then operation similar to adder 307 of Embodiment 1 can be realized in this way. In this case, the configuration can be achieved with simple circuit for the number of adding elements can be reduced.

Embodiment 4

Peak search circuit 308 of carrier slip compensating circuit 107 of Embodiment 1 is configured to perform a simple maximum value detection, the maximum value detection is not always necessary. For instance, the flowchart shown in FIG. 12 will be applied as well.

Figure 12:
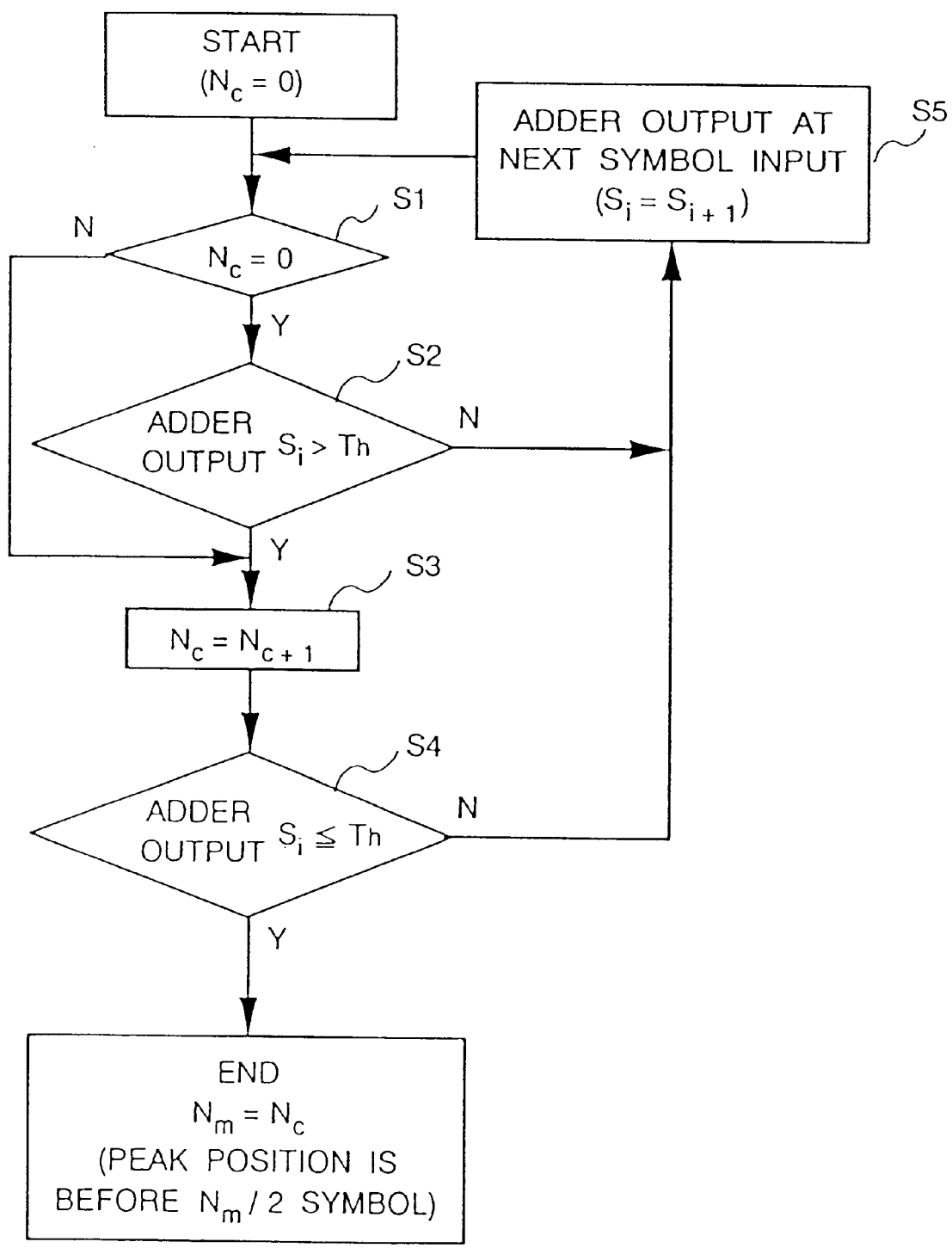
FIG. 12 is a flowchart showing the operation of the peak search circuit of Embodiment 4.

The operation of the flowchart shown in FIG. 12 will be explained. As shown in FIG. 12, peak search circuit 308 is realized through the operation from step S1 to step S5. Threshold value Th is set within the range (0–N) of $S_i$ output from adder 307 first, and then the initial value Nc of the counter is set to 0. At step S1, if count value Nc is 0, the operation proceeds to step S2. At step S2, output $S_i$ from adder 307 is compared with threshold value Th, and if $S_i$ is equal to or less than Th, it proceeds to step S5. At step S5, adder output $S_{i+1}$ at the time of inputting the next symbol is placed for $S_i$, and again returns to step S1. Namely, if $S_i$ is equal to or less than Th, it operates in a loop of step S1, step S2, step S5, and to step S1. Count value Nc remains 0 even when the number of i increases.

If Si is greater than Th at step S2, that is, if output $S_i$ from adder 307 exceeds threshold value Th, the operation proceeds to step S3 and increases Nc by 1. At step S4, output Si from adder 307 is compared with threshold value Th, and if $S_i$ is greater than Th, it goes on to step S5. At step S5, output $S_{i+1}$ from the adder is placed for $S_i$, and then again returns to step S1. Because Nc≠0 at this time, the operation proceeds from step S1 to step S3 and increases Nc by 1.

Namely, output Si from adder 307 once exceeds threshold value Th, the operation continues in a loop from step S1, step S3, step S4, step S5 to step S1 until $S_i$ becomes equal to or less than Th. As i increases by 1, Nc also increases by 1. If $S_i$ is equal to or less than Th at step S4, e.g., if output $S_i$ from adder 307 becomes smaller than threshold value Th, the operation terminates assuming that the peak position is half the count value Nm at the time, that is, before Nm/2 symbol. Namely, the peak position becomes the mid point in the range where output $S_i$ from adder 307 is greater than threshold value Th.

Figure 13:
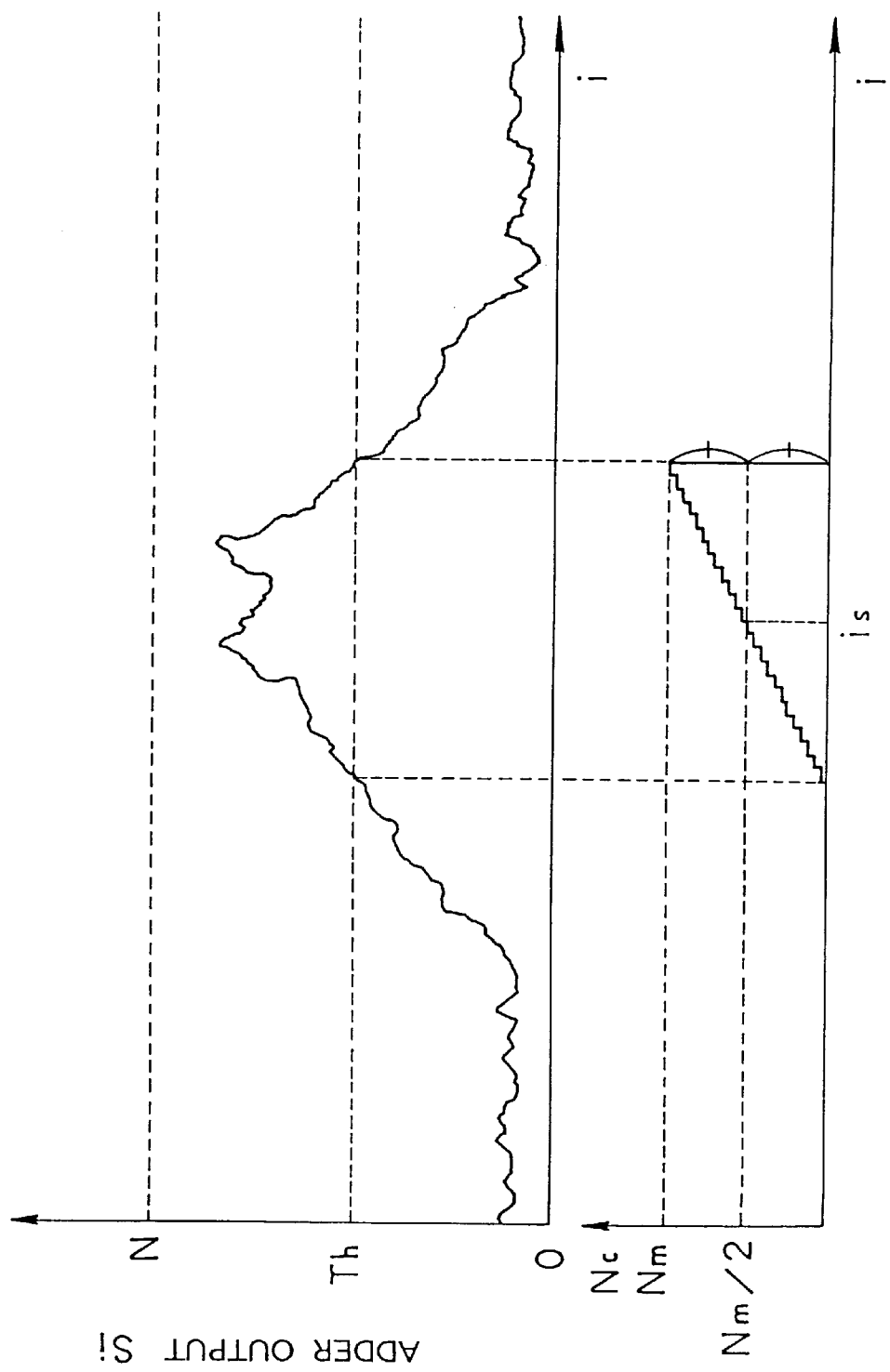
FIG. 13 illustrates an adder output within the carrier slip compensating circuit and the peak search method according to Embodiment 4.

FIG. 13 is an example of change of output from adder 307 at the time of carrier slip occurrence, and explains a method of peak position estimation at this time. In FIG. 13, peak $S_i$ has distorted due to a number of errors caused by noise, making it difficult to estimate the correct peak position based on the maximum value detection. Threshold value Th is set half the value N, and the counter counts up from the time when $S_t$ exceeds Th until again becomes smaller than Th. At this time, carrier slip detection signal is output by deciding that the peak position is half the final count value Nm, e.g., $i_s$ when the count value is Nm/2 as the peak position. Therefore, more accurate search than maximum value detection can be carried out.

Embodiment 5

Figure 14:
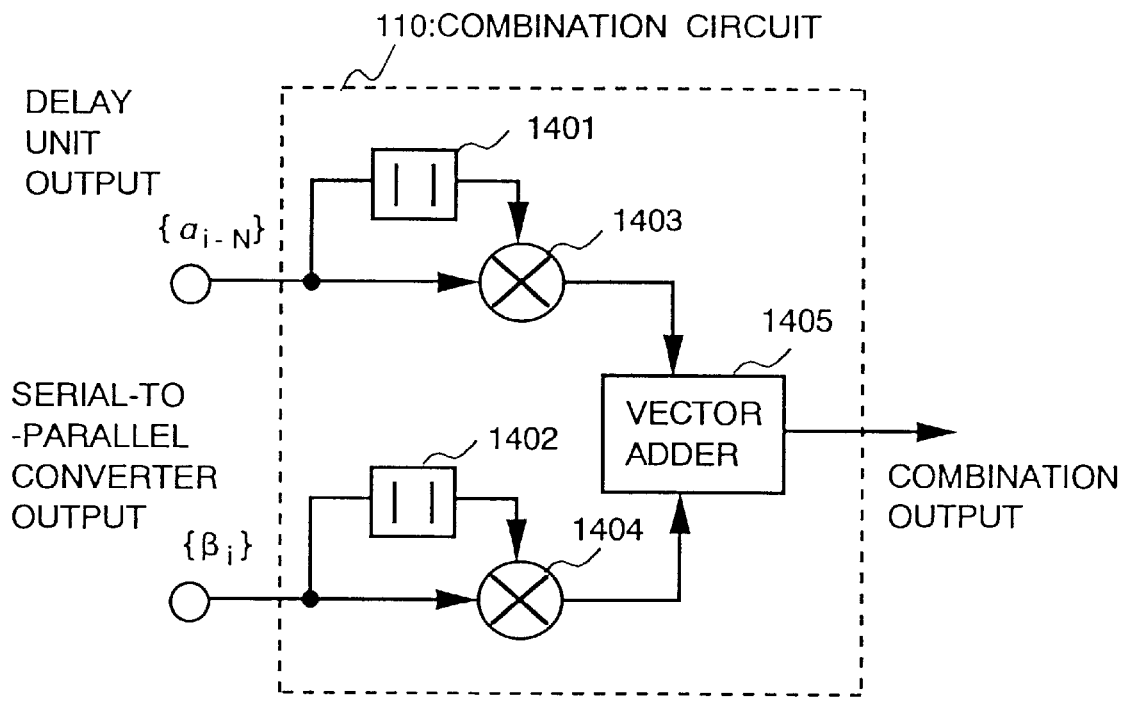
FIG. 14 shows the configuration of the combination circuit according to Embodiment 5.

Although combination circuit 110 of Embodiment 1 is configured to perform equal gain combination, it is not always necessary to perform equal gain combination, for instance, maximum ratio combination is also applicable. FIG. 14 shows a configuration example of combination circuit 110 for maximum ratio combination. In FIG. 14, absolute value detectors 1401 and 1402, multipliers 1403, and 1404, and vector adder 1405 are shown.

$\{\alpha_{i-N}\}$ and $\{\beta_i\}$ input into combination circuit 110 are input into absolute value detectors 1401 and 1402 respectively so as to detect $|\alpha_{i-N}|$, $|\beta_i|$. Detected $|\alpha_{i-N}|$ and $|\beta_i|$ are multiplied by $\{\alpha_{i-N}\}$ and $\{\beta_i\}$ by multiplier 1403 and 1404, respectively, to be weighted in accordance with the SN ratio, and input into vector adder 1405 to be added, and then input into discriminator 111.

Figure 15:
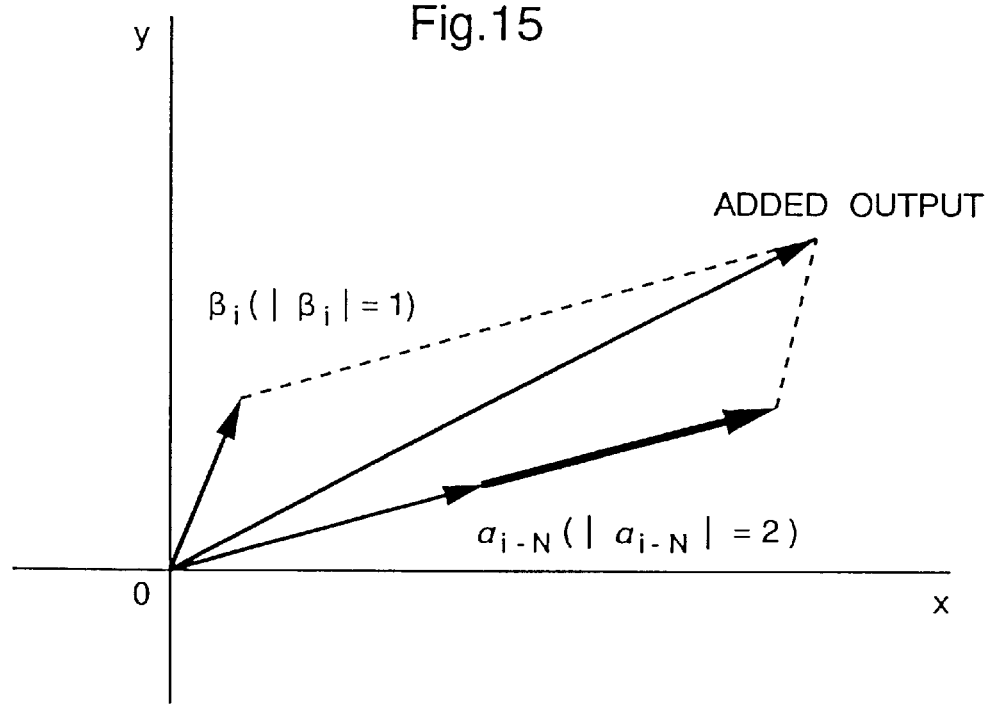
FIG. 15 illustrates the operation of the combination circuit according to Embodiment 5.

FIG. 15 shows an example of vector addition. In the figure, if $|\alpha_{i-N}|$ equals 2, and if $|\beta_i|$ is 1, the input to vector adder 1405 is single for $\{\beta_i\}$ and double for $\{\alpha_{i-N}\}$ as shown with the thick line. Namely, signal with large amplitude is weighted while signal with small amplitude is reduced in its weight before being added by vector adder 1405 to obtain adder output.

By making combination circuit 110 as the maximum ratio combination, the diversity gain larger than the equal gain combination can be achieved.

Embodiment 6

Figure 16:
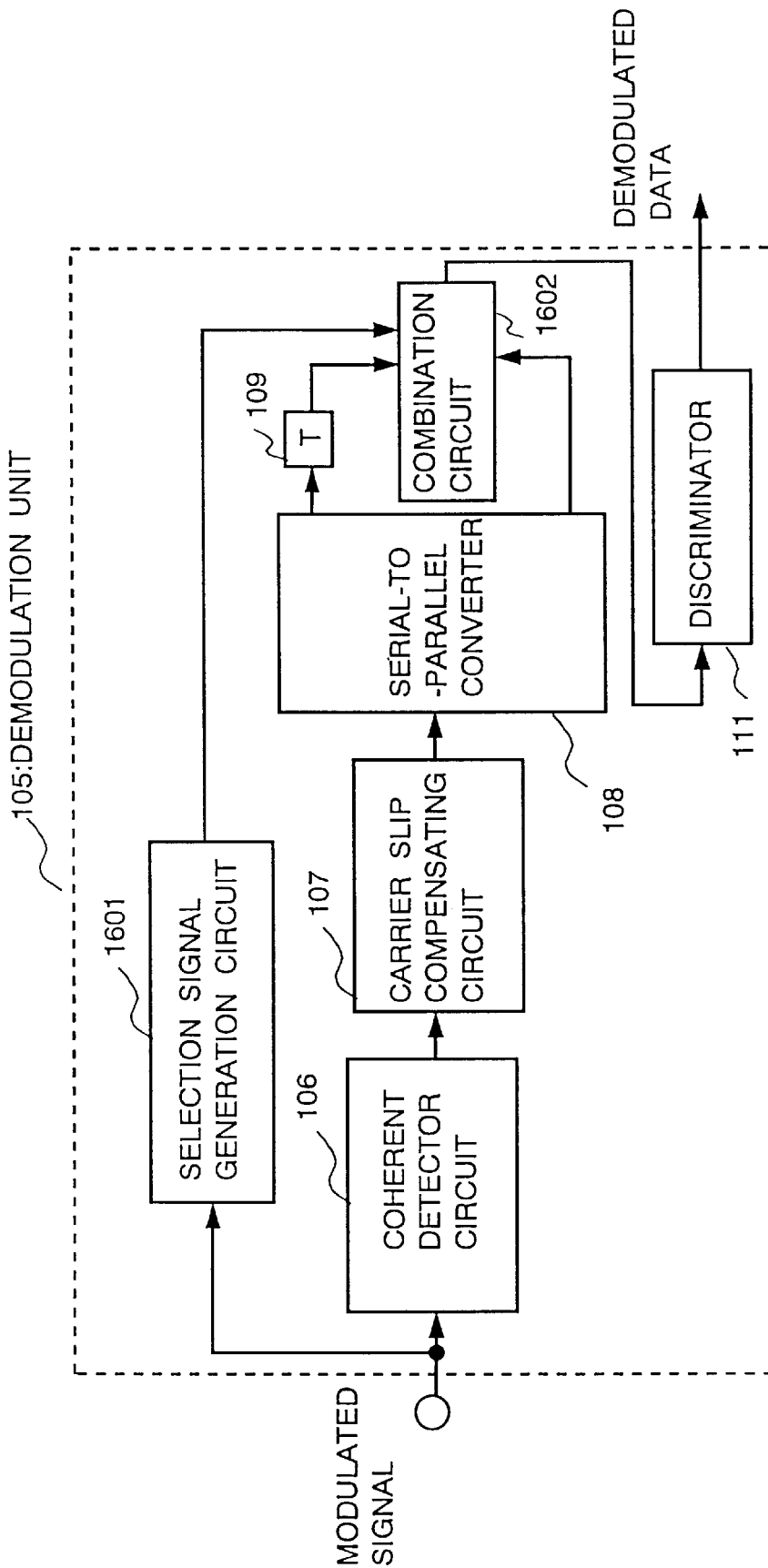
FIG. 16 shows the configuration of the demodulation unit of Embodiment 6.

As a configuration example of another combination circuit 110, the configuration of the demodulation unit in case of the selecting combination is shown in FIG. 16. In FIG. 16, selection signal generation circuit 1601, and combination circuit 1602 are shown. The explanation for the units that equal FIG. 1 is omitted by giving the same number. The details for carrier slip compensating circuit 107 of FIG. 16 is the same as that of FIG. 3, and thus its explanation is omitted.

Figure 17:
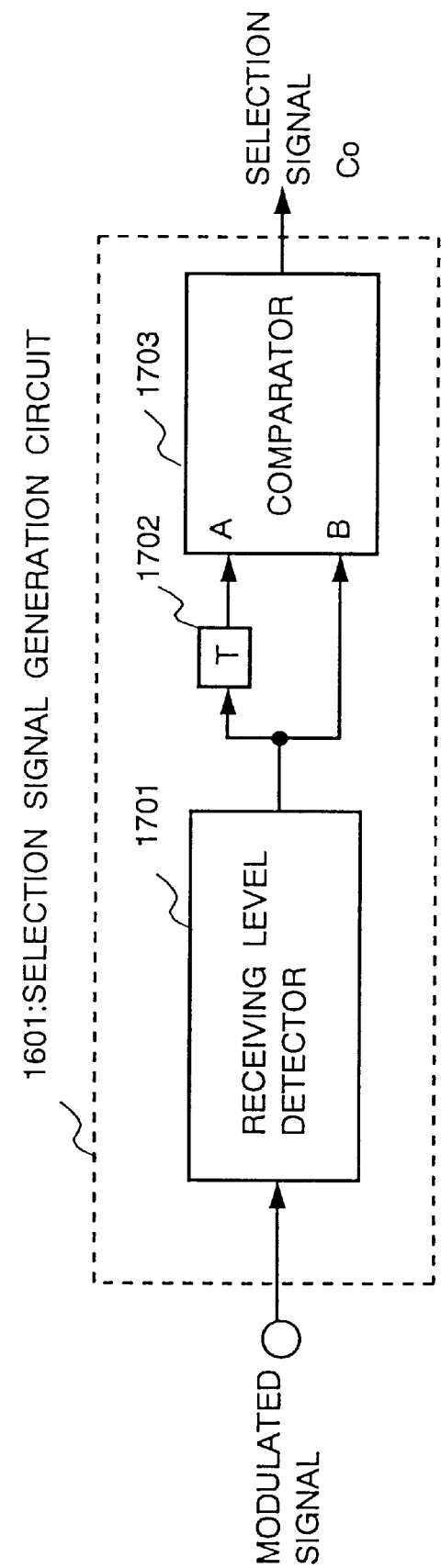
FIG. 17 shows the configuration of the selection signal generation circuit of Embodiment 6.

The operation of selection signal generation circuit 1601 and combination circuit 1602 is explained. In FIG. 17, receiving level detector 1701, delay unit 1702 having the delay time equivalent to N-bit data time period T, and a comparator 1703 are shown. When receiving signal has been input into selection signal generation circuit 1601, the receiving level is detected by receiving level detector 1701. Detected receiving level is branched to two, one of which is given a delay equivalent to N-bit data time period T by delay unit 1702 and then input into input A of comparator 1703. On the other hand, the other is input into input B of comparator 1703 without being delayed. Comparator 1703 outputs selection signal $C_0$ indicating larger input level. That is, selection signal $C_0$ output from comparator 1703 becomes the following value depending on the value of A and B.

$$c_0 = \begin{cases} 1 & (A <= B) \\ 0 & (A > B) \end{cases} \quad \text{[Equation 12]}$$

The output from comparator 1703, e.g., the selection signal is input into combination circuit 1602. FIG. 18 shows the configuration of combination circuit 1602. In FIG. 18, a selector 1801 is shown. The combination circuit for performing selecting combination can be realized by using a selector 1801. Selector 1801 outputs $\{\alpha_{i-N}\}$ if the selection signal is 0, and $\{\beta_i\}$ if the selection signal is 1 to discriminator 111 of FIG. 16. That is, when the receiving level of the delayed sequence is larger, the delayed data sequence is output, and when the receiving level of the sequence without being delayed is larger, the data sequence of not delayed is output, thus enabling selecting combination.

By applying selecting combination for combination circuit 110, a circuit configuration easier than the equal gain combination can be realized.

Although Embodiment 6 is configured, as shown in FIG. 16, in such a way that discriminator 111 discriminates whether the data is 0 or 1 based on the real part of the combination output after the selecting combination, the position of discriminator 111 is not necessarily configured after the selecting combination. For instance, discriminator 111 placed after coherent detector circuit as the receiver shown in FIG. 19A also enables data discrimination.

Figure 19A:
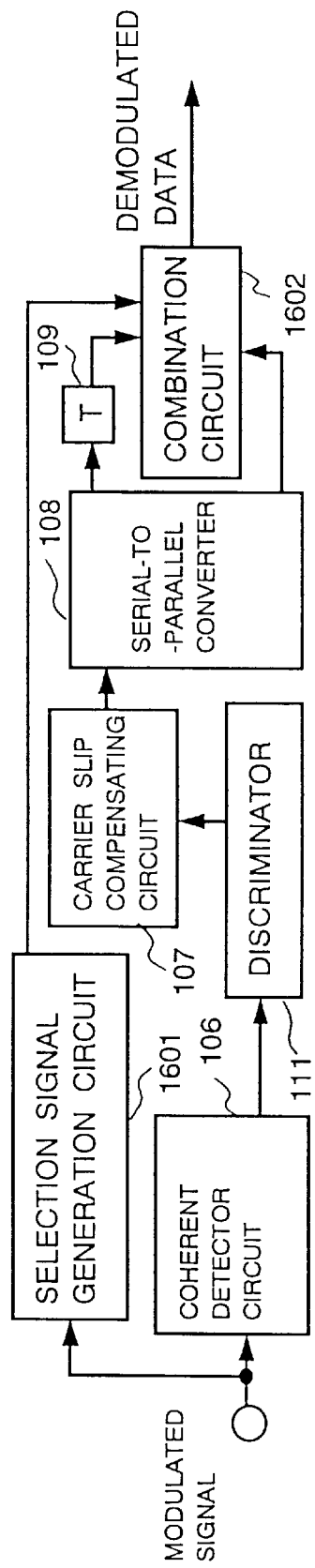
FIGS. 19A and 19B show the configuration of the communication system of Embodiment 7.
Figure 19B:
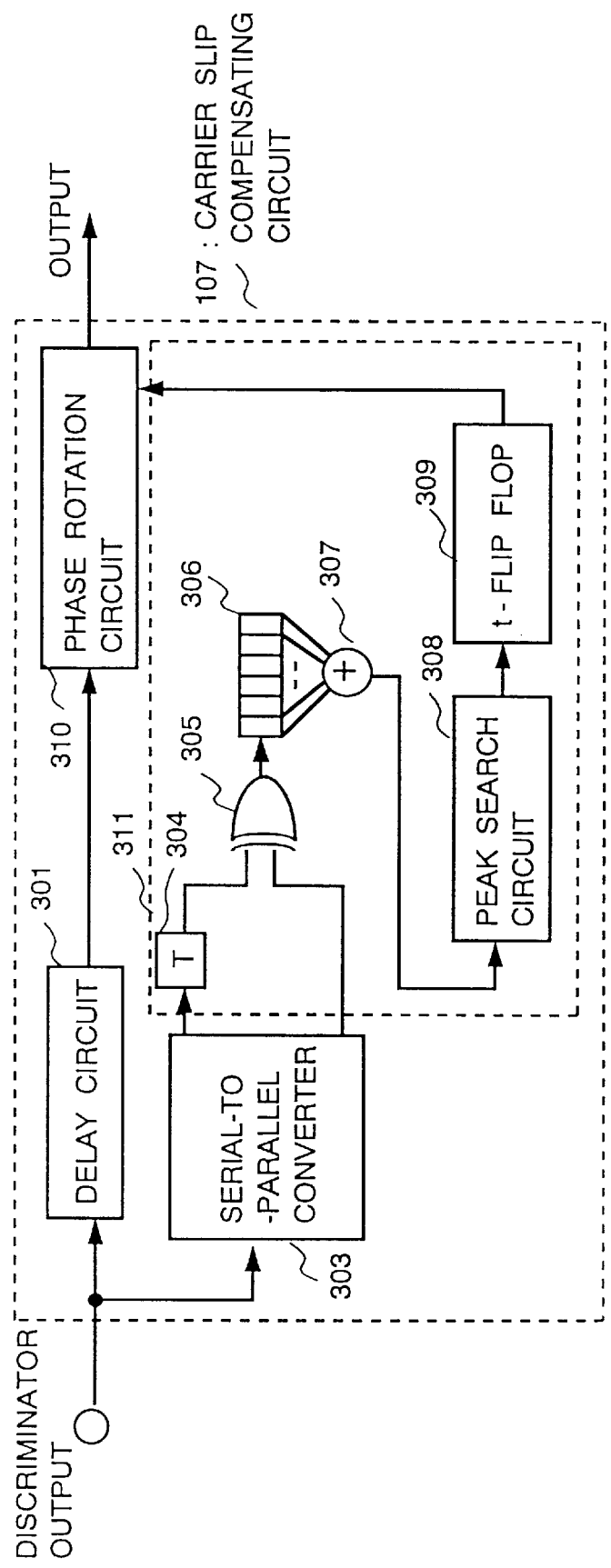

The configuration example of carrier slip compensating circuit 107 in this case is shown in FIG. 19B. As shown in FIG. 19A, when selecting combination has completed, by placing discriminator 111 before carrier slip compensating circuit 107, discriminator 302 (discriminator 302 of FIG. 3 showing the details of carrier slip compensating circuit 107 of Embodiment 6 in FIG. 16) for carrier slip compensating circuit 107 of FIG. 19B can be omitted, thus reducing the number of elements.

Embodiment 8

This embodiment performs the convolutional encoding prior to the BPSK modulation.

FIGS. 20A and 20B show the configuration of communication system of this Embodiment. In the figures, a convolutional encoder 2001 is provided. Delay units 2002, 2003, 2007, and 2008 have the delay time equivalent to M-bit data time period τ, and parallel-to-serial converter 2004 multiplexes the delayed identical data. Carrier slip compensating circuit 2005 and serial-to-parallel converter 2006 which separates multiplexed signal are shown. Combination circuits 2009 and 2010, and Viterbi decoder 2011 are shown. For units the same as or correspond to FIG. 1 are given the same number and the explanation is omitted.

Next, the operation is explained. Similarly to Embodiment 1, data such as voice, images, etc., is converted into digital signal by a voice encoder, etc., and the data sequence is set to be transmitted. The data sequence to be transmitted is input to modulation unit 101, and convolutionally encoded by the convolutional encoder 2001 with coding ratio R=1/2. Two data sequences output from convolutional encoder 2001 are then branched to two, one of which is input into parallel-to-serial converter 2004. While the other is given delay time τ at delay units 2002 and 2003 having delay time equivalent to M-bit data time period τ, and then input into parallel-to-serial converter 2004. Parallel-to-serial converter 2004 converts (multiplexes) four parallel input data sequences into serial data sequence with the quadruple data rate of the input data sequence.

The way of data conversion of parallel-to-serial converter 2004 is explained using a figure. FIG. 21 shows time chart of the convolutionally encoded data sequences $\{A_i\}$ and $\{B_i\}$, data sequences $\{A_i'\}$ and $\{B_i'\}$ which are added M-bit delay corresponding to delay time τ to $\{A_i\}$ and $\{B_i\}$, and output $\{\Gamma_i\}$ from parallel-to-serial converter 2004. The relationship between $\{A_i\}$ and $\{A_i'\}$ and $\{B_i\}$ and $\{B_i'\}$ is expressed as follows based on FIG. 21.

$A_i' = A_{i-M}$ $B_i' = B_{i-M}$

Moreover, output $\{\Gamma_i\}$ from parallel-to-serial converter 2004 can be expressed as follows according to $\{A_i\}, \{A_i'\}, \{B_i\}, \text{ and } \{B_i'\}$.

$$\Gamma_i = \{\Gamma_{i,1}, \Gamma_{i,2}, \Gamma_{1,3}, \Gamma_{1,4}\}$$
$$= \{A_i, A_1', B_i, B_i'\} = \{A_i, A_{i-N}, B_i, B_{i-N}\}$$

The output from parallel-to-serial converter 2004 of FIG. 20 is BPSK modulated by BPSK modulator 104, amplified by the radio-frequency amplifier, and so on, and then transmitted (not shown). The transmitted radio wave is received by the receiver, amplified by the radio-frequency amplifier, etc., (not shown) and then input into demodulation unit 105, and coherently detected by coherent detector circuit 106. The output from coherent detector circuit 106 is input into carrier slip compensating circuit 1005, and carrier slip compensation is performed.

Figure 22:
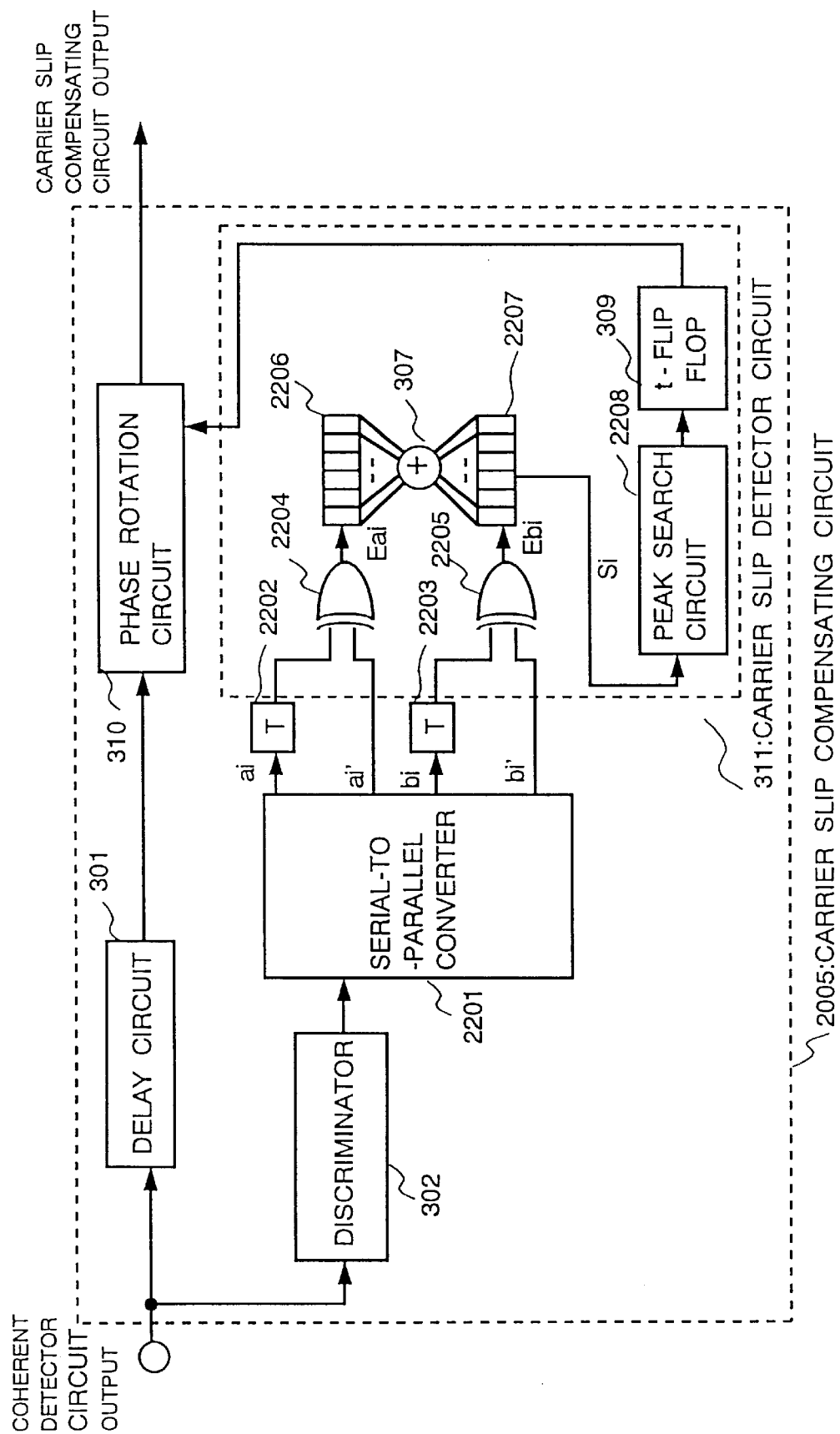
FIG. 22 shows the configuration of the carrier slip compensating circuit according to Embodiment 8.

The operation of carrier slip compensating circuit 2005 is explained using a figure. FIG. 22 shows a configuration example of carrier slip compensating circuit 2005. In FIG. 22, serial-to-parallel converter 2201 separates multiplexed signals. Delay circuits 2202 and 2203 having delay time equivalent to M-bit data time period τ, exclusive-OR circuits 2204 and 2205, shift registers 2206 and 2207, and peak search circuit 2208 are illustrated. The units the same as or correspond to FIG. 3 are given identical numbers and their explanation is omitted.

The output from coherent detector circuit 106 is input into carrier slip compensating circuit 2005 and then branched to two, one of which is given a predetermined delay by delay circuit 301, and then input into phase rotation circuit 310. The other is input into discriminator 302. Discriminator 302 discriminates whether the code of coherently detected output vector is 1 or 0. Namely, discriminator 302 outputs value 1 or value 0 based on the real part re.

$$\gamma_i = \begin{cases} 0 & (re >= 0) \\ 1 & (re < 0) \end{cases} \quad \text{[Equation 13]}$$

Data sequence $\{\gamma_i\}$ output from discriminator 302 is input into serial-to-parallel converter 2201 and then converted (separated) into four data sequences with a quarter data rate of the input data sequence.

It is assumed that a specific pattern for synchronization is transmitted in advance prior to data transmission so that output $\Gamma_i$ from parallel-to-serial converter 2004 of FIG. 20A at data transmission, e.g., $\Gamma_i = \{A_i, A_i', B_i, B_i'\}$ of FIG. 21 would correspond to output $\gamma_i = \{a_i, a_i', b_i, b_i'\}$ from serial-to-parallel converter 2201 at data receiving. Among the outputs from serial-to-parallel converter 2201, the data sequence to which a delay equivalent to M-bit data time period τ is given at the transmitter is directly input into exclusive-OR circuits 2204 and 2205. Among outputs from serial-to-parallel converter 2201, a data sequence which is not given a delay equivalent to M-bit data time period τ at the transmitter is input into delay units 2202 and 2203, where a delay equivalent to M-bit data time period τ is given, and then input into exclusive-OR circuits 2204 and 2205.

Figure 23:
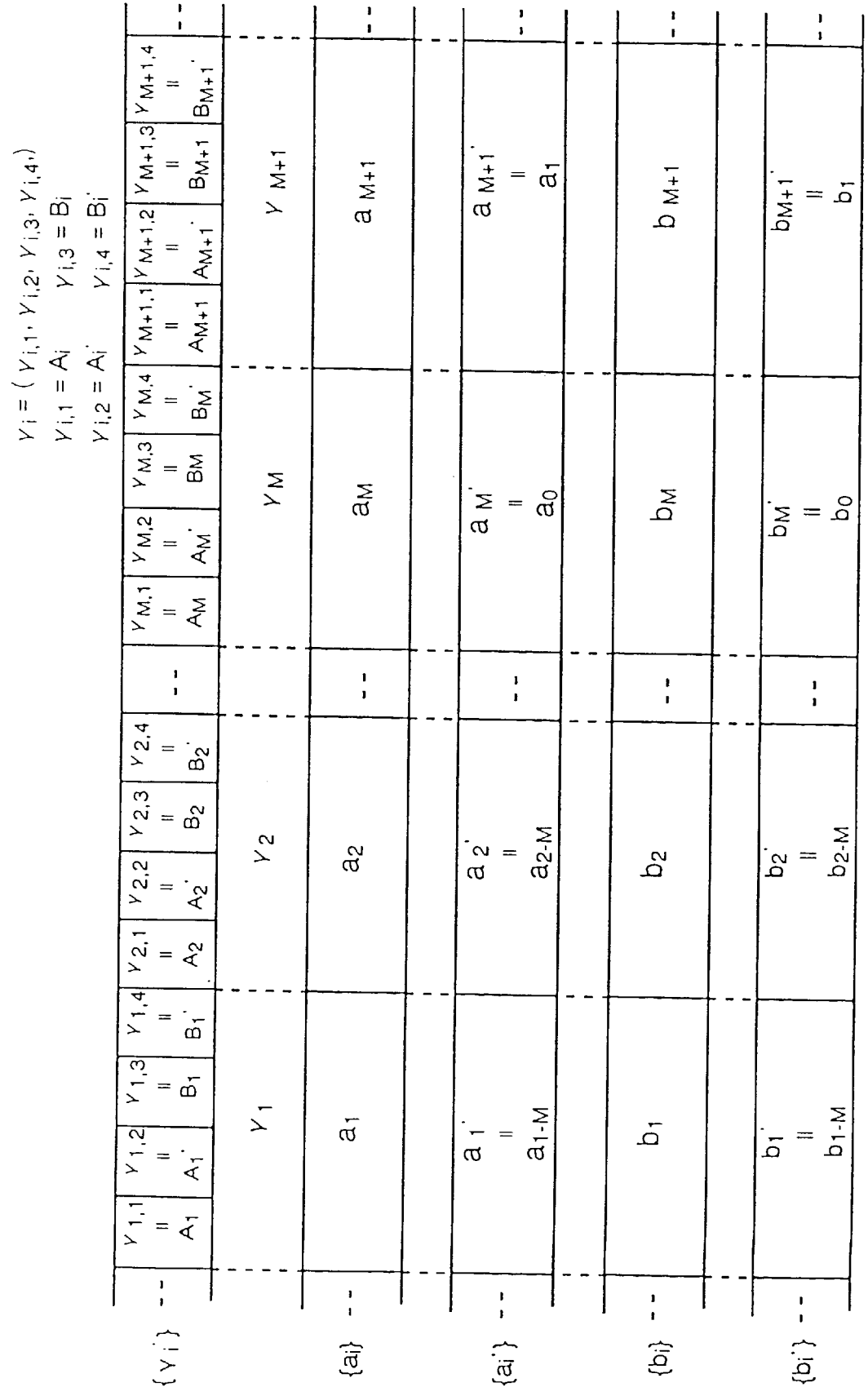
FIG. 23 illustrates the input/output data of the serial-to-parallel conversion circuit within the carrier slip compensating circuit of Embodiment 8.

Data conversion of serial-to-parallel converter 2201 is explained by using a figure. FIG. 23 shows time chart of data sequence $\{\gamma_i\}$ output from discriminator 302, data sequence $\{a_i\}$ and $\{b_i\}$ to which delay is not given at the transmitting side among the outputs from serial-to-parallel converter 2201, and data sequence $\{a_i'\}$ and $\{b_i'\}$ to which delay equivalent to M-bit data time period τ is given by delay units 2002 and 2003 at the transmitting side. As shown in FIG. 23, the relationships between $\{\gamma_i\}$ and $\{a_i\}, \{a_i'\}, \{b_i\}, \text{ and } \{b_i'\}$ are expressed as follows:

$$\gamma_i = \{\gamma_{i\cdot 1}, \gamma_{i\cdot 2}, \gamma_{i\cdot 3}, \gamma_{i\cdot 4}\}$$
$$= \{a_i, a_i', b_i, b_i'\}$$

Ignoring errors caused by noise and taking only the effects of carrier slip into consideration, because $\{a_i'\}$ and $\{b_i'\}$ are given delay equivalent to M-bit data time period τ for $\{a_i\}$ and $\{b_i\}$ at transmission time respectively, the relationships between $\{a_i\}$ and $\{a_i'\}$ and $\{b_i\}$ and $\{b_i'\}$ can be expressed using the number of bits M per time τ as follows:

$a_i' = a_{i-M}$ $b_i' = b_{i-M}$

Based on these, $\{\gamma_i\}$ can be expressed by using $\{a_i\}$ and $\{b_i\}$ as follows:

$$\gamma_i = \{a_i, a_i', b_i, b_i'\}$$
$$= \{a_i, a_{i-M}, b_i, b_{i-M}\}$$

Suppose a carrier slip has just occurred. Because the stable point of a carrier in the signal space in case of using BPSK is symmetrical to the origin, the code of coherent detector output after carrier slip has occurred get wholly inverted.

Figure 24:
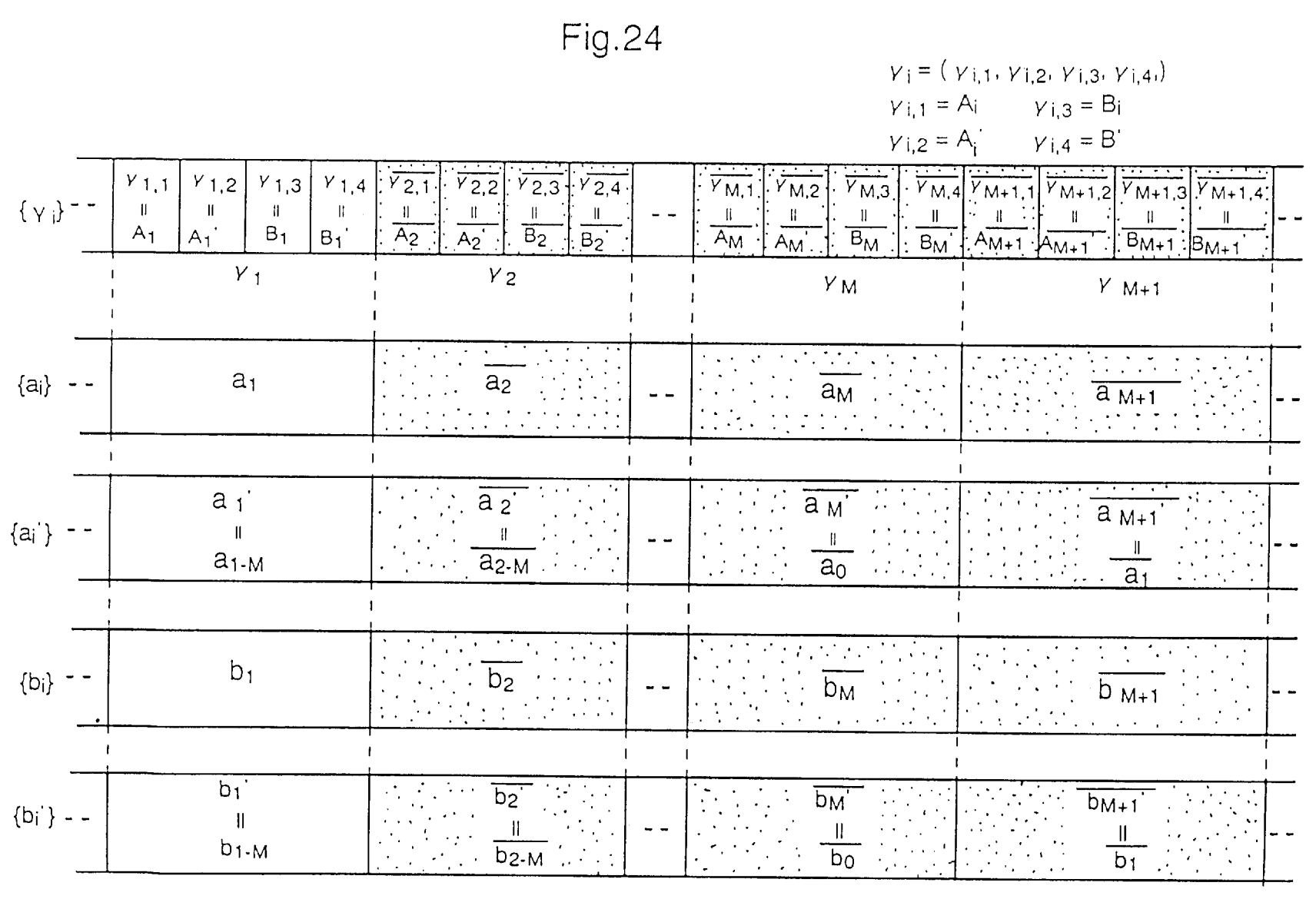

Code inversion by the carrier slip is explained using a figure. FIG. 24 shows time chart of $\{\gamma_i\}$ and $\{a_i\}, \{a_i'\}$, and $\{b_i\}, \{b_i'\}$, when assuming a carrier slip has occurred at receiving data $a_2$ in data sequence $\{\gamma_2\}$ output from discriminator 302. The dotted areas in the Figure show inverted codes, and the bar is placed over data code. Namely, $\{\gamma_i\}$ can be expressed as below.

$$\{\gamma_i\} = \{\ldots a_1, a_{1'}, b_1, b_{1'}, \bar{a}_2, \bar{a}_{2'}, \bar{b}_2, \bar{b}_{2'}, \bar{a}_3, \bar{a}_{3'}, \ldots\} \quad \text{[Equation 14]}$$

At this time, outputs from serial-to-parallel converter 2201, $\{a_i\}, \{a_i'\}, \{b_i\}, \{b_i'\}$ can be expressed as follows:

$$\{a_1\} = \{\ldots a_1, \bar{a}_2, \bar{a}_3, \bar{a}_4, \bar{a}_5 \ldots\} \quad \text{[Equation 15]}$$
$$\{a_i'\} = \{\ldots a_1', \bar{a}_2', \bar{a}_3', \bar{a}_4', \bar{a}_5' \ldots\}$$
$$= \{\ldots a_{1-M}, \bar{a}_{2-M}, \bar{a}_{3-M}, \bar{a}_{4-M}, \bar{a}_{5-M} \ldots\}$$

$$\{b_i\} = \{\ldots b_1, \bar{b}_2, \bar{b}_3, \bar{b}_4, \bar{b}_5 \ldots\}$$
$$\{b_i'\} = \{\ldots b_1', \bar{b}_2', \bar{b}_3', \bar{b}_4', \bar{b}_5' \ldots\}$$
$$= \{\ldots b_{1-M}, \bar{b}_{2-M}, \bar{b}_{3-M}, \bar{b}_{4-M}, \bar{b}_{5-M} \ldots\}$$

Delay equivalent to M-bit data time period τ is given to data sequence $\{a_i\}$ and to data sequence $\{b_i\}$ by delay unit 2202 and delay unit 2203, respectively. Therefore, the delay amount of inputs to exclusive-OR circuits 2204 and 2205, e.g., $\{a_{i-M}\} \{a_i'\}$ and $\{b_{i-M}\}$ and $\{b_i'\}$ become equal to M-bit data time period τ, and can be expressed as follows:

$$\{a_{i-M}\}=\{\ldots a_{1-M}, a_{2-M}, a_{3-M}, a_{4-M}, a_{5-M}, \ldots a_1, a_2, a_3, \ldots\}$$

$$\{a_i'\}=\{\ldots a_{1-M}, \bar{a}_{2-M}, \bar{a}_{3-M}, \bar{a}_{4-M}, \bar{a}_{5-M}, \ldots \bar{a}_1, \bar{a}_2, \bar{a}_3, \ldots\}$$

$$\{b_{i-M}\}=\{\ldots b_{1-M}, b_{2-M}, b_{3-M}, b_{4-M}, b_{5-M}, \ldots b_1, \bar{b}_2, \bar{b}_3, \ldots\}$$

$$\{b_i'\}=\{\ldots b_{1-M}, \bar{b}_{2-M}, \bar{b}_{3-M}, \bar{b}_{4-M}, \bar{b}_{5-M}, \ldots \bar{b}_1, \bar{b}_2, \bar{b}_3, \ldots\}$$

[Equation 16]

That is, by performing transmission of $\{a_i\}$ and $\{a_i'\}$ and $\{b_i\}$ and $\{b_i'\}$ at differentiated timing, the position of data inversion due to carrier slip is delayed by M bits corresponding to delay time τ. Exclusive-OR circuits 2204 and 2205 compute and output exclusive ORed signals between $\{a_{i-M}\}$ and $\{a_i'\}$, and $\{b_{i-M}\}$ and $\{b_i'\}$. Therefore, assuming outputs from exclusive-OR circuits 2204 and 2205 as $\{Ea_i\}$ and $\{Eb_i\}$, then $\{Ea_i\}$ and $\{Eb_i\}$ can be expressed as follows:

$$Ea_1 = a_{i-M} \oplus a_i'$$
$$Eb_i = b_{i-M} \oplus b_i'$$

[Equation 17]

Figure 25:
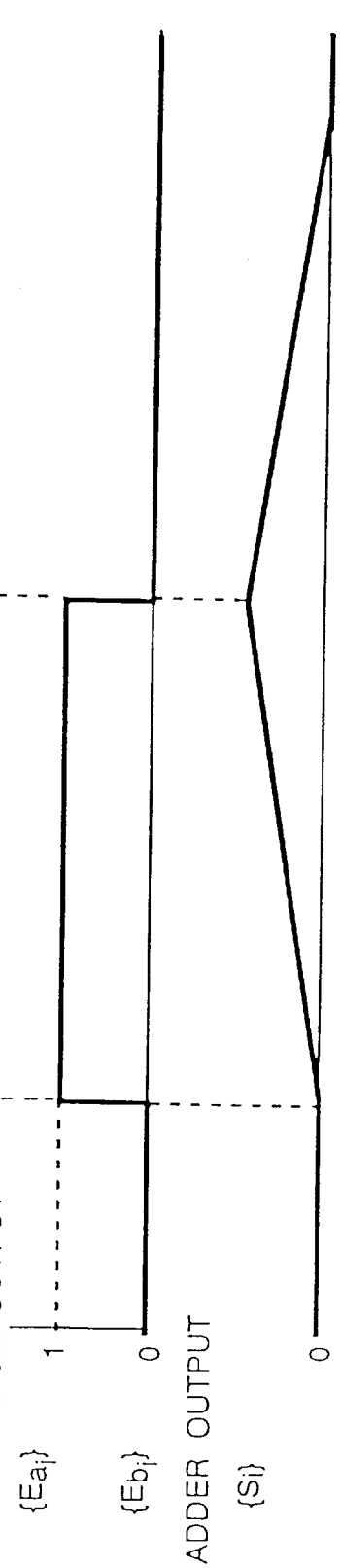
FIG. 25 illustrates the input/output data of the exclusive-OR circuit and adder output within the carrier slip compensating circuit of Embodiment 8.

Operations of exclusive-OR circuits 2204 and 2205 and adder 307 are explained using a figure. FIG. 25 shows $\{a_{i-M}\}$ and $\{a_i'\}$, $\{b_{i-M}\}$ and $\{b_i'\}$, and $\{Ea_i\}$ and $\{Eb_i\}$ and output $\{S_i\}$ from adder 307 at the time of the carrier slip occurrence. With errors caused by noise being ignored, if a carrier slip had not occurred, $\{Ea_1\}=\{Eb_i\}=0$ because $\{a_{i-M}\}$ and $\{a_i'\}$ and $\{b_{i-M}\}$ and $\{b_i'\}$ are the same data sequence. However, once a carrier slip occurs, first, $\{a_i'\}$ and $\{b_i'\}$ are inverted, and then $\{a_{i-M}\}$ and $\{b_{i-M}\}$ get inverted after M bits which correspond to delay time τ. Therefore, $\{Ea_i\}$ and $\{Eb_i\}$ output 1 for M-bit time period as shown in FIG. 25. $\{Ea_i\}$ and $\{Eb_i\}$ output from exclusive-OR circuits 2204 and 2205 are input into the M-bit shift registers, respectively, and the added values for M-bit time period are output from adder 307. Therefore, output $S_i$ from adder 307 when i-th signal is input to shift registers 2206 and 2207 can be expressed as below.

$$S_i = \sum_{j=i-M+1}^{i} \{Ea_j + Eb_j\}$$

[Equation 18]

Therefore, $S_i$ becomes added up value of $\{Ea_i\}$ and $\{Eb_i\}$ from M−1 symbol from the past to the present symbol. Therefore, if an outstanding peak has appeared for $S_i$, the outstanding peak is regarded as the occurrence of a carrier slip and coherently detected output is compensated. Output $S_i$ from adder 307 is input into peak search circuit 2208. At peak search circuit 2208, peak position of $S_i$ is searched and a carrier slip detection signal is output.

The adder in the carrier slip compensating circuit can be configured with an integrator composed of an adder and a delay unit, or of an exclusive-OR circuit and an up-down counter.

It is also possible for the peak search circuit of a carrier slip compensating circuit to obtain the peak position based on the timing of adder output crossing the predetermined threshold value.

The carrier slip detection signal output from peak search circuit 2208 is input into t-flip flop 309. Every time carrier slip detection signal is input, the output from t-flip flop 309 performs switching operation of outputting values 1 and 0 alternately. As the output from carrier slip detector 311, carrier slip compensation signal is output from t-flip flop 309. The carrier slip compensation signal is input into phase rotation circuit 310. The phase rotation circuit 310 inverts the coherently detected output output from delay circuit 301.

Even when a carrier slip has occurred and the code of coherently detected output is inverted, it can be known that the phase of coherently detected output is again rotated by phase rotation circuit 310. Therefore, even though the data code is inverted by a carrier slip, data code is again inverted so that the receiving data is to be compensated.

Compensated carrier slip output from carrier slip compensating circuit 2005 is input into serial-to-parallel converter 2006, and converted (separated) to four data sequences of $\{\alpha_i\}$, $\{\alpha_i'\}$, $\{\beta_i\}$, and $\{\beta_i'\}$.

A specific pattern is transmitted in advance prior to data transmission for synchronization so that output $\Gamma_i$ from parallel-to-serial converter 2004 of FIG. 20A at transmission time, e.g., $\Gamma_i=\{A_i, A_i', B_i, B_i'\}$ would correspond to output $\gamma_i=\{\alpha_i, \alpha_i', \beta_i, \beta_i'\}$ from serial-to-parallel converter 2206 at receiving time.

Because $\{\alpha_i'\}$ and $\{\beta_i'\}$ are given a delay time equivalent to M-bit data time period τ for $\{\alpha_i\}$ and $\{\beta_i\}$, respectively, the delay amount for both sequences can be made equal by giving a delay equivalent to M-bit data time period τ to $\{\alpha_i\}$, and $\{\beta_i\}$ by delay units 2007 and 2008. Combination circuits 2009 and 2010 combine $\{\alpha_{i-M}\}$ and $\{\alpha_i'\}$, and $\{\beta_{i-M}\}$ and $\{\beta_i'\}$. The outputs from combination circuits 2009 and 2010 are input into Viterbi decoder 2011, where maximum likelihood sequence is estimated. The Viterbi decoder operates as a maximum likelihood decoder for the convolutional encoding. The outputs from Viterbi decoder 2011, or outputs from the demodulation unit, are decoded by a voice decoder, etc., and then output as the data such as voice, images, and so on.

By using the characteristics of time diversity, e.g., transmitting identical data at differentiated timing and combining data equalized the delay at receiver, carrier slips of the coherent detection can be detected, and the data can be compensated. This leads to realize the preferable communication systems that has low bit error rate. Furthermore, by configuring that the convolutional encoding to be carried out by the transmitter and the Viterbi decoding by the receiver, it is advantageous in lowing the error rate for the same $E_b/N_0$.

$E_b$ means signal energy per 1 bit. $N_0$ means noise power density. $E_b/N_0$ is a variable for showing a ratio of signal energy per 1 bit versus noise power density.

Figure 26:
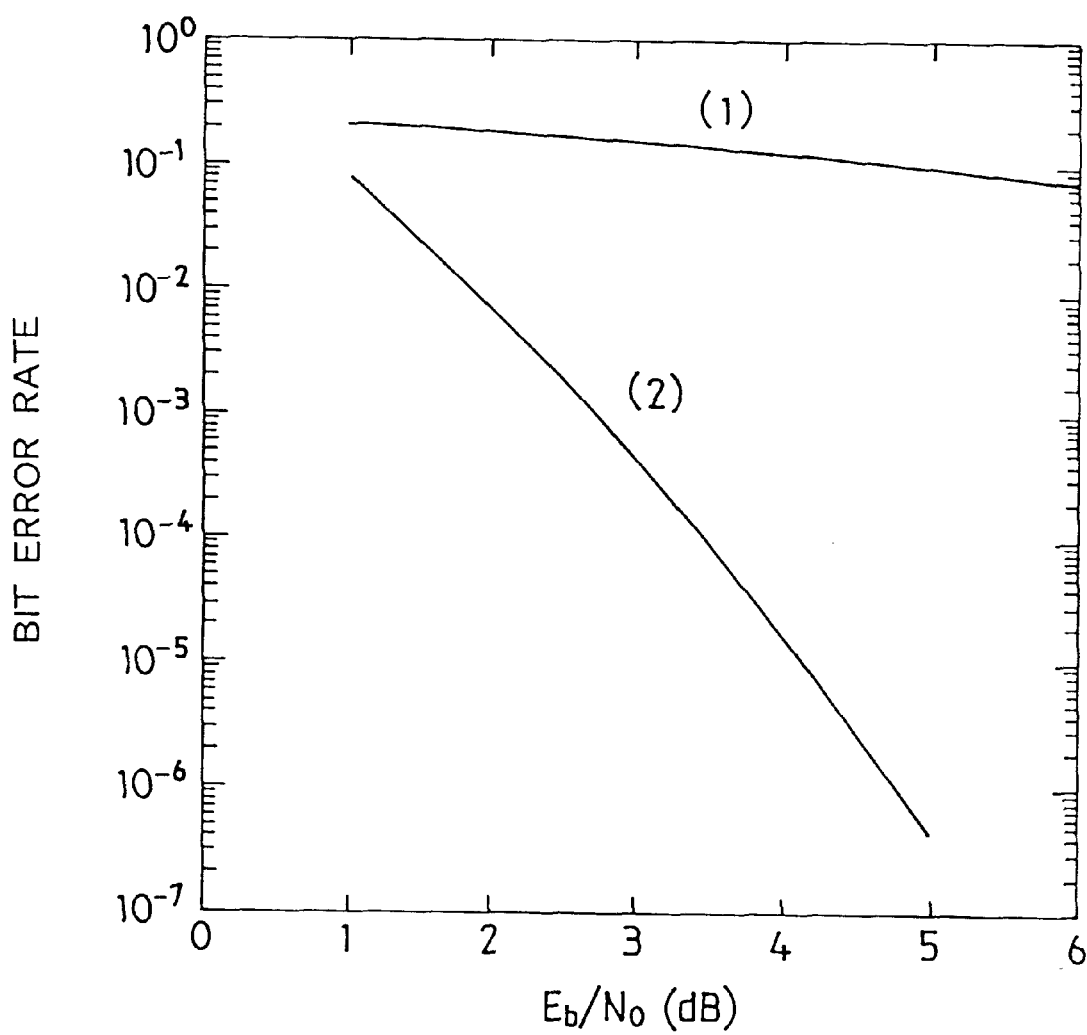
FIG. 26 shows the bit error rate according to Embodiment 8.

FIG. 26 shows the bit error rate when the convolutional encoding is performed and not performed. In FIG. 26, horizontal axis is $E_b/N_0$, and the vertical axis is the bit error rate. Curve (1) in the figure indicates the theoretical value of the bit error rate Pe=1/2erfc$(E_b/N_0)$1/2 when the BPSK modulation method is used. Curve (2) is the result obtained by the computer for the upper limit of the bit error rate when the convolutional encoding of constraint length K=7 is used in addition to the BPSK modulation method. The curve (2) indicates a much better bit error rate compared with the curve (1).

Combination circuits 2009 and 2010 in FIG. 20B can be also configured with equal gain combination of Embodiment 1, or maximum ratio combination of Embodiment 5, or with selecting combination of Embodiment 6.

Embodiment 9

Figure 27A:
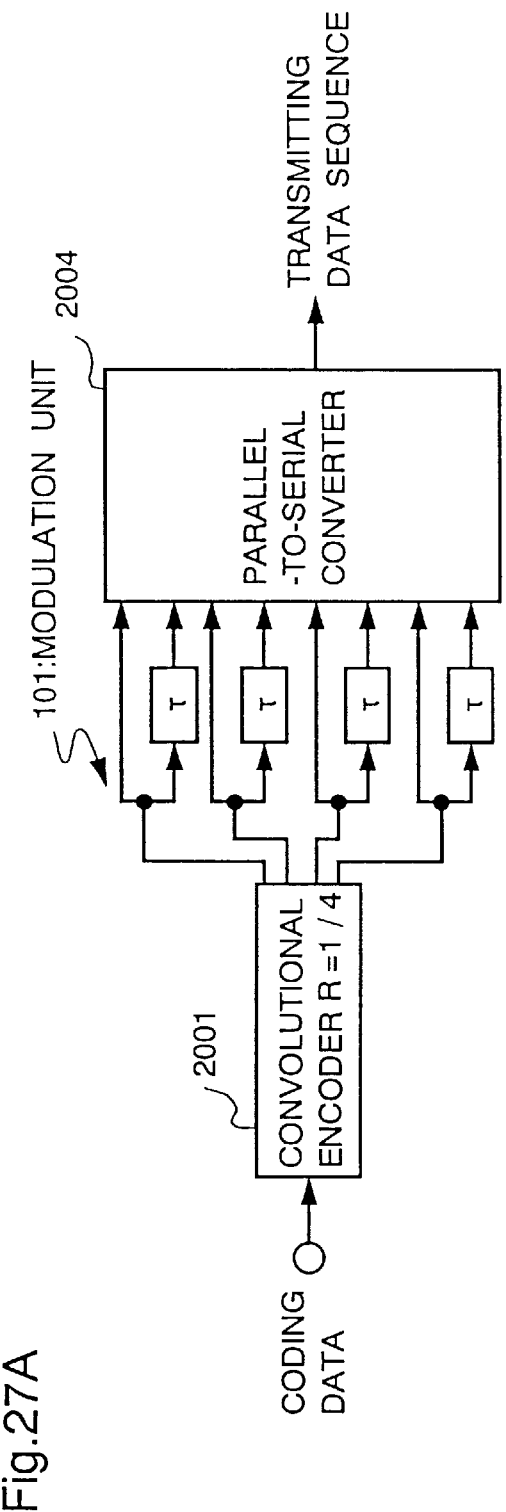
FIG. 27A shows the convolutional encoder, delay unit, and parallel-to-serial converter of the modulation unit.
Figure 27B:
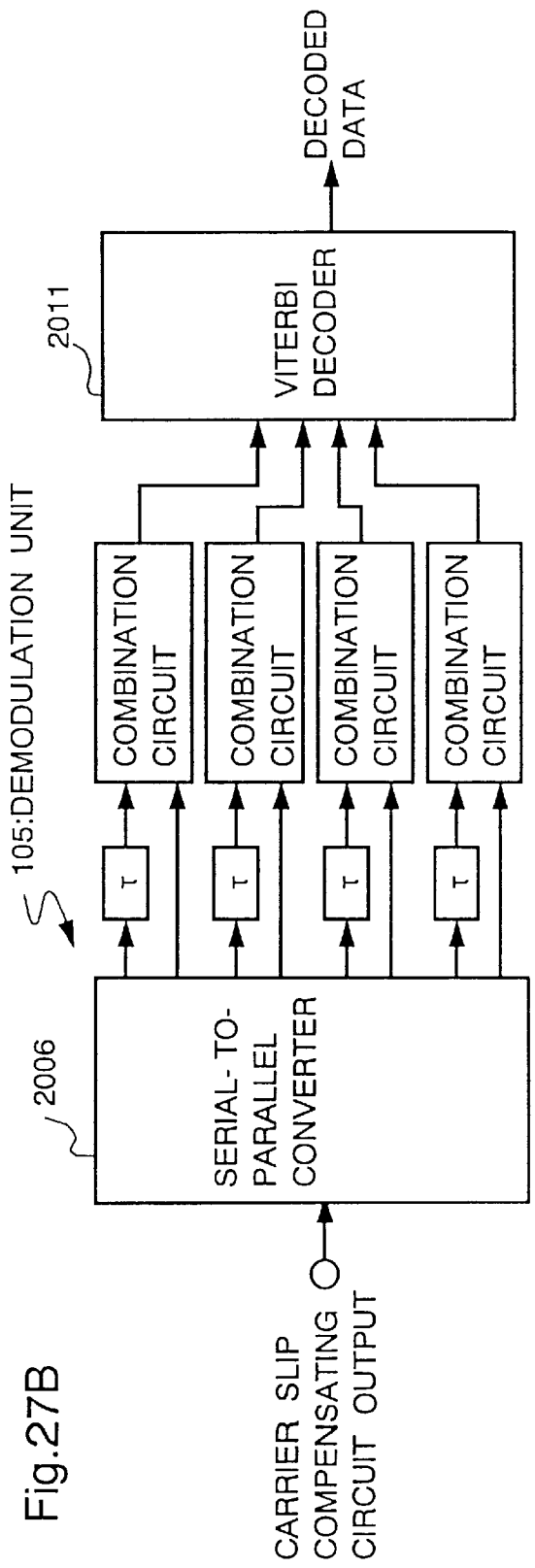
FIG. 27B shows the serial-to-parallel converter, delay units, combination circuits, and the Viterbi decoder of the demodulation unit according to Embodiment 9.

With the above Embodiment 8, coding rate R of convolutional encoder 2001 is set to 1/2 as shown in FIG. 20A, but it does not always have to be 1/2. For instance, in order to increase the coding rate, R could be made 3/4 by generating punctured code for the Viterbi decoding by deleting unit of the convolutional encoding bits periodically. Or, in order to raise error correction capability, the coding rate R could be made as 1/4 as shown in FIGS. 27A and 27B. When R is 1/4 as indicated in FIGS. 27A and 27B, because the parallel-to-serial converter corresponding to parallel-to-serial converter 2004 of FIG. 20A has 8 inputs, the output data rate becomes the data rate octuple of the input data sequence, and the output data rate of the serial-to-parallel converter corresponding to serial-to parallel converter 2006 becomes the ⅛th data rate of the input data sequence.

Embodiment 10

Figure 28A:
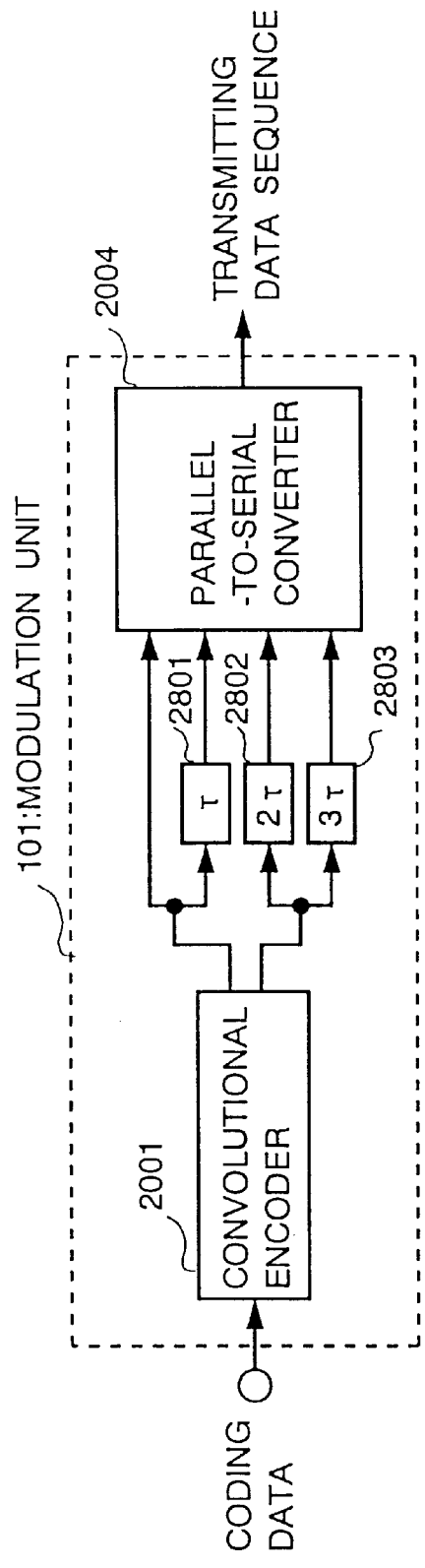
FIG. 28A shows the convolutional encoder, delay units, and parallel-to-serial converter of the modulation unit.
Figure 28B:
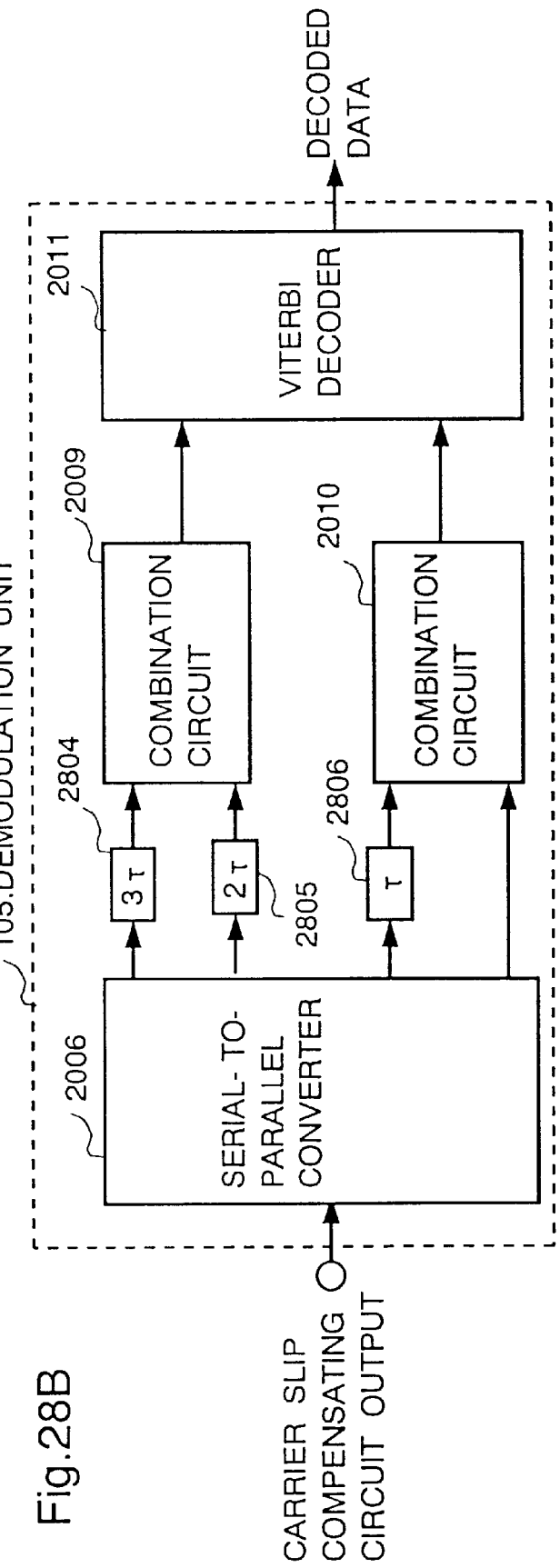
FIG. 28B shows the serial-to-parallel converter, delay units, combination circuits and the Viterbi decoder of the demodulation unit according to Embodiment 10.

In the above Embodiment 8, delay given by the transmitter and the receiver is set to time equivalent to M-bit data time period τ as shown in FIG. 20B. However, it does not always have to be τ, it is possible to make the sum of the delay given by modulation unit 101 and the delay given by demodulation unit 105 be made equal for each data sequence. For four data sequences shown in FIGS. 28A and 28B, for instance, delay of 0, ρ, 2τ, and 3τ can be given by modulation unit 101, and delay given by demodulation unit 105 could be set to 3τ, 2τ, τ, and 0 so as to make the delay amount equal.

Figure 29A:
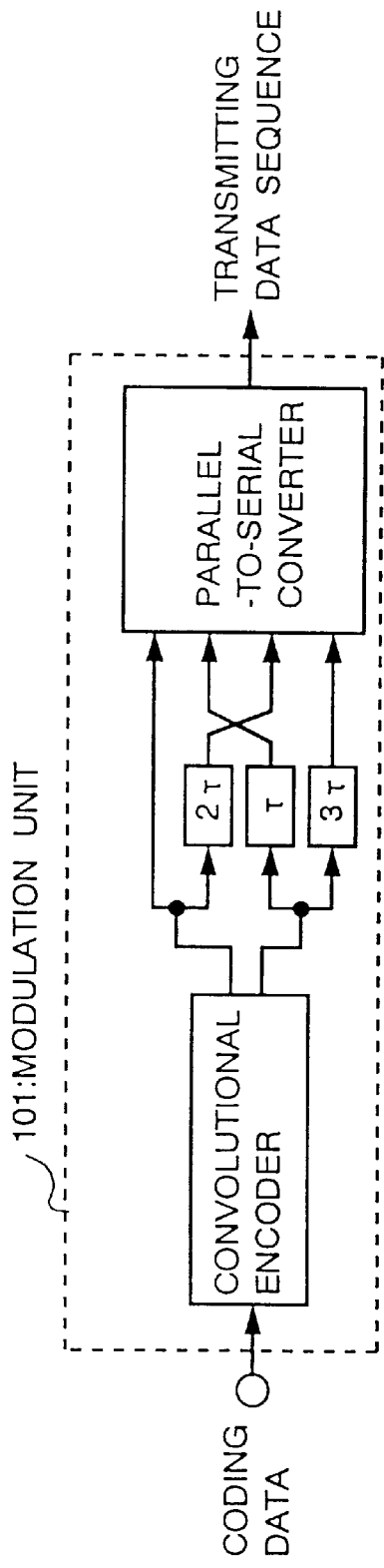
FIG. 29A shows the convolutional encoder, delay units, and parallel-to-serial converter of the modulation unit.
Figure 29B:
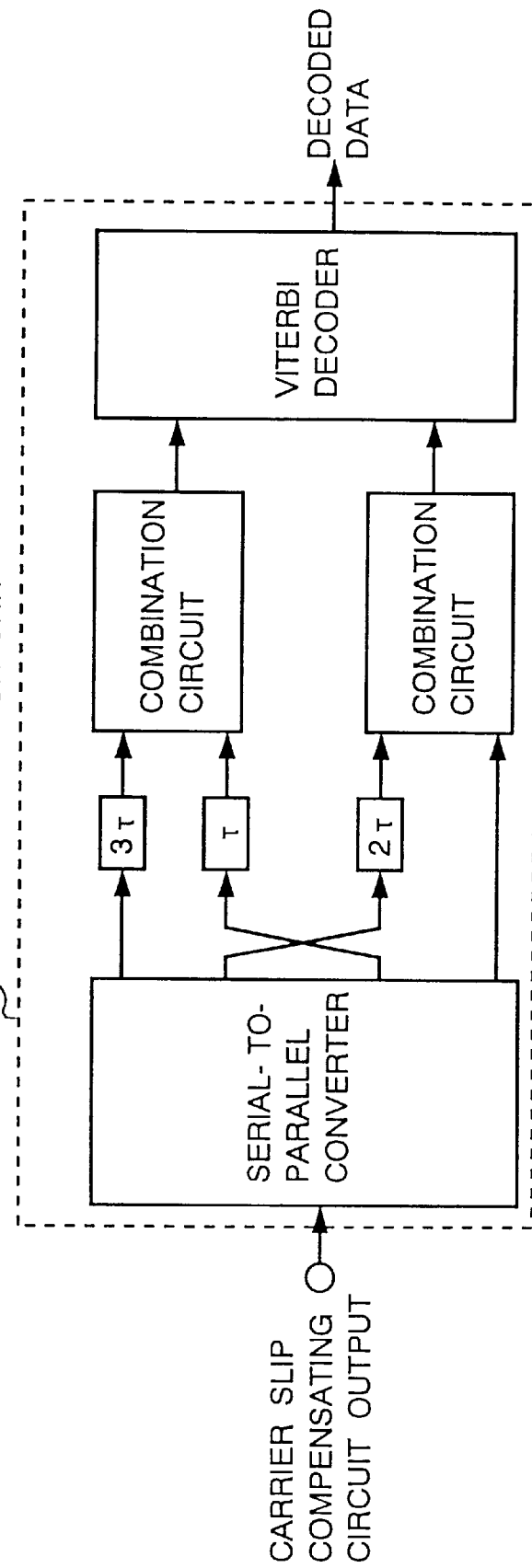
FIG. 29B shows the serial-to-parallel converter, delay units, combination circuits, and the Viterbi decoder of the demodulation unit of Embodiment 10.

It is also possible that the delay amount given to four data sequences can be set to 0, 2τ, τ, and 3τ by modulation unit 101, and 3τ, τ, 2τ, and 0 by demodulation unit 105 as shown in FIGS. 29A and 29B. In this case, because the delay amount each of the data sequences becomes 3τ, when the variation of receiving signal level due to the effects of fading, etc. is slow, improved effect by time diversity is larger compared with delay amount τ.

This explanation assumes that there are four data sequences, but it is not limited to four.

Embodiment 11

In order to improve the bit error rate, this embodiment attempts to perform the convolutional encoding of Embodiment 8 after the differential encoding.

FIGS. 30A and 30B show the configuration of the communication system of this Embodiment. Shown in the figure are a differential encoder 3001, a transparent convolutional encoder 3002 against the code inversion, and a differential decoder 3003. Explanations for the units identical or corresponding to FIGS. 20A and 20B are omitted by giving the identical numbers.

Next, the operation is explained. Similar to Embodiment 9, data such as voice, image, etc. is converted into digital signal by a voice coder, etc., and become data sequence to be transmitted. The data sequence to be transmitted is differentially encoded by differential encoder 3001, and then convolutionally encoded by the transparent convolutional encoder 3002 against code inversion with coding rate R=1/2. The transparent convolutional encode against code inversion means the convolutional encode for which the encoder output sequence also inverts as the encoder input sequence get inverted.

The transparent convolutional encode against code inversion is explained using a figure. FIG. 31 is a configuration example of the transparent convolutional encoder against code inversion with coding rate R=1/2 and constraint length K=7, and a 7-bit shift register 3101, and adders 3102 and 3103 having 2 as the modules. In FIG. 31, for instance, if the status of shift register 3101 of the convolutional encoder is D={1,1,0,1,0,0,1}, the convolutional encoder output (P,Q) becomes (0,1), however, when the D becomes the inverted status {0,0,1,0,1,1,0}, (P,Q) becomes (1,0) and the output also gets inverted. That is, when encoder input sequence gets inverted, encoder output sequence also gets inverted.

Two data sequences output from convolutional encoder 3002 of FIG. 30A are branched to two, one of which is input into parallel-to-serial converter 2004. The other is given delay time τ by delay units 2002 and 2003 having the delay time equivalent to M-bit data time period τ and then input into parallel-to-serial converter 2004. Parallel-to-serial converter 2004 converts (multiplexes) four parallel input data sequences into serial data sequence with the quadruple data rate of the input data sequence.

The output from parallel-to-serial converter 2004 is BPSK modulated by BPSK modulator 104, and after the modulation signal is electrically amplified by the radio-frequency amplifier, etc., it is transmitted (not shown). The transmitted radio wave is received by the receiver, and electrically amplified by the radio-frequency amplifier, etc. (not shown), and input into demodulation unit 105 and coherently detected by coherent detector circuit 106. The output from coherent detector circuit 106 is input into carrier slip compensating circuit 2005 and then carrier slip compensation is performed.

The output from carrier slip compensating circuit 2005 is input into serial-to-parallel converter 2006, and converted (separated) into four data sequences of $\{\alpha_i\}$, $\{\alpha_i'\}$, $\{\beta_i\}$, and $\{\beta_i'\}$. Because $\{\alpha_i'\}$ and $\{\beta_i'\}$ are given delay equivalent to M-bit data time period τ for $\{\alpha_i\}$ and for $\{\beta_i\}$ at transmission time, the delay amount for both sequences can be equalized by giving delay time equivalent to M-bit data time period τ to $\{\alpha_i\}$ and $\{\beta_i\}$ by delay units 2007 and 2008. Combination circuits 2009 and 2010 combine $\{\alpha_{i-M}\}$ and $\{\alpha_i'\}$ and $\{\beta_{i-M}\}$ and $\{\beta_i'\}$ having the equalized delay amount. The outputs from combination circuits 2009 and 2010 are input into Viterbi decoder 2011 which is the maximum likelihood decoder for the convolutional encodes to perform maximum likelihood decoding.

Now, the Viterbi decoding sequence is explained. Because the convolutional encoder is transparent against the code inversion as has explained before, when the code of differential encoding sequence gets inverted, the convolutional encoding sequence also gets inverted and the differential encoding sequence and the convolutional encoding sequence correspond one to one. When errors caused by noise is ignored, the differential encoding sequence and the decoding sequence become identical, and when the code of convolutional encoding sequence gets inverted due to the carrier slip occurrence, the code of decoding data sequence also get inverted. Therefore, the differential encoding and differential decoding are applied to the input data sequence and the output data sequence of the Viterbi decoder, respectively, even when the deterioration of the bit error rate cannot be fully restricted with the carrier slip compensating circuits only, correct decoder output can be achieved without deteriorating the bit error rate of the channel.

The output from Viterbi decoder 2011 is input into differential decoder 3003, and the differential decoding is performed and the decoder output is obtained. Decoder output is decoded by a voice decoder, etc., and then output as the data such as voice, images, and so on.

By using the characteristics of time diversity, e.g., transmitting identical data at differentiated timing and combining data equalized the delay at receiver, carrier slips of the coherent detection can be detected, and the data can be compensated. This leads to realize the preferable communication systems that has low bit error rate. Furthermore, by using the transparent convolutional encode against code inversion as the convolutional encode, and by performing the convolutional encoding after differential encoding by the transmitter, and by performing the differential decoding after Viterbi decoding by the receiver, because, for instance, receiving SN ratio is quite low, and the carrier slip occurs frequently, or because the carrier slip occurrence interval is short, and even if the carrier slip compensating circuit alone cannot suppress the deterioration of the bit error rate characteristics sufficiently, the correct demodulator output can be obtained without deteriorating the bit error rate of the channel and lowering the error rate in the same $E_b/N_0$.

Figures 32A, 32B:
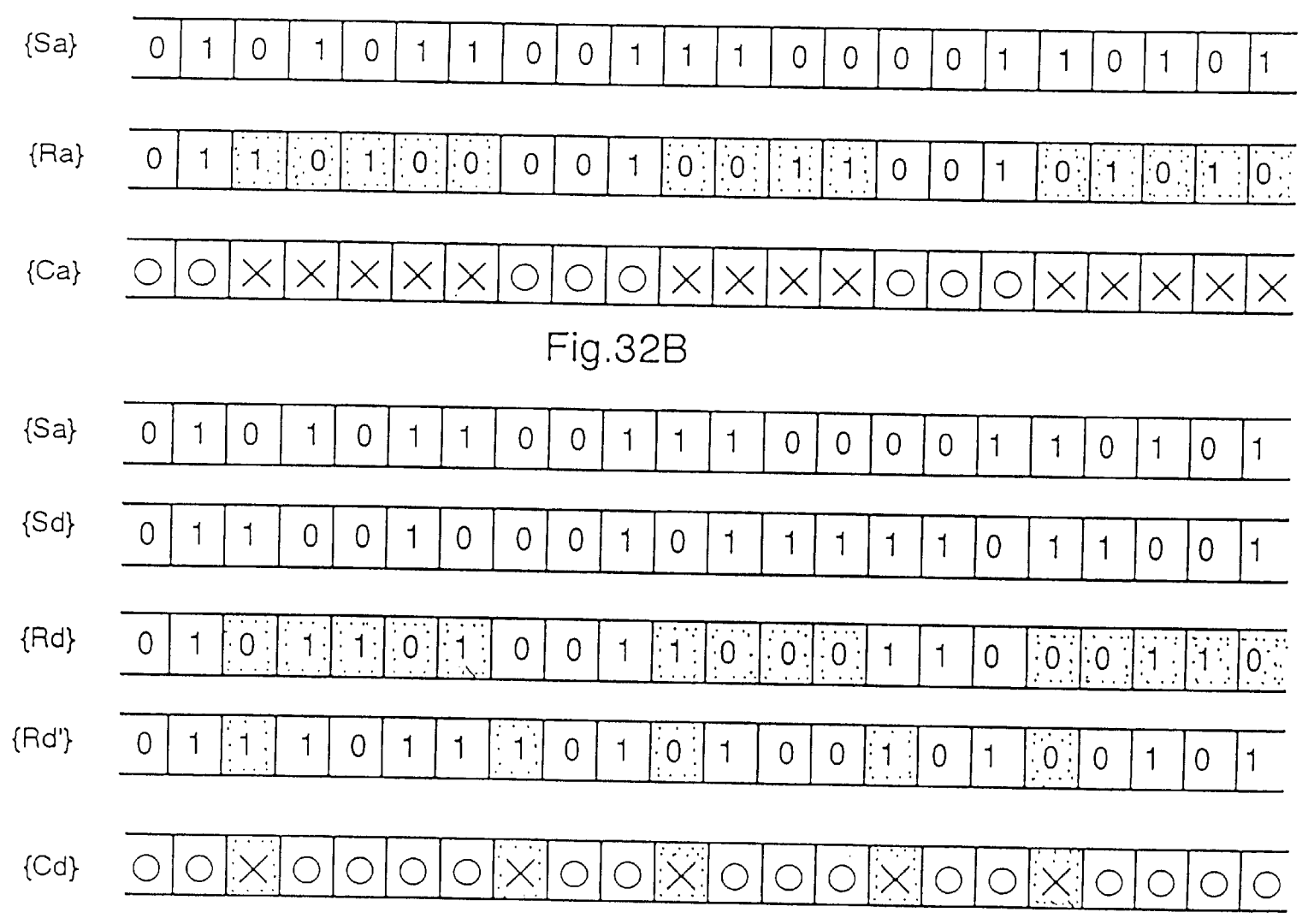

The error conditions when the carrier slip occurs frequently is explained with reference to figures. FIG. 32A shows the error condition when the differential encoding and differential decoding are not performed before the convolutional encoding and after the Viterbi decoding, and FIG. 32B shows the error condition when the differential encoding and differential decoding are performed before the convolutional encoding and after Viterbi decoding. In FIG. 32A, the transmission data sequence for which the differential encoding is not performed at the transmitting side is assumed to be {Sa}. It is known that the error of receiving data sequence {Ra} at this time tends to become a burst error as shown with dotted areas. Burst errors for {Ra} occur frequently due to the radio frequency of carrier slip occurrence, so the error rate deteriorates when the differential encoding and differential decoding are not performed as shown in {Ca} because {Ra} becomes a demodulator output. On the other hand, FIG. 32B shows when the differential encoding and differential decoding are performed before the convolutional encoding and after Viterbi decoding. That is, the sequence for which the differential encoding is performed for the transmission data sequence {Sa} is assumed to be {Sd}. The receiving data sequence {Rd} at this time makes a burst error compared with {Sd} as shown in FIG. 32B, however, when {Rd} is differentially decoded, the demodulation data becomes {Rd'}, and errors can be reduced as shown in {Cd}.

Figure 33:
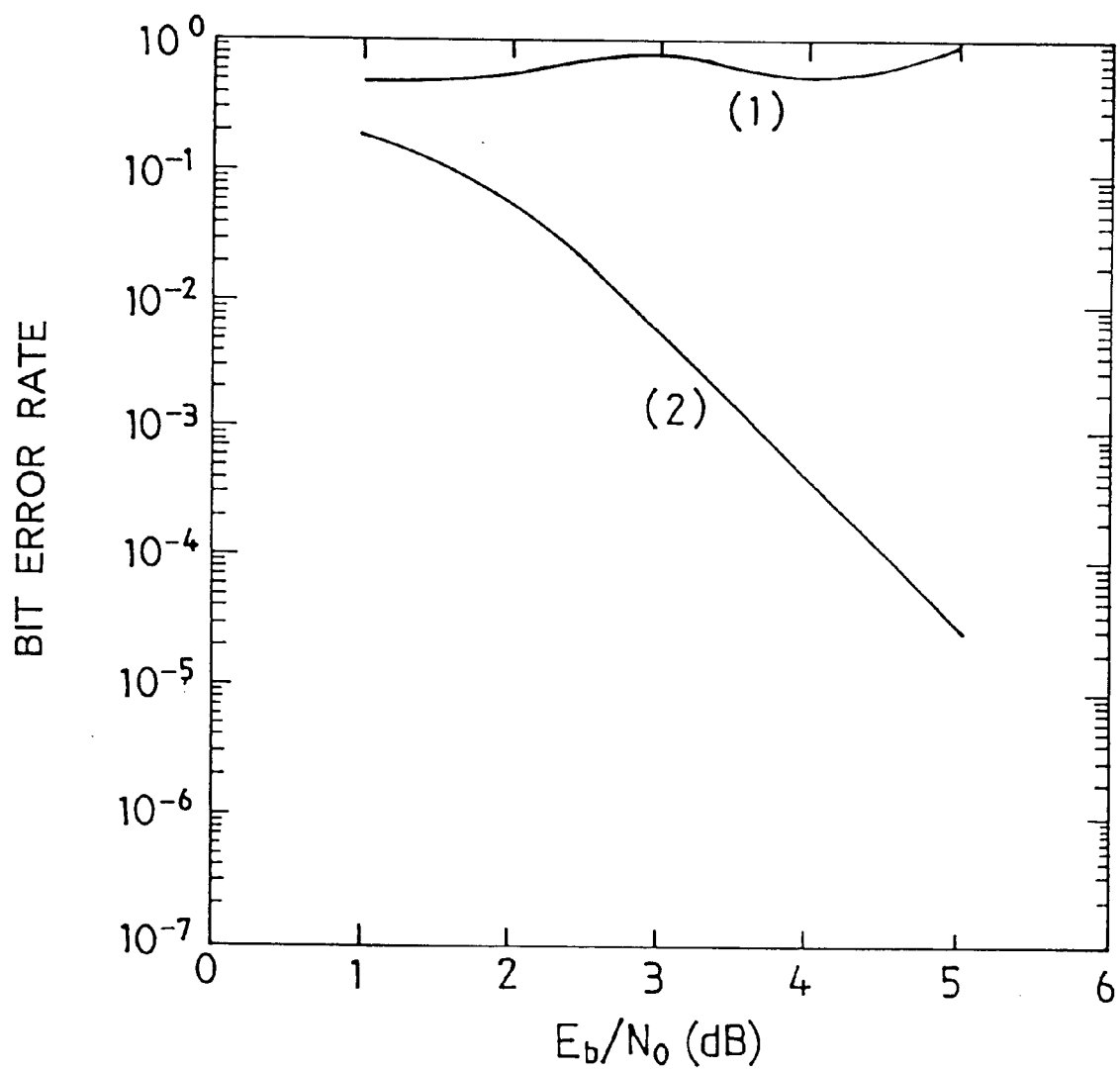
FIG. 33 shows the bit error rate according to Embodiment 11.

FIG. 33 shows the bit error rate when the differential encoding and differential decoding is performed before the convolutional encoding and after Viterbi decoding and when they are not. In FIG. 33, the horizontal axis shows $E_b/N_0$ and the vertical axis shows the bit error rate. Curve (1) shows when the differential encoding and differential decoding are not performed before the convolutional encoding and after Viterbi decoding, while curve (2) shows when they are performed. It can be seen that (2) shows better bit error rate than (1).

Embodiment 12

As another example of Embodiment 8 and Embodiment 10, this embodiment attempts the transmission of spectrum spreading after the BPSK modulation and then receives through inverse spreading for the coherent detection.

This embodiment is explained with figures. FIGS. 34A and 34B illustrate another example of Embodiment 8, adding spreading circuit 3401 and inverse spreading circuit 3402 to FIGS. 20A and 20B of Embodiment 8. Explanation for the units identical or similar to FIGS. 20A and 20B is omitted by giving the identical number.

FIGS. 35A and 35B show another example of Embodiment 10, adding spreading circuit 3401 and inverse spreading circuit 3402 to FIGS. 30A and 30B of Embodiment 10. Explanation for the units identical or similar to FIGS. 30A and 30B is omitted by giving the identical number.

The explanation of operation up to the BPSK modulation is omitted. The operation after BPSK modulation is explained. In FIG. 34A and FIG. 35A, the outputs from parallel-to-serial converter 2004 are BPSK modulated by BPSK modulator 104, and then input into spreading circuit 3401 to allow spectrum spreading.

Figure 36:
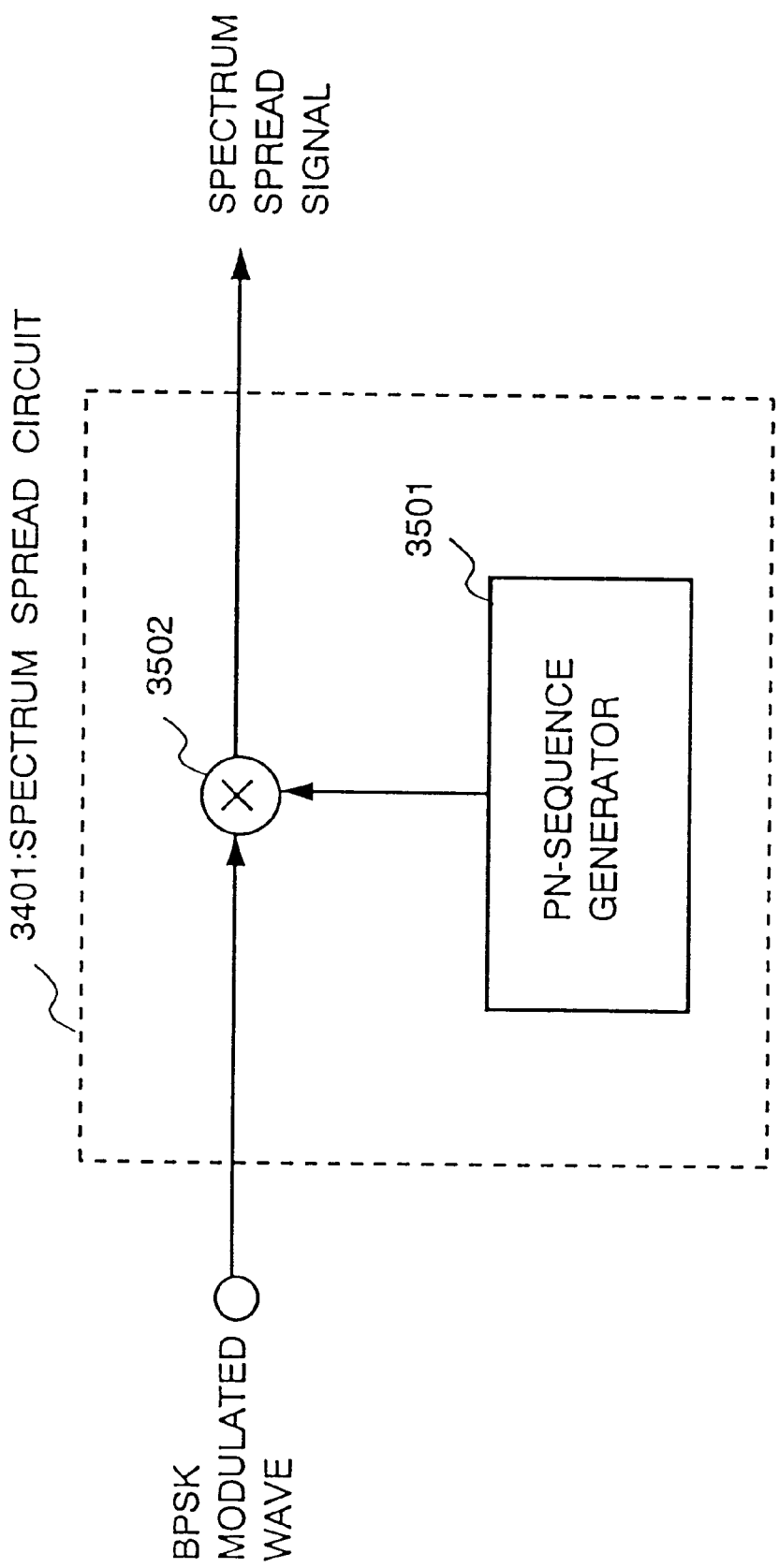
FIG. 36 shows the configuration of the spread circuit according to Embodiment 12.

The operation of spreading circuit 3401 is explained with a figure. FIG. 36 shows a configuration example of spreading circuit 3401. In FIG. 36, a PN sequence generator 3501, and a multiplier 3502 are shown. Modulated signal input into spreading circuit 3401 is input into multiplier 3502. The PN sequence generator 3501 generates the PN sequence with the rate higher than the modulation data rate. In multiplier 3502, the PN sequence is multiplied by the serial data sequence (modulated signal) and spectrum spreading signal is output.

Figure 37:
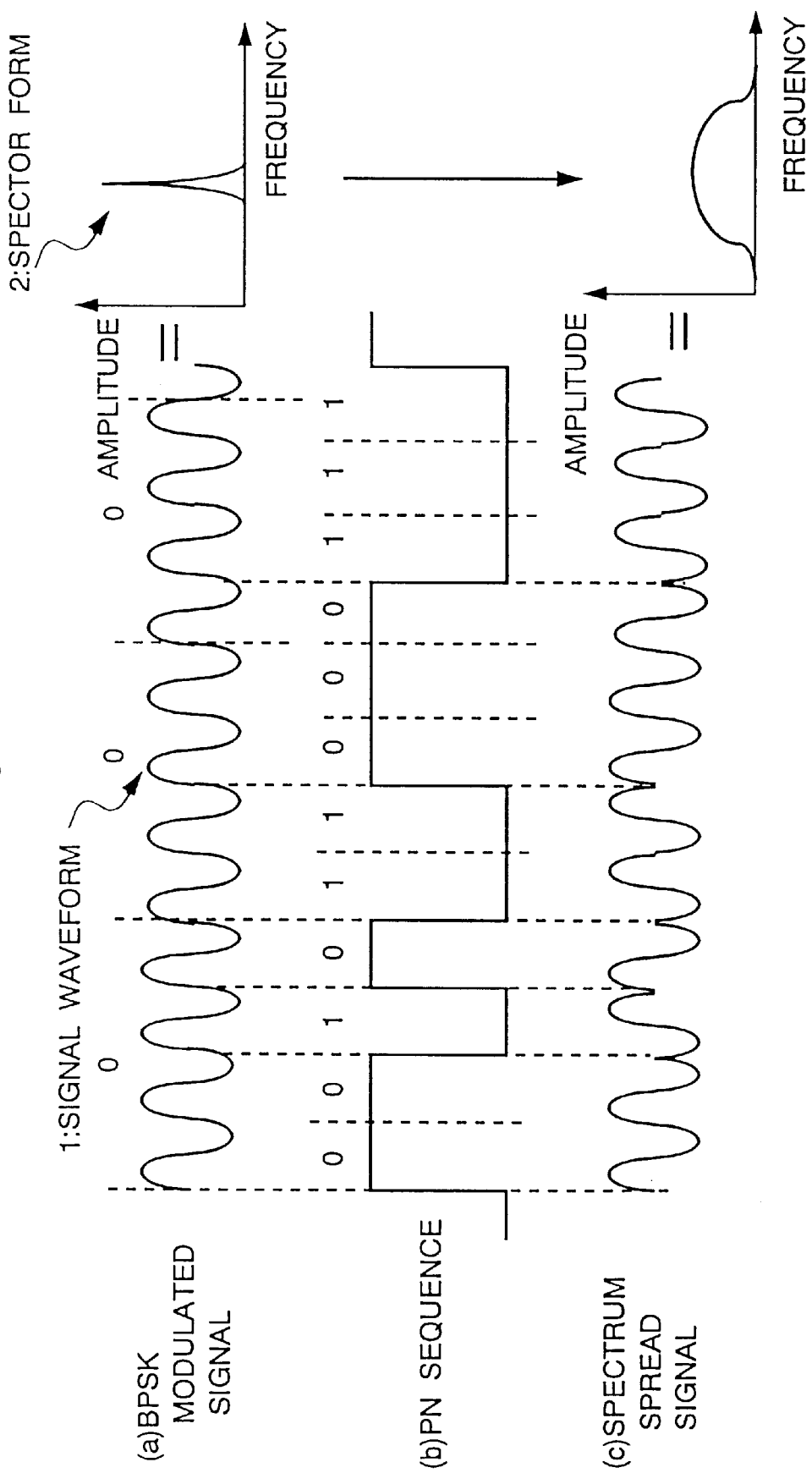
FIG. 37 explains the spread circuit operation according to Embodiment 12.

Signal waveform 1 illustrated in FIG. 37 shows waveforms of BPSK modulated signal (a), PN sequence (b), and spectrum spreading signal (c) and Spectrum form 2 shows spectrum forms of BPSK modulated signal (a) and spectrum spreading signal (c). In FIG. 37, the BPSK modulated signal (a) with the narrow-band spectrum is multiplied by the PN sequence (b) having the rate higher than the modulation data rate, and then converted into the spectrum spreading signal (c). As shown in FIG. 37, the band of the spectrum spreading signal becomes wider than that of the BPSK modulated signal.

The spectrum spreading signal output from spread circuit 3401 of FIG. 34A and FIG. 35A is electrically amplified by the radio-frequency amplifier, etc., and then transmitted (not shown). The transmitted radio wave is received by the receiver and amplified by the radio-frequency amplifier, etc. (not shown), and then input into demodulation unit 105, to inverse spread circuit 3402 so as to allow inverse spectrum spreading.

Figure 38:
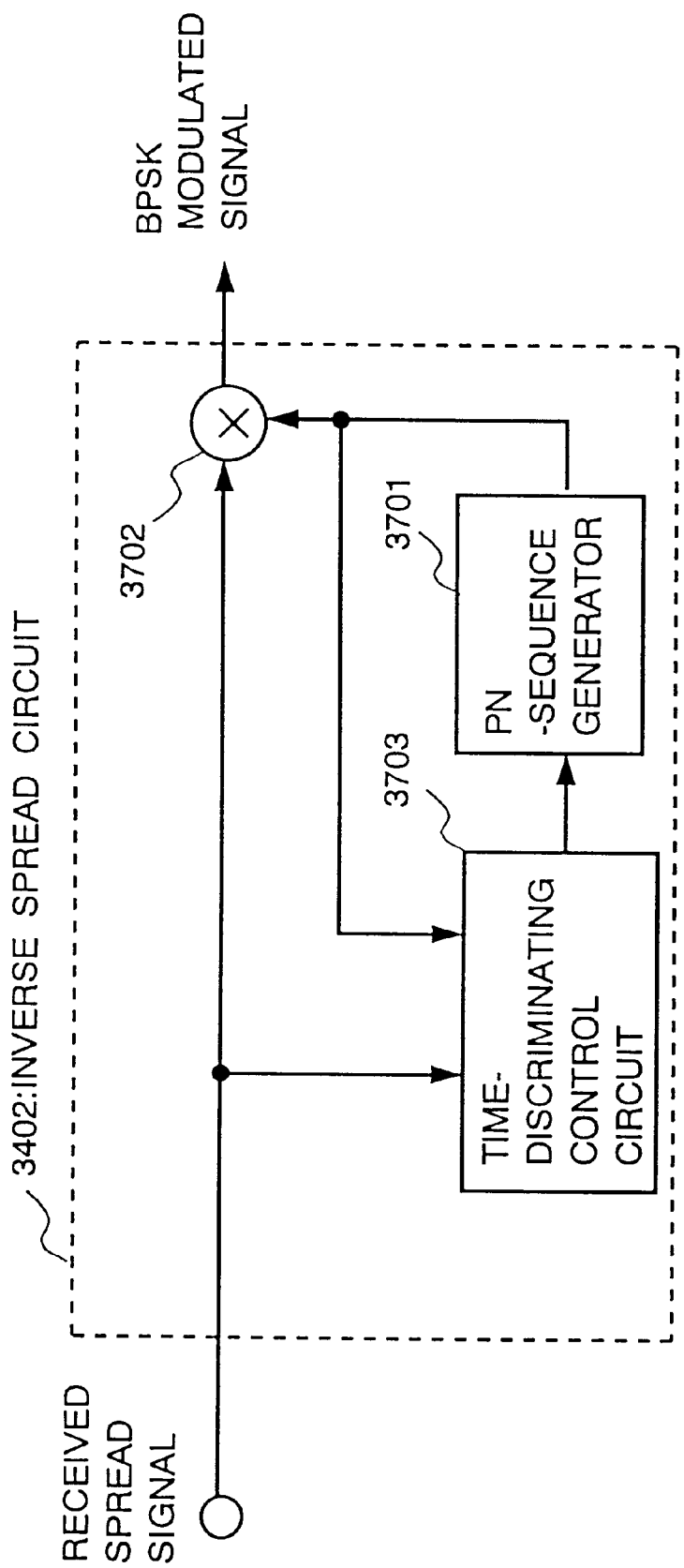
FIG. 38 shows the inverse spread circuit configuration according to Embodiment 12.

The operation of the inverse spreading circuit is explained with reference to a figure. FIG. 38 shows a configuration example of the inverse spread circuit. In FIG. 38, a PN sequence generator 3701, a multiplier 3702, and a time-discriminating control circuit 3703 are shown. The received spreading signal input into inverse spread circuit 3402 is input into time-discriminating control circuit 3703 to control PN sequence generator 3701 so that the PN sequence output from PN sequence generator 3701 would synchronize with the PN sequence of the transmitter. The received spreading signal is then input into multiplier 3702, and multiplied by the PN sequence synchronized with the transmitter output from PN sequence generator 3701 by multiplier 3702 and the BPSK modulated signal is output.

Figure 39:
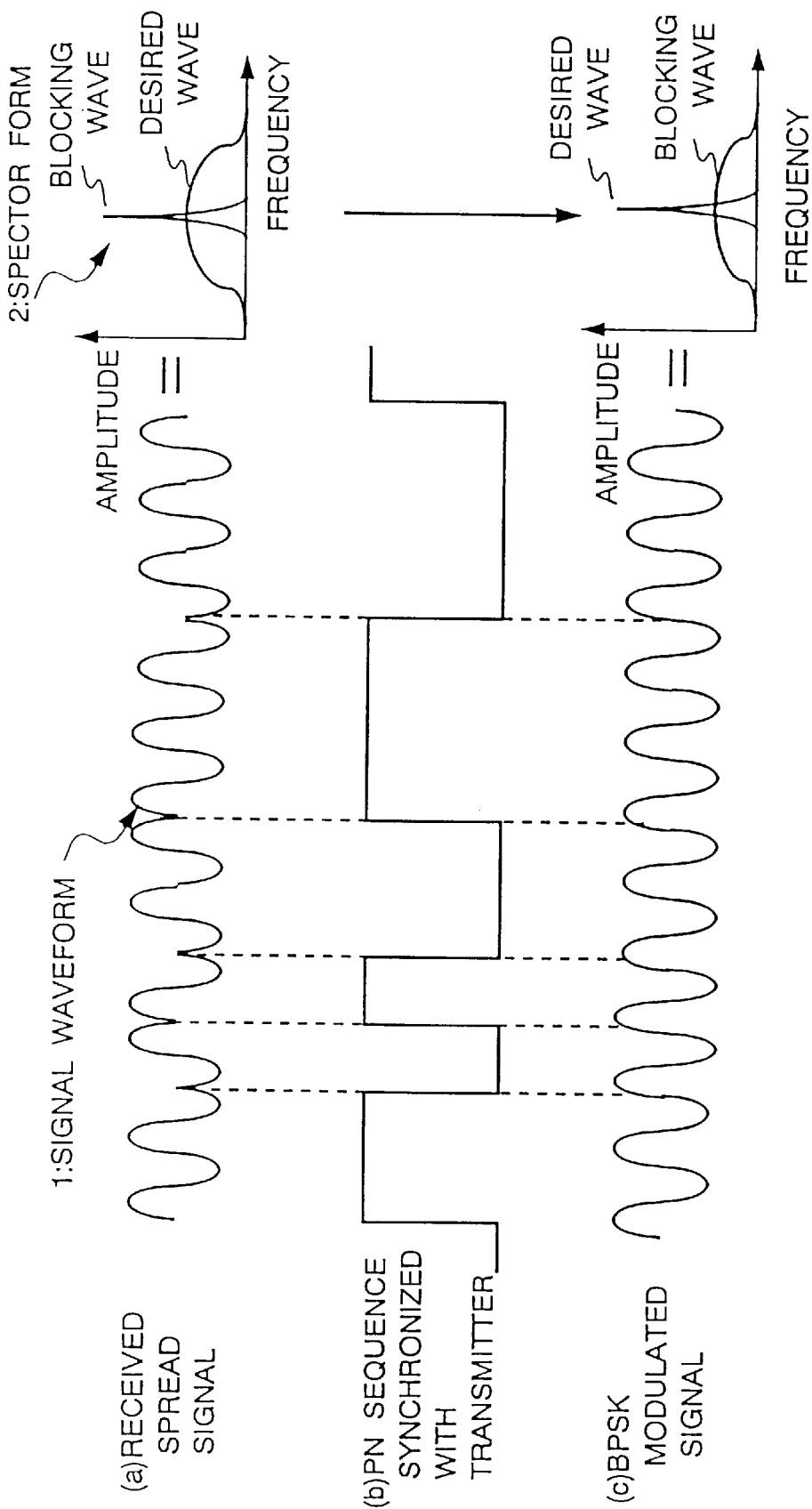
FIG. 39 explains the inverse spread circuit operation according to Embodiment 12.

Signal waveform 1 illustrated in FIG. 39 shows waveforms of received spreading signal (a), the PN sequence (b) synchronized with the transmitter and the waveform (c) of the BPSK modulated signal, and Specter form 2 shows the specter forms of received spreading signal (a) and the BPSK modulated signal (c). In FIG. 39, it is assumed that the received spreading signal (a) contains narrow-band interfering wave from other stations besides the desired wide-band wave. When the received spreading signal is multiplied by the PN sequence (b) synchronized with the transmitter, the correlation receiving is performed, realizing the BPSK modulated signal (c) having a narrow-band spectrum. Because the interfering wave from other stations is not spread at the transmitter, it is not correlatively received but spectrum spread and converted into low-level signal as shown in (c). That is, the spectrum spreading system is to perform the spectrum spreading at the transmitter, and the inverse spreading at the receiving side, the interfering effects from other stations are reduced.

The BPSK modulated signal output from inverse spread circuit 3402 of FIG. 34B and FIG. 35B is coherently detected by coherent detector circuit 106. The output from coherent detector circuit 106 is input into carrier slip compensating circuit 2005 and the carrier slip compensation is performed. Other operations are the same as FIG. 20B or FIG. 30B.

In the above operation, the application of time diversity technique characteristics of transmitting identical data at differentiated timing, and performing combination receiving by making delay amount equal at the receiving side, a carrier slip is detected by the coherent detection to compensate data, so that better communication with low bit error rate can be achieved. Furthermore, by the configuration of performing the convolutional encoding by the transmitter and Viterbi decoding by the receiver, or by performing the differential encoding and convolutional encoding using the transparent convolutional code against code inversion by the transmitter and Viterbi decoding and differential decoding by the receiver, it is advantageous in that the error rate can be lowered for the identical $E_b/N_0$. Moreover, by realizing the spectrum spreading communication system by performing spectrum spreading and inverse spreading at data transmission and receiving, a robust communication system against interference or interruption and with excellent secrecy can be offered.

The above example represented a configuration in which the spectrum spreading is performed after the BPSK modulation is performed by the transmitter, and inverse spreading is performed by the receiver, and then coherent detection is performed. However, it does not always have to be in this order, the BPSK modulation can be performed after the spectrum spreading and inverse spreading can be performed after the coherent detection.

Embodiment 13

As shown in FIGS. 1A and 1B, all embodiments explained so far has the configuration of performing coherent detection by the coherent detector circuit and then carrier slip compensation is performed by the carrier slip compensating circuit. This embodiment, however, feeds carrier slip compensation signal back the coherent detector circuit.

The modulation unit of the transmitter of this embodiment is the same as that of Embodiment 1 and its explanation is omitted.

Figure 40A:
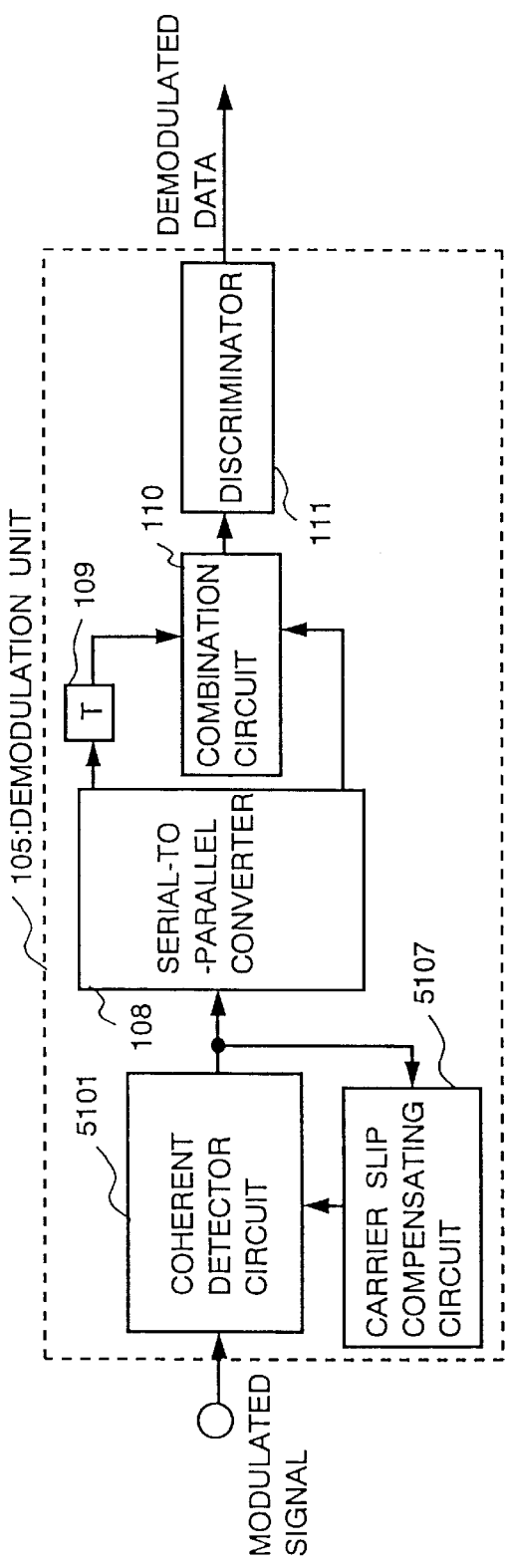
FIG. 40A shows the configuration of the demodulation unit.

FIG. 40A shows the configuration of the receiver of this embodiment, and a coherent detector circuit 5101 and carrier slip compensating circuit 5107 are shown. Other elements are the same as Embodiment 1 and their explanation is omitted.

The operation is explained. Radio wave from the transmitter is received by the receiver, electrically amplified by the radio-frequency amplifier, etc. (not shown), and input into demodulation unit 105 and then coherently detected by coherent detector circuit 5101.

Figure 41:
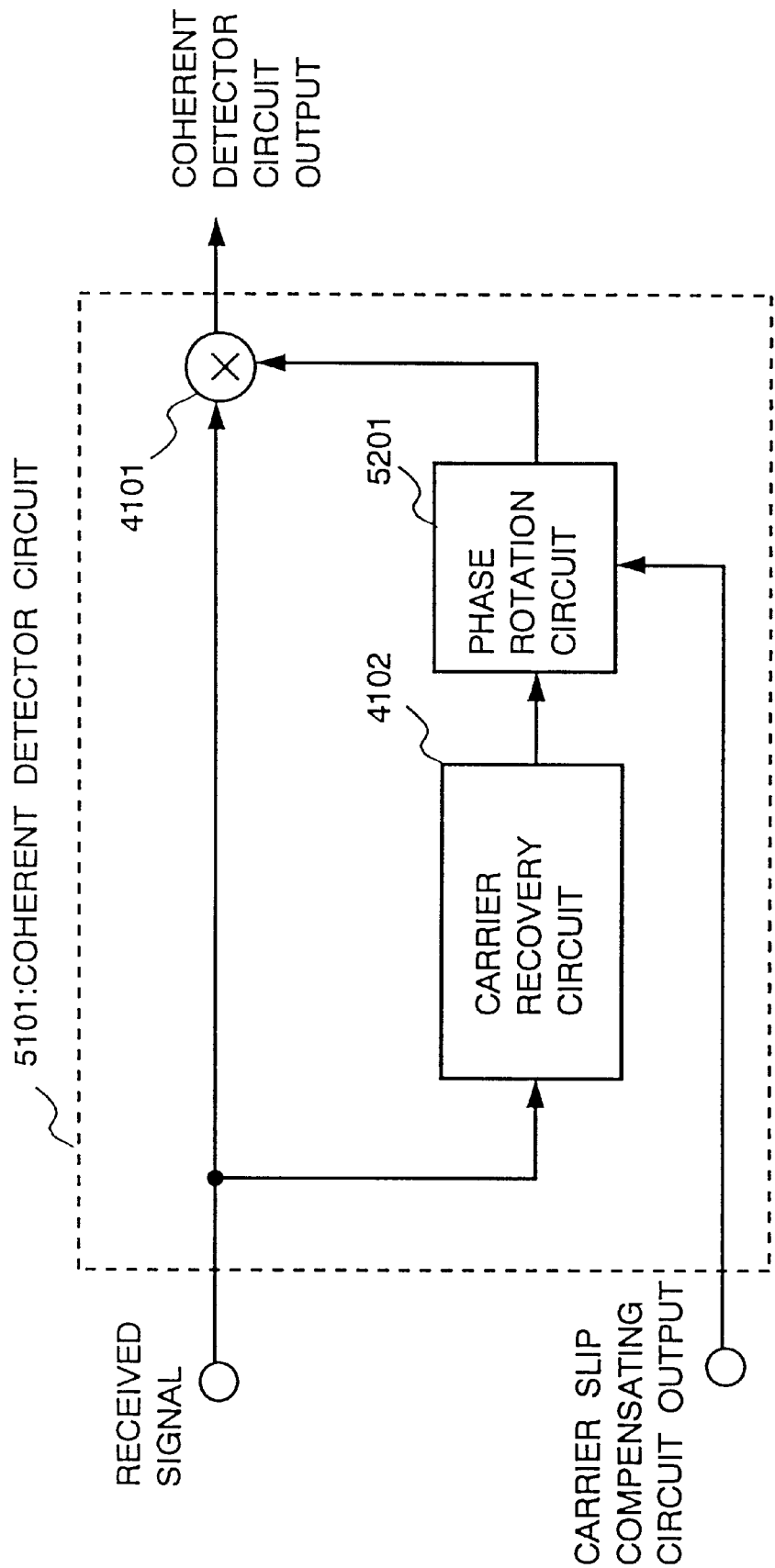
FIG. 41 shows the configuration of the coherent detector circuit slip compensating circuit according to Embodiment 13.
Figure 42A:
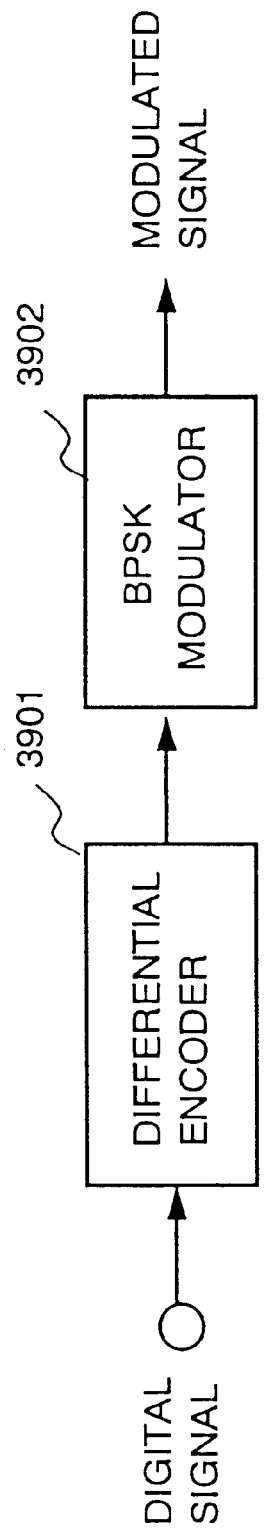
FIGS. 42A and 42B show the configurations of the conventional communications system.
Figure 42B:
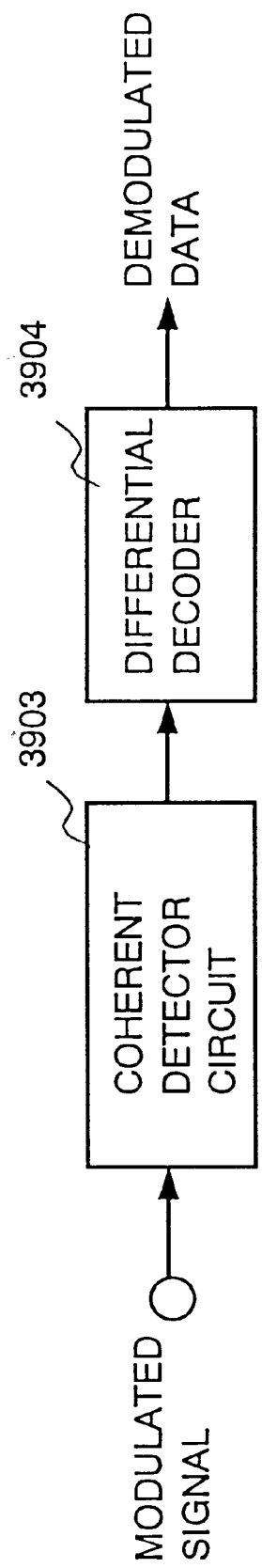
Figure 43:
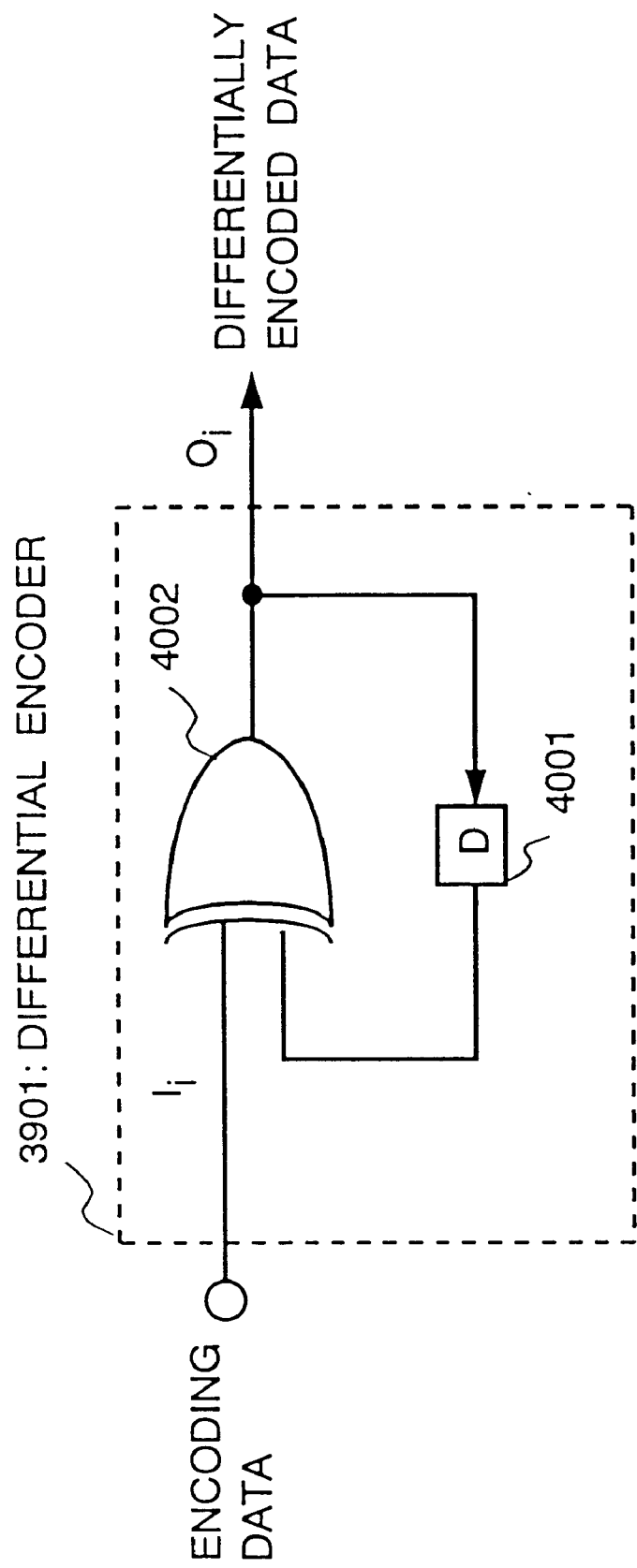
FIG. 43 shows the configuration of the conventional differential encoder.

The configuration of coherent detector circuit 5101 is shown in FIG. 41. Coherent detector circuit 5101 is the combination of the carrier wave recovery circuit 4102 shown in FIG. 44 in the related art and phase rotation circuit 5201. In FIG. 41, the recovered carrier wave output from carrier wave recovery circuit 4102 is input into phase rotation circuit 5201 so that the phase is to be rotated, and the received signal is coherently detected by multiplier 4101.

Figure 40B:
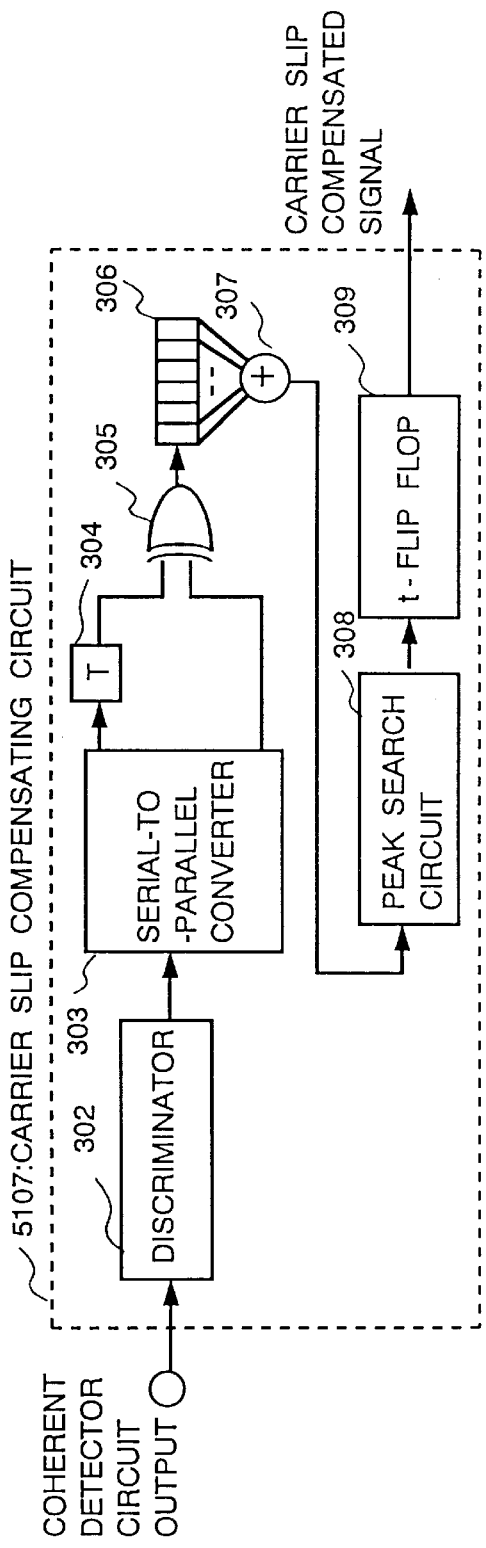
FIG. 40B shows the configuration of the carrier slip compensating circuit according to Embodiment 13.

The output from coherent detector circuit 5101 is input into carrier slip compensating circuit 5107 and then carrier slip compensation is performed. FIG. 40B shows a configuration example of carrier slip compensating circuit 5107, and it is the same as the configuration shown in Embodiment 1 (FIG. 3) except that the output from carrier slip compensating circuit 5107 is connected to coherent detector circuit 5101.

The carrier slip compensating signal is input into phase rotation circuit 5201 of coherent detector circuit 5101 shown in FIG. 41 and rotates the carrier wave phase. That is, when carrier slip compensation signal is 0, the data code is not inverted because the carrier slip has occurred in even number, and carrier wave phase does not rotate. On the other hand, when the carrier slip compensation signal is 1, data code is inverted due to the carrier slip, that is, phase rotation circuit 5201 rotates the carrier wave phase by 180 degrees. The effects of carrier slip can be compensated in this way.

By feeding the carrier slip compensation signal back coherent detector circuit 5101 and by rotating the carrier wave phase of the coherent detection by 180 degrees, carrier slip compensating circuit 5107 of this Embodiment can do without delay circuit 301 of FIG. 3 compared with carrier slip compensating circuit 107 of Embodiment 1.

The carrier slip compensated output from coherent detector circuit 5101 of FIG. 40A is input into serial-to-parallel converter 108, and converted (separated) into two data sequences of $\{\alpha_i\}$ and $\{\beta_i\}$. Because $\{\beta_i\}$ is given a delay equivalent to N-bit data time period T against $\{\alpha_i\}$ at transmission time, the delay amount for both sequences can be made equal by giving a delay equivalent to N-bit data time period T to $\{\alpha_i\}$ by delay unit 109. Combination circuit 110 combines $\{\alpha_{i-M}\}$ and $\{\beta_i\}$ having the equal delay amount.

The output from combination circuit 110 is input into discriminator 111 and discriminator 111 discriminates whether the data is 0 or 1 depending on the real part re, and the discriminated values is decoded as the demodulator output by the voice encoder, etc., and then output as the data such as voice, images, and so on.

In the above operation, by feeding carrier slip compensation signal output by the carrier slip compensating circuit back the coherent detector circuit, and by rotating the recovered carrier phase of the coherent detector circuit by 180 degrees, the delay circuit which is the configuration element of the carrier slip compensating circuit can be omitted and therefore the number of elements can be reduced.

Having thus described several particular embodiments of the invention, various alterations, modifications, and improvements will readily occur to those skilled in the art. Such alterations, modifications, and improvements are intended to be unit of this disclosure, and are intended to be within the spirit of scope of the invention. Accordingly, the foregoing description is by way of example only, and not intended to be limiting. The invention is limited only as defined in the following claims and the equivalents thereto.

What is claimed is:

1. A communication system, comprising:
   a transmitter which inputs transmission data, generates delayed data giving a determined time delay to the transmission data, multiplexes the delayed data to no delayed data of the transmission data for generating multiplexed data, modulates the multiplexed data using Binary Phase Shift Keying (BPSK) modulation for generating a transmission signal, and transmits the transmission signal, and
   a receiver which receives the transmission signal transmitted by the transmitter as a receiving signal, detects a carrier slip based on at least one of the delayed data and the no delayed data included in the receiving signal, compensates the carrier slip, and outputs a demodulated data of the receiving signal.

2. The communication system of claim 1, wherein the transmitter includes:
   a. a transmission delay unit for inputting the transmission data, giving the determined time delay to the input transmission data, and outputting the delayed data;
   b. a multiplexer for inputting and multiplexing the transmission data and the delayed data, and outputting the multiplexed data;

c. a BPSK modulator for BPSK modulating the multiplexed data; and wherein the receiver includes:

a. a coherent detector circuit for inputting the received signal, generating a carrier wave from the input receiving signal, coherently detecting the received signal based on the carrier wave and outputting a coherent detector signal;

b. a carrier slip compensating circuit for detecting a carrier slip in the coherent detector signal and outputting a compensated receiving signal;

c. a compensated signal separator for separating the compensated receiving signal to a first and a second compensated signals, wherein the first compensated signal corresponds to the transmission data input from the transmitter and the second compensated signal corresponds to the delayed data delayed by the transmission delay unit;

d. a compensated signal delay unit for giving the determined time delay to the first compensated signal and outputting a delay signal;

e. a combination circuit for combining the second compensated signal and the delay signal output from the compensated signal delay unit and outputting a combination signal; and f. a discriminator for discriminating a phase of the combination signal output from the combination circuit and outputting the demodulated data.

3. The transmitter of claim 1, wherein the transmitter includes:

a. a transmission delay unit for inputting the transmission data, giving the determined time delay to the input transmission data and outputting the delayed data;

b. a multiplexer for inputting and multiplexing the transmission data and the delayed data, and outputting the multiplexed data;

c. a BPSK modulator for BPSK modulating the multiplexed data; and wherein the receiver includes:

a. a coherent detector circuit for inputting the received signal, generating a carrier wave from the input receiving signal, and coherently detecting the received signal based on the carrier wave, and outputting a coherent detector signal;

b. a discriminator for discriminating the phase of the coherent detector signal and outputting a discriminated data;

c. a carrier slip compensating circuit for detecting a carrier slip in the discriminated data and outputting a compensated receiving data;

d. a compensated data separator for separating the compensated receiving data to a first and a second compensated data, wherein the first compensated data corresponds to the transmission data input at the transmitter and the second compensated data corresponds to the delayed data delayed by the transmission delay unit;

e. a compensated data delay unit for giving the determined time delay to the first compensated data and outputting a delayed data; and f. a combination circuit for combining the second compensated data and the delayed data output from the compensated data delay unit and outputting the demodulated data.

4. The communication system of claim 1, wherein the transmitter includes:

a. a convolutional encoder for inputting the transmission data, convolutionally encoding the transmission data, and outputting a first transmission data made up of a plurality of data sequences;

b. a plurality of transmission delay units for giving the determined time delays to the data sequences of the first transmission data corresponding to each of data sequences, and outputting a second transmission data made up of a plurality of delayed data sequences;

c. a multiplexer for multiplexing the first and the second transmission data, and outputting the multiplexed data;

d. a BPSK modulator for modulating the multiplexed data using the BPSK modulation; and wherein the receiver includes:

a. a coherent detector circuit for inputting the received signal, generating a carrier wave based on the received signal, coherently detecting the received signal based on the carrier wave, and outputting a coherent detector signal;

b. a carrier slip compensating circuit for detecting the carrier slip in the coherent detector signal, and outputting a compensated receiving signal;

c. a compensated signal separator for separating the compensated receiving signal to a first and a second compensated signals, wherein the first compensated signal includes the plurality of the data sequences corresponding to the first transmission data and the second compensated signal includes the plurality of the data sequences corresponding to the second transmission data;

d. a plurality of compensated signal delay units for giving the determined time delays to the data sequences of the first compensated signal, and outputting a plurality of delay signals;

e. a plurality of combination circuits for combining the data sequences of the second compensated signal and the delay signals output from the compensated signal delay units and outputting combination signals; and f. a maximum likelihood decoder for maximum likelihood decoding the combination signals output from the combination circuits, and for outputting the demodulated data.

5. The communication system of claim 1, wherein the transmitter includes:

a. a convolutional encoder for inputting the transmission data, convolutionally encoding the transmission data and outputting the convolutional encoding data made up of a plurality of data sequences;

b. a first transmission delay unit for giving a first transmission time delay to one of the data sequences of the convolutional encoding data corresponding to the one of the data sequences, and outputting a first transmission data made up of a plurality of delayed data sequences;

c. second transmission delay unit for giving a second transmission time delay to one of the data sequences of the convolutional encoding data corresponding to the one of the data sequences, and outputting a second transmission data;

d. the multiplexer for multiplexing the first and second transmission data and for outputting the multiplexed data;

e. the BPSK modulator which modulates the multiplexed data using the BPSK modulation; and wherein the receiver includes:
  a. a coherent detector circuit for inputting the received signal, generating a carrier wave from the input received signal, coherently wave detecting the received signal based on the carrier wave, and outputting a coherent detector signal;
  b. a carrier slip compensating circuit for detecting the carrier slip in the coherent detector signal, and outputting a compensated receiving signal;
  c. the compensated signal separator for separating the compensated receiving signal to a first and a second compensated signals, wherein the first signal corresponds to the first transmission data and the second compensated signal corresponds to the second transmission data;
  d. a first compensated signal delay unit for giving a first receiving time delay to the first compensated signal corresponding to the one of the data sequences, and outputting a first compensated delay signal;
  e. a second compensated signal delay unit for giving a second receiving time delay to the second compensated signal corresponding to the one of the data sequences, and outputting a second compensated delay signal;
  f. a plurality of combination circuits for combining the delay signals output from the first and the second compensated signal delay units and outputting combination signals;
  g. the maximum likelihood decoder for maximum likelihood decoding the combination signals output from the combination circuits, and outputting the modulated data;
wherein the sum of the first transmission delay time and the first receiving time delay equals for each of the data sequences and equals the sum of the second transmission delay time and the second receiving delay time for each of the data sequences.

6. The communication system of claim 1, wherein the transmitter includes:
  a. a differential encoder for inputting the transmission data, differentially encoding the transmission data and outputting differentially encoded transmission data;
  b. a convolutional encoder for convolutionally encoding the differentially encoded transmission data, which is transparent encoding to a code inversion, and outputting a first transmission data made up of a plurality of data sequences;
  c. a plurality of transmission delay units for giving the determined time delays to the data sequences of the first transmission data corresponding to each of the data sequences, and outputting a second transmission data made up of a plurality of delayed data sequences;
  d. a multiplexer for multiplexing the first and the second transmission data, and outputting the multiplexed data;
  e. a BPSK modulator for modulating the multiplexed data using the BPSK modulation; and
wherein the receiver includes:
  a. a coherent detector circuit for inputting the received signal, generating a carrier wave from the received signal, coherently detecting the received signal based on the carrier wave, and outputting the coherent detector signal;
  b. a carrier slip compensating circuit for detecting a carrier slip in the coherent detector signal, and outputting a compensated received signal;
  c. a compensated signal separator for separating the compensated receiving signal to a first and a second compensated signals, wherein the first compensated signal includes the plurality of data sequences corresponding to the first transmission data and the second compensated signal includes a plurality of the data sequences corresponding to the second transmission data;
  d. a plurality of compensated signal delay units for giving the determined time delays to the data sequences of the first compensated signal and outputting a plurality of delay signals;
  e. a plurality of combination circuits for combining the data sequences of the second compensated signal and the delay signals output from the compensated signal delay units and outputting combination signals;
  f. a maximum likelihood decoder for maximum likelihood decoding the combination signals output from the combination circuits; and
  g. a differential decoder for differentially decoding an output from the maximum likelihood decoder and outputting the demodulated data.

7. The communication system of claim 1, wherein the transmitter includes:
  a. a convolutional encoder for inputting the transmission data, convolutionally encoding the transmission data, and outputting a first transmission data made up of a plurality of data sequences;
  b. a plurality of transmission delay units for giving determined time delays to the data sequences of the first transmission data and outputting a second transmission data made up of a plurality of delayed data sequences;
  c. a multiplexer for multiplexing the first and the second transmission data corresponding to data sequences and outputting the multiplexed data;
  d. a BPSK modulator for modulating the multiplexed data using the BPSK modulation;
  e. a spread circuit for spreading spectrum of the BPSK modulated signal; and
wherein the receiver includes:
  a. an inverse spread circuit for inputting the receiving signal, inverse spreading of the receiving signal, and outputting the inverse spreading signal;
  b. a coherent detector circuit for generating a carrier wave from the inverse spreading signal, coherently detecting the inverse spreading signal based on the carrier wave, and outputting the coherent detector signal;
  c. a carrier slip compensating circuit for detecting a carrier slip in the coherent detector signal and outputting a compensated receiving signal;
  d. a compensated signal separator for separating the compensated receiving signal to a first and a second compensated signals, wherein the first compensated signal includes a plurality of sequences corresponding to the first transmission data and the second compensated signal includes a plurality of data sequences corresponding to the second transmission data;
  e. a plurality of compensated signal delay units for giving the determined time delays to the data sequences of the first compensated signal and outputting a plurality of delay signals;
  f. a plurality of combination circuits for combining the data sequences of the second compensated signal and the delay signals output from the compensated signal delay units and outputting combination signals; and
  g. a maximum likelihood decoder for maximum likelihood decoding the combination signals output from the combination circuits and outputting the demodulated data.

8. The communication system of claim 1, wherein the transmitter includes:
   a. a convolutional encoder for inputting the transmission data, convolutionally encoding the transmission data, and outputting the first transmission data made up of a plurality of data sequences;
   b. a plurality of transmission data delay units for giving the determined time delays to the data sequences of the first transmission data and outputting the second transmission data made up of a plurality of delayed data sequences;
   c. a multiplexer for multiplexing the first transmission data and the second transmission data corresponding to the data sequence and outputting the multiplexed data;
   d. a spread circuit for spreading spectrum of the multiplexed data;
   e. a BPSK modulator for BPSK modulating the spreading spectrum of the modulated signal; and
wherein the receiver includes:
   a. a coherent detector circuit for inputting the receiving signal, generating a carrier wave based on the received signal, coherently detecting the received data, and outputting the coherent detector signal;
   b. an inverse spread circuit for spreading the coherent detector signal and outputting the inverse spreading signal;
   c. a carrier slip compensating circuit for detecting a carrier slip in the inverse spreading signal and outputting the compensated receiving signal;
   d. a receiving signal separator for separating the compensated receiving signal to a first compensated signal and the second compensated signal, wherein the first compensated signal includes a plurality of data sequences corresponding to the first transmission data and the second compensated signal includes a plurality of data sequences corresponding to the second transmission data;
   e. a plurality of compensated signal delay units for giving the determined time delays to the data sequences of the first compensated signal and outputting the delay signal;
   f. a plurality of combination circuits for combining the data sequences of the second compensated signal and the delay signals output from the compensated signal delay units and outputting a plurality of combination signals; and
   g. a maximum likelihood decoder for maximum likelihood decoding the combination signals output from the combination circuits and outputting the demodulated data.

9. The communication system of claim 1, wherein the transmitter includes:
   a. a differential encoder for inputting the transmission data and differentially encoding the transmission data;
   b. a convolutional encoder for convolutionally encoding the differentially encoded transmission data which is transparent encoding to a code inversion, and outputting a first transmission data made up of a plurality of data sequences;
   c. a plurality of transmission delay units for giving the determined time delays to the data sequences of the first transmission data and outputting the second transmission data made up of a plurality of data sequences;
   d. a multiplexer for multiplexing the first and the second transmission data and outputting the multiplexed data;
   e. a BPSK modulator for modulating the multiplexed data using the BPSK modulation;
   f. a spread circuit for spreading spectrum of the BPSK modulated signal; and
wherein the receiver includes:
   a. an inverse spread circuit for inputting the received signal, and spreading the received signal, and outputting the inverse spreading signal;
   b. a coherent detector circuit for generating a carrier wave from the inverse spreading signal, coherently detecting the inverse spreading signal based on the carrier wave, and outputting the coherent detector signal;
   c. a carrier slip compensating circuit for detecting a carrier slip in the coherent detector signal and outputting the compensated receiving signal;
   d. a compensated signal separator for separating the compensated receiving signal to a first and a second compensated signals, wherein the first compensated signal includes a plurality of data sequences corresponding to the first transmission data and the second compensated signal includes a plurality of data sequences corresponding to the second transmission data;
   e. a plurality of compensated signal delay units for giving the determined time delays to the data sequences of the first compensated signal and outputting a plurality of delay signals;
   f. a plurality of combination circuits for combining the data sequences of the second compensated signal and the delay signals output from the compensated signal delay unit and outputting a plurality of combination signals;
   g. a maximum likelihood decoder for maximum likelihood decoding the combination signals output from the combination circuits and outputting the modulated data; and
   h. a differential decoder for differentially decoding an output from the maximum likelihood decoder and outputting the modulated data.

10. The communication system of claim 1, wherein the transmitter includes:
   a. a differential encoder for inputting the transmission data and differentially encoding the transmission data;
   b. a convolutional encoder for convolutionally encoding the differentially encoded transmission data, which is transparent encoding to a code inversion, and outputting a first transmission data made up of a plurality of data sequences;
   c. a plurality of transmission delay units for giving the determined time delays to the data sequences of the first transmission data corresponding to each of the data sequences, and outputting a second. transmission data made up of a plurality of delayed data sequences;
   d. a multiplexer for multiplexing the first and the second transmission data and outputting the multiplexed data;
   e. a spread circuit for spreading spectrum of the multiplexed data;
   f. a BPSK modulator for modulating the spreading spectrum of transmission data using the BPSK modulation; and
wherein the receiver includes:
   a. a coherent detector circuit for inputting the received signal, generating a carrier wave from the received signal, and coherently detecting the received signal based on the carrier wave, and outputting the coherent detector signal;

b. an inverse spread circuit for inversely spreading the coherent detector signal and outputting the inverse spreading signal;

c. a carrier slip compensating circuit for detecting a carrier slip in the inverse spreading signal and outputting the compensated receiving signal;

d. a compensated signal separator for separating the compensated receiving signal to a first and a second compensated signals, wherein the first compensated signal includes the plurality of data sequences corresponding to the first transmission data and the second compensated signal includes a plurality of the data sequences corresponding to the second transmission data;

e. a plurality of compensated signal delay units for giving the determined time delays to the data sequences of the first compensated signal and outputting a plurality of delay signals;

f. a plurality of combination circuits for combining the data sequences of the second compensated signal and the delay signals output from the compensated signal delay units and outputting combination signals;

g. a maximum likelihood decoder for maximum likelihood decoding the combination signals output from the combination circuit; and h. a differential decoder for differentially decoding the output from the maximum likelihood decoder and outputting the demodulated data.

11. The communication system of claim 2, wherein the carrier slip compensating circuit includes:

a. a discriminator for discriminating a phase of the coherent detector signal and outputting discriminated data;

b. a receiving data separator for separating the discriminated data to a first receiving data corresponds to the transmission data and a second receiving data corresponds to the delayed data;

c. a receiving data delay unit for giving the determined time delay to the first receiving data; and d. a carrier slip detector circuit for sequentially comparing the first receiving data delayed by the receiving data delay unit with the second receiving data, detecting a peak position where the number of mismatched bits becomes the largest exceeding the determined value, and outputting a detected result; and a phase rotation circuit for rotating the phase of the coherent detector signal of the coherent detector circuit based on the detected result of the carrier slip compensating circuit to generate a compensated receiving signal, and outputting the compensated receiving signal.

12. The communication system of claim 3, wherein the carrier slip compensating circuit includes:

a. a receiving data separator for separating the discriminated data to a first receiving data corresponding to the transmission data and a second receiving data corresponding to the delayed transmission data;

b. a receiving data delay unit for giving the determined time delay to the first receiving data; and c. a carrier slip detector circuit for sequentially comparing the first receiving data delayed by the receiving data delay unit with the second receiving data, detecting a peak position where the number of mismatched bits becomes the largest exceeding the determined value, and outputting a detected result; and d. a phase rotation circuit for rotating the phase of the discriminated data of the discriminator based on the detected result of the carrier slip detector circuit to generate a compensated receiving data and outputting the compensated receiving data.

13. The communication system of claim 4, wherein the carrier slip compensating circuit includes:

a. a discriminator for discriminating a phase of the coherent detector signal and outputting the discriminated data;

b. a receiving data separator for separating the discriminated data to a first receiving data and a second receiving data, wherein the first receiving data includes a plurality of data sequences corresponding to the first transmission data and the second receiving data includes a plurality of data sequences corresponding to the second transmission data;

c. a plurality of receiving data delay units for giving the determined time delays to the data sequences of the first receiving data and outputting the first delayed receiving data; and d. a carrier slip detector circuit for sequentially comparing the first delayed receiving data corresponding to the data sequence with the second receiving data corresponding to the data sequence, detecting a peak position where the number of mismatched bits becomes the largest exceeding the determined value, and outputting a detected result; and e. a phase rotation circuit for rotating the phase of the coherent detector signal of the coherent detector circuit based on the detected result of the carrier slip detector circuit to generate a compensated receiving signal and outputting the compensated receiving signal.

14. The communication system of claim 5, wherein the carrier slip compensating circuit includes:

a. a discriminator for discriminating a phase of the coherent detector signal and outputting the discriminated data;

b. a receiving data separator for separating the discriminated data to a first receiving data and a second receiving data, wherein the first receiving data includes a plurality of data sequences corresponding to the first transmission data and the second receiving data includes a plurality of data sequences corresponding to the second transmission data;

c. a first receiving data delay unit for giving a first receiving time delay to one of the data sequences of the first receiving data corresponding to the one of the data sequences and outputting the first delayed receiving data;

d. a second receiving data delay unit for giving a second receiving time delay to one of the data sequences to the second receiving data corresponding to the one of the data sequences and outputting the second delayed receiving data;

e. a carrier slip detector circuit for sequentially comparing the first delayed receiving data with the second delayed receiving data, detecting a peak position where the number of mismatched bits becomes the largest exceeding the determined value, and outputting a detected result; and f. a phase rotation circuit for rotating the phase of the coherent detector signal of the coherent detector circuit based on the detected result of the carrier slip detector circuit to generate a compensated receiving signal and outputting the compensated receiving signal.

15. The communication system of claim 11, wherein the carrier slip detector circuit includes:
   a comparator for sequentially comparing the first delayed receiving data with the second receiving data and outputting a comparison result of matched and mismatched in a bit sequence;
   a shifting adder including a shift register for sequentially storing and outputting the bit sequence output from the comparator and an adder for obtaining a summing value of a bit value of the bit sequence output from the comparator and a bit value of the bit sequence stored in the shift register; and
   a peak detector for detecting the peak position where the summing value output from the adder becomes the largest exceeding the determined value and outputting the detected result.

16. The communication system of claim 11, wherein the carrier slip detector circuit includes:
   a comparator for sequentially comparing the first delayed receiving data with the second receiving data and outputting a comparison result of matched and mismatched in a bit sequence;
   a shift register for sequentially memorizing the bits sequences output from the comparator;
   an updown counter for comparing the bit sequence output from the comparator with a bit value of the bit sequence output from the shift register, and uncounting if the values are the same, and counting if the values are different;
   a peak detector for detecting the peak position where a counting value from the updown counter becomes the largest exceeding the determined value and outputting the detected result.

17. The communication system of claim 11, wherein the carrier slip detector circuit includes:
   a comparator for sequentially comparing the first delayed receiving data with the second receiving data and outputting a compared result of matched and mismatched in a bit sequence;
   a shifting adder including a shift register for sequentially storing and outputting the bit sequence output from the comparator and an adder for obtaining a difference value between the summing value of a bit value of the bit sequence output from the comparator and a bit value to which a predetermined time delay has been given to a bit sequence output from the adder and a bit value of the bit sequence output from the shift register; and
   a peak detector for detecting a peak position where the difference value from the adder becomes the largest exceeding the determined value and outputting the detected result.

18. The communication system of claim 15, wherein the peak detector detects the peak position according to the time period during which the value once exceeds and then falls below the determined value and outputs the detected result.

19. The communication system of claim 11, wherein the combination circuit composes the second compensated signal and the delayed signal output from the compensated signal delay unit with the same weight.

20. The communication system of claim 11, wherein the combination circuit compares a receiving level of the second compensated signal with a receiving level of the delayed signal output from the compensated signal delay unit and weighs the second compensated signal and the delayed signal proportionally based on the receiving levels and composes the signals.

21. The communication system of claim 11, wherein the combination circuit selects and outputs one of the first and the second compensated signals based on receiving levels of the first compensated signal and of the second compensated signal at the time of the first compensated signal reception and the second compensated signal reception.

22. The communication system of claim 12, wherein the combination circuit selects and outputs one of the first and the second compensated data based on signal levels of the first compensated data and of the second compensated data at the time of the first compensated data reception and the second compensated data reception.

23. The communication system of claim 11, wherein the carrier slip compensating circuit rotates the phase of the carrier wave generated by the coherent detector circuit based on the carrier slip detection result, and wherein the compensated signal separator separates the coherent detector signal output from the coherent detector circuit to the first and second compensated signals.

24. The communication system of claim 12, wherein the carrier slip compensating circuit rotates the phase of the carrier wave generated by the coherent detector circuit based on the carrier slip detection result, and wherein the compensated data separator separates the coherent detector signal output from the coherent detector circuit to the first and the second compensated data.

* * * * *